US011988357B2

(12) United States Patent
Spiro

(10) Patent No.: US 11,988,357 B2
(45) Date of Patent: May 21, 2024

(54) BUILDING EGRESS LIGHTING APPARATUS AND SYSTEM

(71) Applicant: Exposure Illumination Architects, Inc., Scottsdale, AZ (US)

(72) Inventor: Daniel S. Spiro, Scottsdale, AZ (US)

(73) Assignee: EXPOSURE ILLUMINATION ARCHITECTS, INC., Scottsdale, AZ (US)

( * ) Notice: Subject to any disclaimer, the term of this patent is extended or adjusted under 35 U.S.C. 154(b) by 0 days.

(21) Appl. No.: 18/230,215

(22) Filed: Aug. 4, 2023

(65) Prior Publication Data

US 2023/0417380 A1 Dec. 28, 2023

Related U.S. Application Data

(63) Continuation-in-part of application No. 18/113,098, filed on Feb. 23, 2023, now Pat. No. 11,788,692, which is a continuation-in-part of application No. 17/843,540, filed on Jun. 17, 2022, now Pat. No. 11,629,852, which is a continuation-in-part of application No. 17/830,439, filed on Jun. 2, 2022, now Pat. No. 11,573,005.

(51) Int. Cl.

| | |
|---|---|
| ***F21S 8/00*** | (2006.01) |
| ***F21V 14/00*** | (2018.01) |
| ***F21V 21/08*** | (2006.01) |
| ***F21V 21/40*** | (2006.01) |
| ***F21V 23/02*** | (2006.01) |
| ***F21V 29/71*** | (2015.01) |
| ***F21W 131/402*** | (2006.01) |
| ***F21Y 103/00*** | (2016.01) |

(52) U.S. Cl.
CPC ............ *F21S 8/033* (2013.01); *F21V 14/006* (2013.01); *F21V 21/08* (2013.01); *F21V 21/40* (2013.01); *F21V 23/023* (2013.01); *F21V 29/71* (2015.01); *F21W 2131/402* (2013.01); *F21Y 2103/00* (2013.01)

(58) Field of Classification Search
CPC ........... F21V 23/003; F21V 23/06; F21V 5/04
See application file for complete search history.

(56) References Cited

U.S. PATENT DOCUMENTS

| | | | |
|---|---|---|---|
| 6,150,943 A | 11/2000 | Lehman et al. |
| 8,896,427 B1 | 11/2014 | Ramirez |
| 8,939,634 B2 | 1/2015 | Leadford et al. |
| 9,574,750 B1 | 2/2017 | Hetrick |

(Continued)

OTHER PUBLICATIONS

Invitation to Pay Additional Fees and Communication Relating to the Results of the Partial International Search dated Aug. 21, 2023 in International Application No. PCT/IB2023/054589, 15 pages.

(Continued)

*Primary Examiner* — Mary Ellen Bowman
(74) *Attorney, Agent, or Firm* — XSENSUS LLP

(57) ABSTRACT

One or more reduced, same form, light emitting apparatus (es) spaced apart and configured to be mounted at various heights and/or spacing employ the same power consuming light source input that is covered by a symmetrical or asymmetrical redirecting linear lens optics apparatus that is configured for use in a range of mounting heights to uniformly illuminate at least one legal path of egress below.

20 Claims, 30 Drawing Sheets

(56) References Cited

U.S. PATENT DOCUMENTS

| | | | | |
|---|---|---|---|---|
| 9,626,847 | B2 * | 4/2017 | Spiro | G08B 29/18 |
| 9,990,817 | B2 | 6/2018 | Spiro | |
| 11,149,936 | B2 | 10/2021 | Spiro | |
| 11,573,005 | B1 * | 2/2023 | Spiro | F21V 23/06 |
| 11,629,852 | B1 * | 4/2023 | Spiro | F21V 5/00 362/311.01 |
| 2009/0059602 | A1 | 3/2009 | Santos et al. | |
| 2016/0027267 | A1 | 1/2016 | Spiro | |
| 2021/0254820 | A1 | 8/2021 | Spiro | |
| 2022/0034497 | A1 | 2/2022 | Spiro | |

OTHER PUBLICATIONS

International Search Report and Written Opinion dated Oct. 14, 2022 in corresponding International Patent Application No. PCT/US2022/36938, 11 pages.

* cited by examiner

EXIT
14,34
11
6,7,8
15
21
4
1
24
5
6,7,8,38

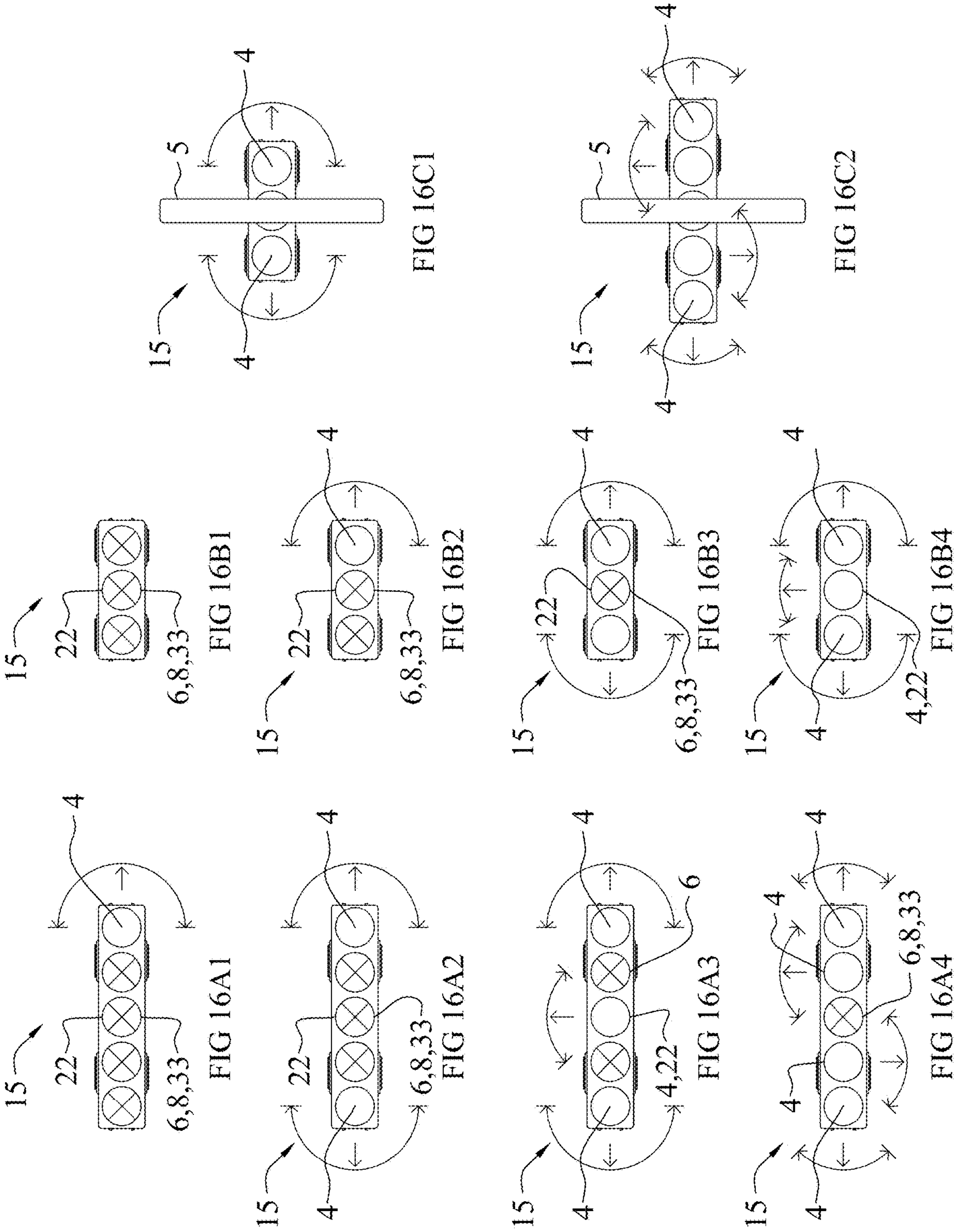
FIG 16C1
FIG 16C2
FIG 16B1
FIG 16B2
FIG 16B3
FIG 16B4
FIG 16A1
FIG 16A2
FIG 16A3
FIG 16A4

BUILDING EGRESS LIGHTING APPARATUS AND SYSTEM

CROSS-REFERENCE TO RELATED APPLICATIONS

The present application is a continuation-in-part application of U.S. application Ser. No. 18/113,098 filed in the USPTO on Feb. 23, 2023, which is a continuation-in-part application of U.S. Pat. No. 11,629,852, filed in the USPTO on Jun. 17, 2022, which in turn is a continuation-in-part of U.S. Pat. No. 11,573,005, filed in the USPTO on Jun. 2, 2022, and contains subject matter related to that disclosed in, U.S. Pat. No. 9,626,847 issued Apr. 18, 2017, U.S. Pat. No. 9,990,817 issued Jun. 5, 2018, U.S. Pat. No. 11,149,936 issued Oct. 19, 2021, and US patent publication 20220034497 published Feb. 3, 2022, the entire contents of each of which being incorporated herein by reference.

BACKGROUND

Technical Field

The present disclosure relates to building egress lighting systems, apparatuses, methods, and computer program product.

Discussion of Background

For non-residential "legal means of egress", building codes require visual signage designating the location of a legal egress door and corresponding signage directing occupants toward the legal egress door, which is identifiable by an exit sign luminaire. In addition, when house power is interrupted, building codes require an illumination of a path (means of egress) to guide occupants to the legal egress door. This illuminated egress path shines on the floor below a luminaire (the source of the light) and is referred to herein as an egress luminaire. Some conventional egress luminaires can also couple to an audio and testing device. Together, the exit sign luminaire and the egress luminaire constitute a non-residential building illuminated means of legal egress.

As recognized by the present inventor, a number of technological changes have occurred that give rise to opportunities in the egress lighting field. Year by year the efficiency of the LED light source increases, and thus less power is required to attain an equivalent light level. As a result, a smaller form factor LED light source can be used. Further, improved light output efficiency produces less heat resulting in a smaller form heat dissipating heat sink.

As the heat sink surface area to which the LED light source couples is reduced, a plurality of LED light sources can populate the reduced surface area. LED light source luminaires are typically covered by common or dedicated optical lens/es. The general, or light source dedicated, optical lens/es can be configured to re-direct the light source emitted light in one or a plurality of directions. Reduced LED lamp size is possible when used in conjunction with light re-directing optical lenses as the light source emitted can be shaped efficiently with lesser light transmission losses.

Legacy egress lighting luminaires are commonly offered with integral batteries.

Alternative luminaires without a battery rely on generator and/or inverter power to energize the luminaires in the event of house power being interrupted. The light source coupled to the luminaires is commonly offered in different sizes, shapes and output power. To comply with building codes' requirements, the installing contractor manually aims the light sources over the designated path of egress. One can't predict without monitoring equipment when a battery will fail. Maintaining ceiling mounted battery systems is costly and operationally disruptive.

The legacy egress lighting luminaires are designed as a dedicated isolated system or integrated with the space ambient lighting luminaire. The ambient lighting luminaires are backed-up by a battery or a remote source and employ the ambient lighting luminaire's optics. The optics of the ambient lighting luminaire are not typically configured for egress lighting resulting in extra initial investment in luminaire cost.

As recognized by the present inventor, utilizing present technology, a small form factor of the same light emitting apparatus can precisely illuminate a uniformly lit linear path of egress below from a range of a mounting height. The apparatus can couple to an egress lighting luminaire and an ambient lighting luminaire.

The luminaires can be powered by reduced power batteries or, due to the apparatus' minimal power consumption and/or, draw power from a remote centralized power supply. Further, the light output of the light emitting apparatus is configured in relation to its mounting height to establish a code compliant illuminated path of egress below.

Unlike legacy luminaires, the light source apparatus does not require aiming the light source by tilting to establish a path of egress—the installer establishes the illuminated path of egress by simply rotating the apparatus' elongated center beam to align with the longitudinal axis of a path of egress below.

SUMMARY

North American building codes require means of emergency lighting egress in buildings. Such means include illuminated exit signage and egress lighting. Egress lighting illuminates a defined legal path of egress inside a building interior floor, leading to a building's legal egress door to the exterior. Over the door and along the path of egress illuminated exit signs show the direction to follow toward the legal egress doors.

The presently disclosed subject matter includes, among other things, a teaching of a reduced form light emitting apparatus 200 that is configured to illuminate an elongated path of egress 100 below. In this Summary section reference numbers generally refer to features shown in FIGS. 27A through 30B. Other parts of the disclosure describe various embodiments, and features of the various embodiments may be interchanged.

The path of egress is defined by several building codes including the national fire protection agency (NFPA) under building legal means of egress. According to the fire code definition, the illuminated path of egress 100 must not exceed a certain distance, must not go below specified light levels, must maintain certain uniformity ratio, must have a minimum light level average, and the light must remain on for a specified duration.

The light emitting apparatus 200 includes a heat dissipating structure 300 that retains at least one light source 500. The light source 500 can comprise of one or several LED lamp/s 5000. A light redirecting optical lens 600 disposed over the light source 500 re-directs light emitted by the light source 500 onto the elongated path of egress 100 below. The light emitting apparatus 200 is electromechanically coupled to a retaining structure 400. The retaining structure 400 most commonly is the bottom face of an enclosure/housing 3000. The enclosure 3000 can house at least one of: a power supply 2400, a processor 3100 with resident memory and code, a communication device 2600, a sensing device 2300, a sign 3200, a lit indicator 1100 and a back-up power supply 3300. The light emitting apparatus 200 coupled to the retaining structure 400 can be detachable and configured to rotate about its vertical axis.

The reduced form of the light emitting apparatus 200 is defined by the size of the heat dissipating structure 3 onto which at least one light source 500 couples. The light emitting apparatus 200 and/or the heat dissipating structure 300 form can be circular, polygon or a combination of the forms thereof. The heat dissipating structure 300 can be made of metallic and/or non-metallic material. In at least one embodiment, the horizontal width of the heat dissipating structure 300 and/or the light emitting apparatus 200 can be greater than the vertical height of the light emitting apparatus 200 with the electromechanical connector 2500. Maintaining a reduced form, the width of the light emitting apparatus 200 can be smaller than 77.5 mm. At least one surface of the light emitting apparatus 200 can be configured to become a grip surface 1200 to rotate the apparatus 200 about its vertical axis. Further, the grip surface 1200 can be a protrusion 1000 that provides additional utility as described below.

At least one surface of the light emitting apparatus 200 can include at least one protrusion 1000. The protrusion 1000 can be located on at least one of: the face of the heat dissipating structure 300 facing the illuminated surface below, at the top side of the heat dissipating structure 2000 facing the structure above and, along the perimeter wall of the light emitting apparatus 34. The protrusion 10 is configured to enable at least one of: dissipate light source 500 heat by conduction and convection, and provide an abutting surface for a mechanical locking device 1300 that secures the apparatus 200 post installation against rotation. At least one protrusion 1000 can couple to the heat dissipating structure 300 surface that faces the path below. The protrusion can be located between at least two light sources' 500 light redirecting optical lenses 600. The light emitting apparatus 200 can extend below the surface of the retaining structure 3000 or be recessed inside the retaining structure 3000.

The heat dissipating structure 300 of the light emitting apparatus 200 retains at least one light source 500 covered by a dedicated light re-directing optical lens 600. The light source 500 with its dedicated lens 600 directs the light emitted to the below and away from the light emitting apparatus 200. The optical lens 600 covering the light source 500 can have a symmetrical or an asymmetrical light distribution pattern and shape the light emitted in an elongated pattern. The illuminated width of the egress path 100 showing an elongated light pattern emitted can be configured to remain the same or substantially the same for light emitting apparatus 200 mounted at different spacing length 1800 and/or mounting height 1700.

The redirecting optical lens 600 design can be configured to produce a sharp light cutoff. The precision optical lens 600 can be configured for a specific or a range of mounting heights 1600. The lens 600 can be configured for a specific mounting height range covering the same power consuming light source 500. The same power consuming light source 500 with the same or a different lens 600 and ranging in height between 15'-0" to at least 45'-0" above finish floor (AFF) can illuminate at least one path of egress 100.

The lens 600 can be configured to maintain a specific light level along the longitudinal delineated boundaries of the illuminated path 100 below. The light redirecting optical lens 600 can produce a precise linear path that at 1'-0" inward from its delineated longitudinal boundaries, the light levels within the boundaries diminish by less than a fraction of 1.0 FC. It is further noted that the maximum to minimum uniformity ratio of the illuminated path 100 light levels can be no greater than 10:1 having a visually discernable light cutoff between the illuminated boundaries and the adjacent surfaces.

The structure retaining 400 the light emitting apparatus 200 is configured to retain one or more light emitting apparatus 200. By coupling at least two light emitting apparatus 200 to the retaining structure 400 at least one of: an illuminated linear path/or and a non-linear illuminated path/s can be formed below the same retaining structure 400. In addition to a light emitting apparatus 200, at least one power consuming device can be coupled to at least one surface of the retaining structure 400. The power consuming device can include at least one of: a sensing device 2300 and a communication device 2600.

The present innovation establishes an illuminated path of egress 100 by simply horizontally rotating the elongated beam center 1500 of the light emitting apparatus 200 to align with central longitudinal Axis 1700 of the path of egress 100 below. A mechanical locking device 1300 can couple to at least one of: the light emitting apparatus 200 and the retaining structure 400. The mechanical locking device 1300 is configured to prevent the rotation of the light emitting apparatus 200 following the alignment of the elongated beam 1500 over the path 100. Unlike current construction means and methods for egress lighting today, the present innovation does not require luminaire aiming by tilting to establish a path of egress 100 below the light emitting device.

The path of egress 100 in a building can diverge in several directions. A retaining structure 400 with a plurality of light emitting apparatus 200 coupled can direct the emitted light in the direction of at least two diverging paths of egress 100 below. The elongated central beams 1500 of the light emitting apparatus 200 coupled to the retaining structure 400 can be configured to rotate about their respective vertical axis to align with the longitudinal center Axis 1700 of the paths of egress 100 below, wherein the paths 100 merge at nadir below the light emitting apparatus. The length of an illuminated path of egress 100 illuminated by at least one light source 500 can increase as the mounting height 1600 of the light emitting apparatus 200 increases. As a rule of thumb, the spacing to mounting ratio of the light emitting apparatus 200 mounted over an illuminated path of egress 100 can exceed 3:1 using the same light source 500 input power at heights exceeding 15'-0".

The retaining structure 400 of the light emitting apparatus 200 can retain a plurality of light source 500. While all light sources 500 coupled to the retaining structure 400 share the same mounting height 1600, the beam pattern of at least one light source 500 coupled can vary from another light source 500 coupled to the same light emitting apparatus 200. Coupling at least two different light emitting apparatus 200 with different beam patterns to the retaining structure 400 can help gapping irregular and/or diverging illumination conditions in delineating at least one path of egress 100. The emitted light pattern can be square, round or other pattern.

The retaining structure 400 that retains a plurality of light emitting apparatus 200 with coupled light sources 500 is configured to illuminate at least one path of egress 100 from different mounting heights. While the mounting height 1600 of the retaining structure 400 can vary, the minimum light levels within the path of egress delineated boundaries, the light level average and the maximum to minimum uniformity ratio must be code compliant. The present innovation can adhere to the strictest of all US building safety codes requirements.

In a physical evaluation of the light emitting apparatus 200 of the present innovation, mounted at 30'-0" above the illuminated path of egress 100 and spaced 70'-0" apart, two light emitting apparatus 200 each coupled to an asymmetrical light source 500 oriented over the path 100 yielded a minimum of 1.0 FC, a light level average of 1.2 FC and a maximum to minimum ratio of 1.5:1. The two light sources 500 produced these results consuming 14 watts combined. The results significantly outperform the present code requirement.

The maximum to minimum uniformity ratio of 1.5:1 recorded is significantly better than the code's maximum to minimum allowance of 40:1. Further, the power consumed to generate the illuminance level above the 6'-0" wide 1.0 FC minimum light level path was under 0.04 watts per square feet (w/sf). This power consumption value under the condition described is unheard of for illuminated means of building egress. To articulate the present innovation's technological advancement, by contrast, the NFPA prevailing code mandates an average of 1.0 FC with a minimum of 0.1 FC and maximum to minimum uniformity ratio of 40:1.

The present innovation light emitting apparatus 200 can be configured to produce at least one foot candle at mounting heights 1600 exceeding 15'-0" and up to 45'-0" above a path of egress 100. Illuminating the path of egress 100 can be accomplished using the same light source 500 input power and light emitting apparatus 200 form factor. The light source 500 of apparatus 200 can be configured produce a minimum of 1.0 FC with a maximum to minimum illuminance ratio of less than 10:1 over and within the entire delineated area path of egress 100. As described above, the light redirecting optical lens of the light emitting apparatus 200 can produce a uniformity ratio of 1.5:1. The light emitting apparatus 200 alone or coupled to a retaining structure 400 of a housing enclosure 3000 can be rated for damp and/or wet locations as well as hazardous or food processing environments.

The light source 500 coupled to the heat dissipating structure 300 of the light emitting apparatus 200 can operate on AC or DC voltage. Power to the light emitting apparatus 200 can be delivered from a power supply 2400 coupled to the enclosure/housing 3000, from a power supply 2400 coupled to a nearby located housing/enclosure 3000 to the light emitting apparatus 200, or from a centralized power supply 2400 that is located remotely. The retaining structure 400 that retains the light emitting apparatus 200 can be a standalone egress lighting luminaire or a member coupled to an ambient lighting luminaire (not shown). At least one switching device coupled to the retaining structure 400 and/or the housing enclosure 3000 of the standalone egress luminaire or the ambient lighting luminaire can control at least one of: the light output emitted, the color temperature of the light emitted, and the operational mode of at least one light source.

In at least one embodiment, the present application describes a low-profile versatile enclosure 3000 retaining structure 400 that is configured to couple to at least one light emitting apparatus 200. The enclosure 3000 can receive and convey power or power and data having at least one of: a top knockout 2800 opening and a side wall knockout 2800 opening. The enclosure 3000 can be enclosed by a cover and/or a door to access at least one electrical device inside. The cover and/or the door can be detachable. The enclosure with or without the cover and/or the door can be damp or wet location rated. The enclosure coupled to the light emitting apparatus can be rated to operate between −30° Celsius and 55° Celsius. At least one light emitting apparatus 200 coupled to the enclosure 3000 can be fixated or detachable to the enclosure 3000 and can be rotated horizontally about the light emitting apparatus' vertical axis.

The enclosure 3000 can house at least one of: a power supply 2400, a backup power supply 3300, a processor with resident memory 31 and code, a charging device 2700, a transformer 36, a sensing device 2300, and a communication device 2600. Aside from the light emitting apparatus 200, at least one of the exterior surfaces of the enclosure 3000 can couple to at least one of: a second light emitting device such as an indicator 1100, a sensing device such as a camera 3600, an audio device 3500, a switching knob/button 3700, and an air monitoring device (a type of sensing device 2300).

The enclosure's exterior surfaces can have a plurality of power and/or data receptacles 4000. The receptacles 4000 can be universal enabling coupling devices of different or of the same functionality. At least one receptacle 4000 can be configured for at least one of: low voltage and house line voltage device. The enclosure 3000 can be configured with a plurality of receptacle 4000 apertures wherein at least one receptacle 4000 is occupied by a power consuming device. Other unused receptacle/s or receptacle aperture/s can be covered by a blank cover/s. Enclosure 3000 can be fabricated of metallic or non-metallic material or a combination thereof.

The present innovation significantly reduces illuminated means of building egress power consumption while producing higher levels of uniform light code conforming path/s of egress 100. The light source can include a plurality of lamps 5000 with covered by light redirecting optical lenses 600. The light emitted by at least two lamps 5000 covered by the light redirecting optical lenses 600 can have different tilt angle of the center beam forming the elongated beam pattern and/or the transverse beam angle corresponding to their respective nadir.

The light emitted by the light source 500 can be linear or non-linear. The reduced form light emitting apparatus 200 can be coupled to an egress lighting luminaire as well as an ambient lighting luminaire. With at least one embodiment, the light emitting apparatus 200 can be configured to emit light under non-emergency operational conditions. For example, the light emitting apparatus 200 can provide night time (NL) illumination over major circulation path inside a building.

At least two reduced form light emitting apparatus 200 can couple to a single enclosure 3000 and/or other retaining structure 400 wherein the light pattern emitted by the first light emitting apparatus 200 is linear and the second light emitting apparatus is non-linear. At least one light emitting apparatus 200 coupled to an enclosure 3000 and/or retaining structure can rotate about its vertical axis wherein the vertical axis is perpendicular or substantially perpendicular to the illuminated surface below. Moreover, the heat dissipating structure with at least one coupled light source is disposed parallel or substantially parallel to the illuminated surface below. The enclosure 3000 retaining the light emitting apparatus can be mounted at different mounting heights while producing a code compliant illuminated path of egress 100.

At least one enclosure 3000 and/or a retaining structure 400 can be coupled to at least two light emitting apparatus 200 wherein the enclosure 3000 and/or the retaining structure 400 can be mounted at different heights with the light emitting apparatus 200 having the same or substantially the same form factor. The light emitting apparatus 200 mounted at different heights maintains the same or substantially the same light levels over the surface of the elongated path/s of egress 100 below by altering a least one of: the optical properties of a lens 600, the power input to a lamp 5000, and by selecting different lamps 5000 and/or the number of lamps 5000 populating the lamp 5000 retaining heat dissipating structure 300 of the light emitting apparatus 200.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 16A1, 16A2, 16A3, 16A4, 16B1, 16B2, 16B3, 16B4, 16C1, and 16C2 as orientations of light modules included in receptacles and non-lit devices in receptables.

DETAILED DESCRIPTION

Figure 1A:
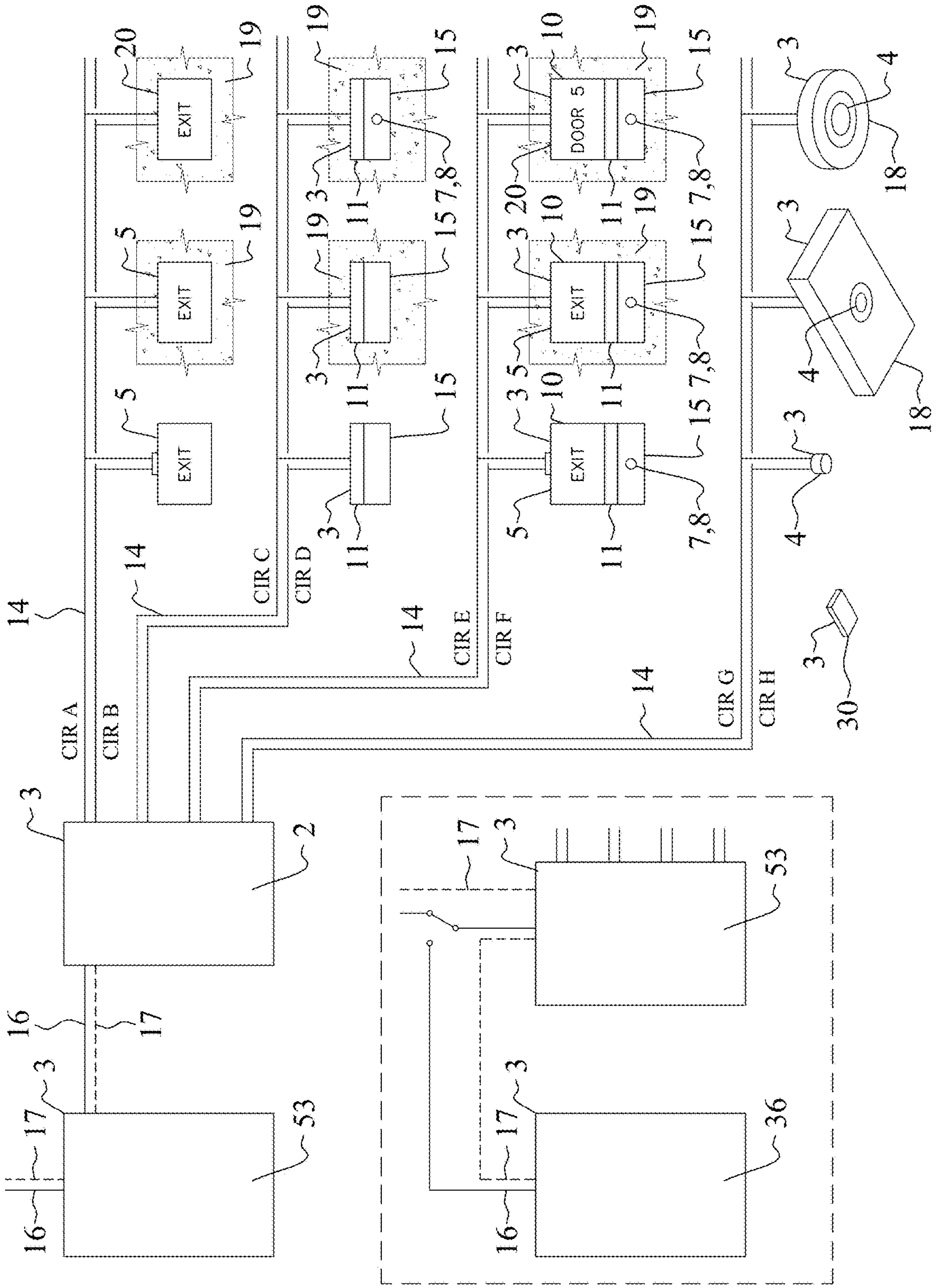
FIG. 1A is a dual (dual-redundant) circuitry diagram of a building emergency lighting system powered by a remote source.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

Before turning to the detailed drawings, an overview of components used in exemplary systems described herein, as well as their functionality, is first described.

The Light Source of the Egress Luminaire—The present innovation employs at least one planar light emitted diode (LED) light source with a linear lens optics above. The dedicated lens optical pattern of the light source can be symmetrical or asymmetrical. The light source can include at least one LED lamp that is powered by a local or remote driver. The light sources can be arranged side-by-side, having dedicated lens optics or an optics system that is adapted to configure a plurality of light sources. The lens optics can be configured for a specific luminaire mounting height.

For example, a luminaire mounted below 12'-0" above the floor may have one or two light sources and may use one type of lens optics, while a luminaire mounted at 24'-0" above the floor may have four light sources with a different type of lens optics. In addition, the input power to each light source and the orientation of the light source with its coupled lens may vary based on the specific needs. The light source with its coupled lens optics and a heatsink collectively form a module.

The module couples to a power receptacle, or power and data receptacle. The module can rotate about its vertical axis. While the number of light source lamps, lenses, and input power may vary, the present innovation, at least in one embodiment, defines the light source aperture diameter to be equal to or smaller than 80 mm. In other embodiments, the maximum aperture diameter is 70 mm, 60 mm, 50 mm, 40 mm, 30 mm, 20 mm, or 10 mm. Having a defined standard for a light source module form factor and power/data enables usage of various output light sources with corresponding optics interchangeably inside the same aperture in a standardized luminaire housing.

The light source module can be a plug n' play device coupled to a standardized luminaire housing. The standardized aperture in the housing can then also retain other IOT devices with power and data connectivity. The orientation of this present innovation rotational light source module, coupled to the luminaire housing, is substantially horizontal. When installed, the installer simply aligns the lens beam directional designator with the center line of the path of egress below—no aiming by tilting is required.

The Power Source—Building Code requires that a building means of egress illuminates at least one exit sign and a defined path of egress to a legal exit door when house power is interrupted. To meet the code requirement, a standby back-up power source must be readily available to supply power to the exit and egress luminaires. The common back-up power sources include at least one of: an integral luminaire battery, a remote inverter, and a generator. Three technological advances have contributed to reduced power demands on today's building illuminated means of building egress:

Improved light source light output efficiency,

Improved power storage device efficiency, and

Improved lens optics

These advances have contributed to a smaller size housing requirement where a battery is used and/or where inverters (converts direct current, DC, into alternating current, AC) are used. It is understood that the present innovation's reconfigured luminaire architecture is in part as a result of recognizing the lesser size housing requirements of the back-up power source.

Power Source Circuitry—Present egress luminaires commonly rely on an integral battery or batteries to power at least the egress luminaires when house power is interrupted. Normally, the battery is charged under house power and when house power is disrupted, the battery then discharges by applying its stored power to the egress luminaires. The power circuitry of the egress luminaires can require only a single input power circuit.

While the egress luminaire of the present innovation can utilize an integral battery, the present innovation recognizes several limitations associated with such use. Luminaires with integral back-up batteries are often placed in hard to reach locations, the battery life is unpredictable, and additional hardware is required to continuously monitor and test the battery's readiness. These limitations contribute to more opportunities for failure that in turn, add costs to the initial material, labor, and maintenance costs.

The present innovation in one embodiment uses a single inverter (a circuit that converts DC to AC) to provide the back-up AC power needs for the building's illuminated means of egress. The inverter can couple to the code-mandated luminaires by one or two power circuits. The inverter battery or batteries are configured to remain fully charged by house power and then available on standby for discharging their storage power in the event of power interruption. The power consuming devices coupled to a single circuit and the double circuits of this embodiment can be configured as follows:

Single Circuit—The single circuit configuration flows house power directly to downstream illuminating means of egress luminaires and to the battery charger of the inverter. Under house power, only the egress sign luminaires are required to be on. The other egress luminaires are switched off by a micro switch communicatively coupled to at least one of: an inverter controller, a building lighting controller and/or battery management system (BMS). When house power is disrupted, a transfer switch disconnects the house power engaging the inverter. As the inverter engages, a microswitch coupled to the egress luminaire switches on by a signal and/or the received power. The microswitch may use an in-built capacitor.

Double Circuit—The double circuit configuration utilizes two circuits. The first circuit referred herein as the house power circuit powers illuminated means of egress that are required to operate 24/7. Such illuminated means include at least one exit sign luminaire. The second circuit is referred herein as the standby emergency back-up power circuit. This circuit receives power only when house power is interrupted. When power flows through the circuit, all power consuming devices belonging to the illuminated means of egress receive their power from this circuit. These luminaires include at least one of: an egress luminaire and an exit sign luminaire.

The present innovation is configured to incorporate Internet of Things (IOT) devices, communication devices, sensing devices, output devices, and charging devices. These devices can be controlled by at least one processor/controller (computer processor) governed by local AI code, as will be discussed. The processor/controller provides adaptability and makes real time decisions concerning matters of life safety. Some of the devices coupled to the illuminated means of egress may be quasi-related to or not related to the illuminated means of egress. These devices may only share resources such as power or power and data while others for the benefit of other building disciplines. Control over the power usage of all devices is addressed under the specifications for the IOT devices.

The present embodiment recognizes that a single 1.0 kVA or 1.5 kVA output remote inverter powering luminaires employing efficient light sources and lens optics can satisfy the illuminated requirements of a large building. The inverter can be placed at an easy to access secured cabinet and its batteries can be industry standard used among other with vehicles.

IOT Devices—The architecture of the present innovation means of egress provides for the integration of IOT devices into the luminaire housing. A non-exhausted listing of IOT devices includes devices that are connectable, addressable, and controllable over computer networks (wired, wireless, or hybrid) such as temperature sensors, gas detectors, optical detectors, video and still cameras, seismic sensors, IR sensors, transceivers and the like. The building code mandates that the egress luminaires shall be positioned over and along main building circulation arteries to enable occupants to quickly arrive at the legal exit doors of the building. These egress luminaires along with exit sign luminaires are electrified. Since these electrified components are code mandated and are disposed in strategic building locations, they provide a platform for coupling IOT devices.

The IOT devices can be directly associated with the operational requirements of the means of egress luminaires. enhancing their capability to protect life. or can be unrelated sharing common resources coupled to the luminaire. In addition, unrelated devices can be coupled to the egress luminaires' housing, providing utility to quasi related or unrelated building system disciplines.

The IOT devices can include at least one of: a sensing device, a charging device, a communication device, a processing/controlling device, and an output device (e.g., an energy output device such as a speaker that emits audible sound, a warning light that emits a visible light of a certain color, intensity and/or pulsed characteristic, and/or a RF warning signal that is used to trigger another alarm). The sensing devices an include thermal, humidity, air quality/fire, radiation, vibration, audio and visual. The charging device can include a battery and capacitor charger, and a communication device can include a single or bi-directional transceiver that communicates by means of wire (Cat 5, etc.) and/or wireless (e.g., Wi-Fi, 5G, Bluetooth, etc.). The processing/controlling device can couple to at least one local device coupled to a luminaire housing including the light source and or luminaire driver. The output device can be a light source such as an egress path, an indicator, a strobe light source, and/or an audio device such as a speaker.

At minimum, the present innovation provides the full utility of present-day conventional illuminated means of egress. Coupling IOT devices to an egress luminaire with a processor/controller governed by an AI engine enhances the luminaires' utility and provides a novel means of protecting life.

The Processor/controller Code (non-transitory computer readable storage devices that include computer executable instructions)— At least one of the illuminated means of building egress can be coupled to a processor/controller. The processor/controller can be physically or communicatively coupled to at least one IOT device including a light source and a light source driver. The processor/controller is programmed to provide instructions that are compliant with the building codes. The computer code can employ at least one AI algorithm that operates on a trained model. The computer code is configured to process real time input from local and neighboring sensing devices, and to compile instructions that are received from a remote networked device and local data stored including operational logic. The processor can then in real time generate autonomous decisions pertaining to the egress luminaire and/or other devices the processor is communicatively coupled to.

The processor/controller code can have defining features that contribute to a paradigm shift in the perceived illuminated means of egress systems. The addition of sensing devices to a specific addressable location coupled with code that processes multiple inputs in real time, compiles the inputs and makes life saving actionable decisions is novel. The present innovation can bring full machine self-awareness to buildings, exceeding human perception and decision-making capacity. This attribute can be explained by the processor's ability to know what lies beyond and throughout the building.

Scenario 1 is an exemplary illustration of a means of egress luminaire coupled to IOT devices providing a direct utility. A processor/controller, a transceiver, and a sensing device such as a camera with a processor may be coupled to an egress luminaire, wherein the luminaire has a dedicated address and its location inside a building (or outside) is known.

The event—A fire broke out inside a building over an illuminated path of egress. An egress path luminaire equipped with a processor/controller, and a camera can alert an occupant not to follow the path. Without the sensing and processing equipment, the present code requirement could lead an occupant to his or her death by encouraging the occupant to follow a path that is obstructed by the fire. Conventional egress lighting does not assure an occupant that the path is safe. Yet, this is the path the occupant is expected to use in the event of fire in the building. The present innovation recognizes this deficiency and diverts the occupant to a different exit door, saving their life.

Scenario 2 is an illustration of a means of egress luminaire coupled to IOT devices providing predictive utility having the same IOT devices as scenario 1. Event—A camera image sensed and processed by a controller/processor, and communicated to a responsible party, can alert that a legal exiting door is blocked by boxes at a specific location in a building. This predictive observation will save life when fire breaks out and/or in an earthquake.

Scenario 3 is an illustration of a means of egress luminaire coupled to IOT devices providing utility having the same IOT devices as scenario 1. Event—An egress path luminaire coupled to IOT devices, acting as a building security device can relay notice of an unauthorized entry into a building, through the sensed camera input, to a person responsible for building security. The coupled IOT devices are a shared building disciplines resource used for enhanced life safety means and building security.

Scenario 4 is an illustration of a means of egress luminaire coupled to IOT devices providing an unrelated to illuminated means of egress utility. A processor/controller, a transceiver, and a sensing device such as a thermal probe may be coupled to an egress luminaire, wherein the luminaire has a dedicated address and its location inside a building (or outside) is known. A sensor signals the processor/controller that the ambient temperature exceeds a set threshold. The processor/controller sends an alert to the building's facility manager to correct the anomaly.

The processor/controller code can prioritize device operation by assigning each device a relational priority based on a condition/situation. The weighted relation between devices and priorities is rather complex and an AI code algorithm can configure best action based on programmed knowledge, learned experience, real time input, and above all understanding that its prime purpose is to protect life. As a part of the program, the AI code employs a predictive algorithm that anticipate events before they occur and can act including alerting humans and machines.

The AI code can be configured to operate independently from other remote devices or in unison. Acting in unison enables information exchange between devices wherein lifesaving decisions can be made based on sensed input. Event— A camera observes a person in a building with a handgun drawn and another sensor observes noise recognized as a gunshot. The AI code coupled to the plurality of the means of egress luminaires will likely:

Identify the incident as an active shooter event

Alert the authority/ies

Establish by communicating with all networked devices the safest evacuation route Inform evacuees the path away from the shooter leading to a safe exit door Keep visual contact with the shooter sharing visual feed with the authorities Keep visual contact with trapped occupants The IOT devices in the example above, such as a listening device capable of identifying a gunshot and a camera with image recognition capability, are uncommon to building means of egress luminaires. Nonetheless, the scenario described demonstrates an expanded life protecting capability that can only be managed through multiple device communication.

The AI code can prioritize device operation using devices based on code requirements and real time situational needs. In so doing, the processor/controller monitors the power consumption of each coupled device and reduces the power to, and/or turns off devices while prioritizing life saving devices.

For example, a dual circuit remote power circuitry under house power powers an exterior mounted egress luminaire. The luminaire is also coupled to building security lighting and a camera. Under house power circuit the egress light sources are off while the other two devices are on. When building power is interrupted, the egress light sources turn on and the camera input power is switched to the remote power circuit. The building security lighting turns off. As the event proceeds, the local processor/controller monitoring available power alone or communicatively with other like devices, decides whether the camera must remain on, for what duration, and how often it must transmit an image.

To physically accommodate the IOT devices, at least the egress luminaire housing form factor requires reconfiguration. On the device level, at least two IOT devices' form factors, and means of electromechanical connectivity can interchangeably couple to at least one egress luminaire. These devices can be mechanically and electronically sized and configured to fit on or in luminaire housing retaining surfaces. Their electrical/data receptacle/s may also be configured to be electromechanically compatible with at least one light source.

On the luminaire housing level, and consistent with the overall design intent of system modularity, the present innovation has developed interchangeable housing modules that when put together become all elements needed for illuminated means of egress. The modules also provide for device provisions that require changing the housing form.

The illuminated means of egress is comprised of at least one of: an egress luminaire and an exit sign. The present innovation provides for a standalone exit sign and an exit sign that couples to an egress luminaire. The exit sign that couples to the egress luminaire is configured to couple from below or from above. The sign can be single or double sided. The sign can be directly coupled to the egress luminaire, or in a preferred embodiment can be coupled to an intermediary element referred herein as the adaptor.

The adaptor is a volumetric elongated element configured to couple to the exit sign from below. The adaptor can be unitary with an extender or a standalone element. The adaptor is configured to provide the following features: improve the visibility of an exit sign when an egress luminaire is coupled from below, allow power from above to enter the egress luminaire, adapt the assembly to at least one of a surface, a pendent, and wall mounting conditions, and couple to an extender that provides space to add electrical devices.

The adaptor can be mechanically coupled to at least one of: an exit sign, an egress luminaire, an extender, and a wall surface. Coupling the adaptor to at least one of the above elements can be toolless. The adaptor can be made of metallic and/or non-metallic material and can be configured to be used indoors and outdoors.

The extender is a volumetric element that can expand the capacity of the egress luminaire to support more devices. The devices can be disposed inside and/or the exterior surfaces of the extender. The extender is coupled to the egress luminaire from above and to the adaptor from below. For example, in applications where battery is required, the battery can be placed inside the extender. Power from above reaches the extender and is conveyed to the egress luminaire below.

The extender can be a standalone element or can be unitarily coupled to the adaptor, essentially turning the two elements into one element. The extender can be mechanically coupled to at least one of: an exit sign as a standalone element, an egress luminaire, an extender, and a wall surface. Coupling the extender to at least one of the above elements can be toolless. The extender can be made of metallic and/or non-metallic material and can be configured to be used indoors and outdoors.

The Exit Sign and Egress Luminaires—The exiting sign luminaire is a planar surface that is vertically oriented and coupled to a wall, a ceiling, or suspended from a ceiling. At least one side of the vertical planar surface displays written text for an exit and/or a symbol designation for an exit. The text and/or symbol can have a directional designator like a chevron directing building occupants toward an exit door. The text side of the planar surface is opposite to the direction of the occupant's path of travel in a manner that an occupant has visual contact with the sign.

The present innovation can couple IOT devices to the exit sign. It also can use the exit sign as a non-emergency sign. For example, a combination of an outdoor egress luminaire and an exit sign can be placed over a legal existing door. The exit sign can become a sign for a different purpose and not be connected to the electrical circuitry of the egress luminaire below. Similarly, only a portion of the egress luminaire below can be tasked with illuminating a path of egress from the building.

Code requires that the sign remains lit 24/7, and an LED light source is today's most common light source means to illuminate single- and double-sided egress exiting sign luminaires. The size and color of the text and/or symbols are mandated by codes of national and local jurisdictions.

The egress luminaire is coupled to a wall, a ceiling, or suspended from a ceiling. The egress path luminaire can have at least one light source that emits light symmetrically or asymmetrically. Moreover, the lens produces a light pattern that is asymmetric. The egress path luminaire is configured to illuminate a legal path of egress below the luminaire. A building path of egress can be comprised of a plurality of egress path luminaires forming a patchwork of linear continuous illuminated paths that can terminate by the building's legal egress door or can extend beyond the building's legal exit door to the exterior.

Now, referring to the drawings, FIG. 1A shows a conceptual circuitry diagram of a building's illuminated means of egress utilizing dual circuitry. This configuration is an exemplary power circuitry configuration; however, it is only a single exemplary circuitry configuration among several. The present innovation prefers powering the illuminated means of building egress through a remote centralized power source 2. To articulate the present embodiment's power circuitry configuration's benefits, the following is a brief summary of several illuminated means of egress power circuitry configurations widely used today.

The use of an integral battery 9 (FIG. 1B) with an egress and exit sign 5 luminaire is common in the building industry (not shown). The luminaires' power circuitry relies on a single house power circuit until the power is interrupted. Then, battery (or batteries) 9 inside the luminaire/s power the egress luminaires 15 and/or exit signs' 5 luminaire light sources. When house power is uninterrupted, the batteries 9 are charged.

Another common power circuitry configuration (not shown) includes a single dedicated emergency lighting circuit. The circuit can power all the building's illuminated means of egress or a selected group of luminaires. When house power is interrupted, a remote back-up power source 2,36 (inverter 2, and generator 36) sends power to the dedicated emergency lighting circuit. The balance of the luminaires can be powered by integral batteries 9.

A more forward-looking power circuitry configuration, like that shown in FIG. 1A for example, has a single power circuit operating under house power, powering a selected group of luminaires such as the exit sign 5 luminaires. The balance of at least the egress luminaires 15 is switched off. Each of the egress luminaires 15 are optionally coupled to a computer processor 23 that controls a microswitch to at least one light module 4 and a transceiver 3 (wired and/or wireless). When building power is interrupted, the circuit power switches to at least one remote power supply 2,36. The remote power supply 2,36 can be at least one of the generator 36, a rectifier, and/or the inverter 2. When a switchover occurs, an internal sensor 6 (FIG. 1B) coupled to the at least one egress luminaire 15 senses the power interruption and switches the egress luminaire 15 light on. In another configuration the power supply 2,36 includes a controller that can send a signal to the egress luminaires 15 to turn on and off.

The illuminated means of egress can have a local temporary power source to power at least one of: a microswitch and the transceiver 3. It should be noted that other devices coupled to the illuminated means of building egress can be selectively switched off when power interruption is sensed or for the duration of such power interruption. Furthermore, illuminated means of building egress governed by a local and/or remote processor/controller 23 (FIG. 1B) can selectively control devices based on real time sensed conditions in the building and available power allocated to each device. The processor/controller 23 may be referred to herein as a computer processor, processor, and/or controller.

The present innovation teaches that at a minimum a single small remote power back-up supply such as the inverter 2 can provide ample power to illuminate the egress means of a large building. Further, the illuminated means of egress can become a device platform for coupled IOT devices 8. The platform enhances the capacity of the illuminated means of egress to protect life while providing utility for other building disciplines. Furthermore, at least one device that supports at least one unrelated building discipline can be coupled to the platform.

FIG. 1A shows four dual power circuits (dual circuit A/B, dual circuit C/D, dual circuit E/F, and dual circuit G/H) coupled to a plurality of light emitting devices. The devices can be addressable and communicatively coupled locally and with other remotely disposed devices. At least one power consuming device that is unrelated to a building's illuminated means of egress can also couple to the circuitry.

The exemplary devices of FIG. 1A include for circuits A and B: a pendent mounted exit sign 5 luminaire, a wall 19 mounted exit sign 5 luminaire, and an exterior mounted overhead illuminated sign 20 luminaire. The devices of the diagram include for circuits C and D: a pendent mounted 34 egress luminaire 15, a wall 19 mounted egress luminaire 15, and an exterior wall 19 mounted egress luminaire 15. The devices coupled to circuits E and F include: a pendent mounted 34 exit sign/egress luminaire combo 10, a wall 19 mounted exit sign/egress luminaire combo 10 and exterior mounted exit sign/egress luminaire combo 10.

The devices coupled to circuits G and H include: a standalone egress light module 4, an egress light module 4 coupled to a square formed luminaire, and a light module 4 coupled to a round formed luminaire. The standalone egress light module 4 can be coupled to other lighting and non-lit power consuming devices. For example, a light module 4 can be an OEM component supplied with an ambient lighting luminaire 18 wherein the orientation of the emitted egress light is configured in the field by rotating the light module 4 to align with a designated path of egress. The luminaire's light module 4 is coupled to at least one driver 25 wherein the driver 25 receives its power from at least one of: a house power, an integral battery 9, and the remote back-up power source 2,36.

FIG. 1A also shows an inverter 2, a breaker/relay panel 53, and a remote device 30 below. The remote device 30 can communicatively couple to any egress luminaire 15. The remote device 30 can belong to a different building discipline than the illuminated means of building egress. Sensing device/s 6 coupled to the egress luminaire 15 can share and receive inputs from other building disciplines. Also shown in dashed line is an alternate configuration using a generator 36 to power the building means of egress. This configuration employs a transfer switch. When house power is disrupted the stand-by generator 36 comes online transmitting power to the building means of egress through the breaker/relay panel 53. The preferred dual power circuits' configuration for illuminated means of egress shown in FIG. 1A is configured to have a dedicated "constant hot" house power circuit to maintain power to at least one exit sign luminaire 5 in a building. The second circuit originates at a remote back-up power supply 2,36 location. This circuit is powered only when house power is interrupted. A sensing device 6 senses when house power is interrupted and switches from the first circuit to the second circuit of the back-up power supply. The transfer switch can be located remotely from the back-up power supply 2,36 by means of a signal that actuates the transfer switch.

The benefits derived from the latter power circuitry configuration include lesser dependency on local switching and communication devices and greater latitude to operate the technology of illuminated means of egress on an IOT device 8 platform with little or no dependency on an integral battery/ies 9. In fact, the only switched devices during operation of this power circuitry configuration can be auxiliary devices that are quasi or nonrelated devices to the building's illuminated means of egress.

For example, an exterior egress path luminaire 15 disposed over an egress door coupled to the house power circuit can also be coupled to building security lighting with a photocell 39 and a camera 7 (the camera can also be the photocell). In the event of power interruption and circuitry switchover to the back-up power circuitry, illuminated means of egress are turned on, the security lighting is turned off, and the camera 7 may turn on or remain on until a local and/or a remote processor/controller 23 decides to turn the camera 7 off intermittently or fully.

Figure 1B:
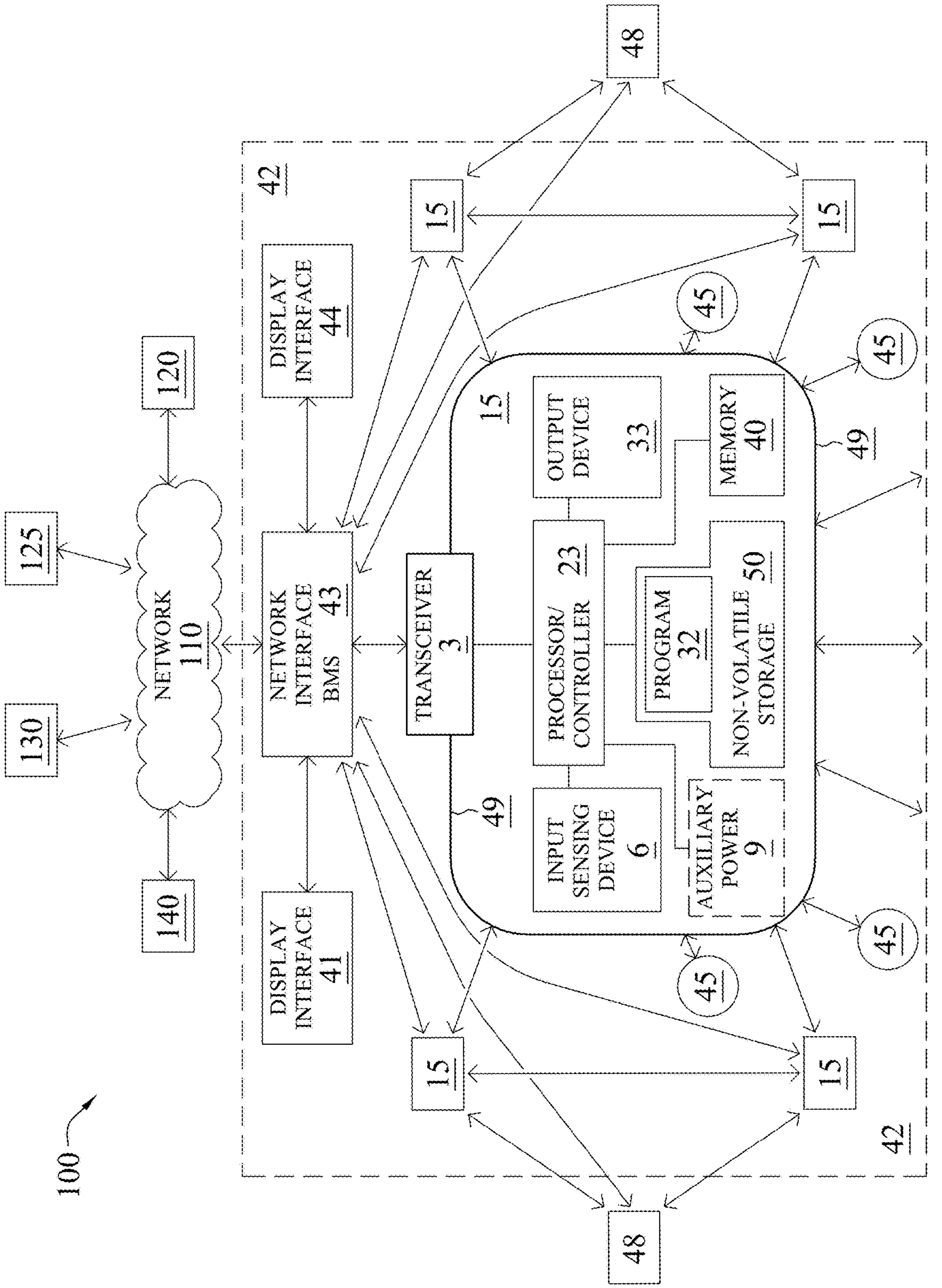
FIG. 1B is a block diagram of a processor/controller (computer processor) coupled to an egress luminaire that may implement various embodiments described herein in operating the illuminated building means of egress networked devices.

FIG. 1B is a block diagram of a processor/controller (computer) coupled to an egress luminaire that may implement the various embodiments described herein in operating the illuminated building means of egress networked devices.

This block diagram illustrates a control aspect of the present disclosure that may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device (circuitry) from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely autonomously, on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 1B is a functional block diagram illustrating a networked system 100 of one or more networked computers and servers. In an embodiment, the hardware and software environment illustrated in FIG. 1B may provide an exemplary platform for implementation of the software and/or methods according to the present disclosure.

Referring to FIG. 1B, a networked system 100 may include, but is not limited to, luminaire 15 (which includes computer circuitry as shown), network 110, remote computer 115, web server 120, cloud storage server 125 and computer server 130. In some embodiments, multiple instances of one or more of the functional blocks illustrated in FIG. 1B may be employed.

Additional detail of the computer circuitry included in each luminaire 15 is shown in FIG. 1B. The functional blocks illustrated within the computer circuitry for luminaire 15 are provided only to establish exemplary functionality and are not intended to be exhaustive. And while details are not provided for remote computer 115, web server 120, cloud storage server 125 and computer server 130, these other computers and devices may include similar functionality to that shown for the computer of luminaire 15.

The circuitry of luminaire 15 may be any programmable electronic device capable of communicating with other devices on network 110.

The circuitry of luminaire 15 may include processor 23, bus 49, memory 40, non-volatile storage 50 with auxiliary power storage 9, network interface 43, peripheral interface 44 and display interface 41. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Computer processor 23 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 49 may be a proprietary or industry standard high-speed parallel or serial peripheral interconnect bus, such as ISA, PCI, PCI Express (PCI-e), AGP, and the like.

Memory 40 and non-volatile storage 50 may be computer-readable storage media.

Memory 40 may include any suitable volatile storage devices such as Dynamic Random Access Memory (DRAM) and Static Random Access Memory (SRAM). Non-volatile storage 50 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 32 may be a collection of machine readable instructions (code) and/or data that is stored in non-volatile storage 50 and is used to create, manage and control certain software functions that are discussed in detail elsewhere in the present disclosure and illustrated in the drawings. In some embodiments, memory 40 may be considerably faster than non-volatile storage 50. In such embodiments, program 32 may be transferred from non-volatile storage 50 to memory 40 prior to execution by processor 23.

The computer of luminaire 15 may be capable of communicating and interacting with other computers via network 110 through network interface 43. Network 110 may be, for example, a local area network (LAN), a wide area network (WAN) such as the Internet, or a combination of the two, and may include wired, wireless, or fiber optic connections. In general, network 110 can be any combination of connections and protocols that support communications between two or more computers and related devices.

Peripheral interface 44 may allow for input and output of data with other devices that may be connected locally with the computer of luminaire 15. For example, peripheral interface 44 may provide a connection to external devices. External devices may include devices such as a keyboard, a mouse, a keypad, a touch screen, and/or other suitable input devices. External devices may also include portable computer-readable storage media such as, for example, thumb drives, portable optical or magnetic disks, and memory cards. Software and data used to practice embodiments of the present disclosure, for example, program 32, may be stored on an egress luminaire such portable computer-readable storage media. In such embodiments, software may be loaded onto non-volatile storage 50 or, alternatively, directly into memory 40 via peripheral interface 44. Peripheral interface 44 may use an industry standard connection, such as RS-232 or Universal Serial Bus (USB), to connect with external devices.

Display interface 41 may connect computer 15 to a remote display. The remote display may be used, in some embodiments, to present a command line or graphical user interface to a user of computer 15. Display interface 41 may connect to the display using one or more proprietary or industry standard connections, such as VGA, DVI, DisplayPort and HDMI.

As described above, network interface 43, provides for communications with other computing and storage systems or devices external to the computer of luminaire 15. Software programs and data discussed herein may be downloaded from, for example, a remote computer, a web server 120, a cloud storage server 125 and a computer server 130 to non-volatile storage 50 through network interface 43 and network 110. Furthermore, the systems and methods described in this disclosure may be executed by one or more computers connected to the computer of luminaire 15 through network interface 43 and network 110. For example, in some embodiments the systems and methods described in this disclosure may be executed by remote computer 115, computer server 130, or a combination of the interconnected computers on network 110.

Data, datasets and/or databases employed in embodiments of the systems and methods described in this disclosure may be stored and or downloaded from remote computer 115, web server 120, cloud storage server 125 and computer server 130.

FIG. 1B further shows a diagram of the building means of egress device connectivity. The present embodiment shows the entire device network 100 of the building means of egress constructed with as few as two communicatively coupled egress luminaires 15. For this reason, an egress luminaire 15 is shown at the center of the present block diagram. The egress luminaire 15 may include a processor/controller 23 (computer processor), an input sensing device 6, an output device 33, a transceiver 3, and an auxiliary back-up power supply 9.

The egress luminaire 15 is disposed inside a building interior 42. Inside the building, the egress luminaire is in communication with at least one more egress luminaire 15 and may also be communicatively coupled to at least one other building discipline device 45. In addition, at least one egress luminaire 15 can be communicatively coupled to at least one exterior mounted device 48.

The egress luminaire 15 is configured to operate alone and in unison with other local and remote network devices. The communication between the devices can be wired, wireless, or a combination of the two methods. The plurality of the egress luminaires 15 are communicatively coupled to a network interface 43. The network interface can be a building BMS. The network interface 43 can be coupled to at least one of: a display interface 41 and a peripheral interface 44. Through the network interface 43, program updates can be downloaded to the array of the building devices. Also, through the network interface 43, information and alerts can reach human and machine clients inside and outside the building. This communication can be a redundant means of communication to the already mesh device network configured for at least two devices disposed inside the building.

The network interface 43 can be communicatively coupled to the cloud network 110 and through this network, can be communicatively coupled to at least one of: a remote computer, a web server 120, a cloud storage server 125, and a computer server 130.

Returning to the network for egress luminaires, these egress luminaires constitute the backbone of the building illuminated means of egress. The network operates 24/7 while the light modules 4 of the egress luminaires 15 turn on only when house power is interrupted. In another embodiment, the processor is energized only when power is interrupted wherein an auxiliary back-up power supply 9 provides sufficient power to the processor to support essential services.

FIG. 1B illustrates an expanded embodiment of the present innovation's utility. Other embodiments can be configured to operate as basic as the functionality of the current state of the art illuminated means of egress while demonstrating significantly improved performance.

Figure 2C:
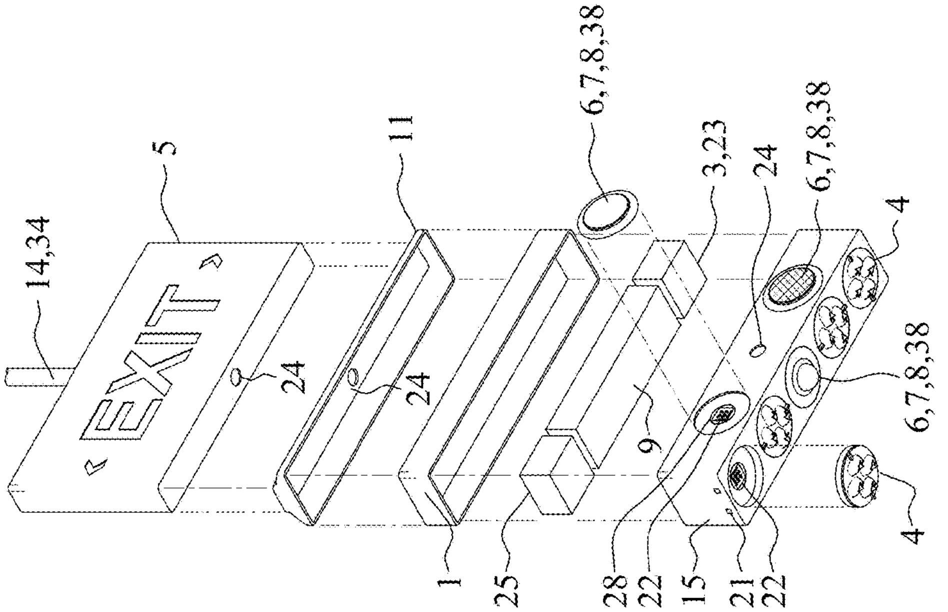
FIGS. 2A, 2B, and 2C are respective exploded axonometric views of egress luminaires, an egress luminaire with an extender, and an egress luminaire with an extender coupled to an exit sign luminaire.
Figure 2A:
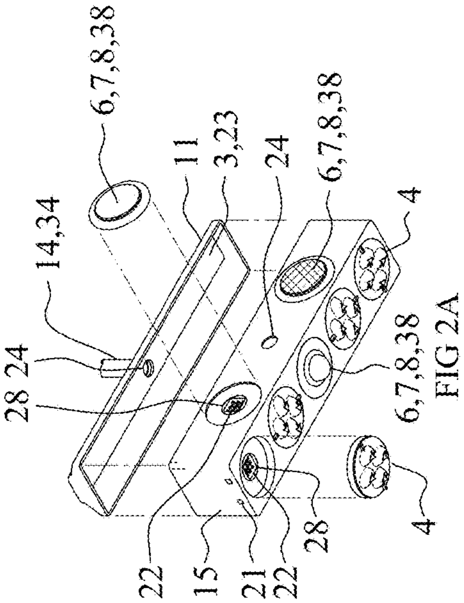
Figure 2B:
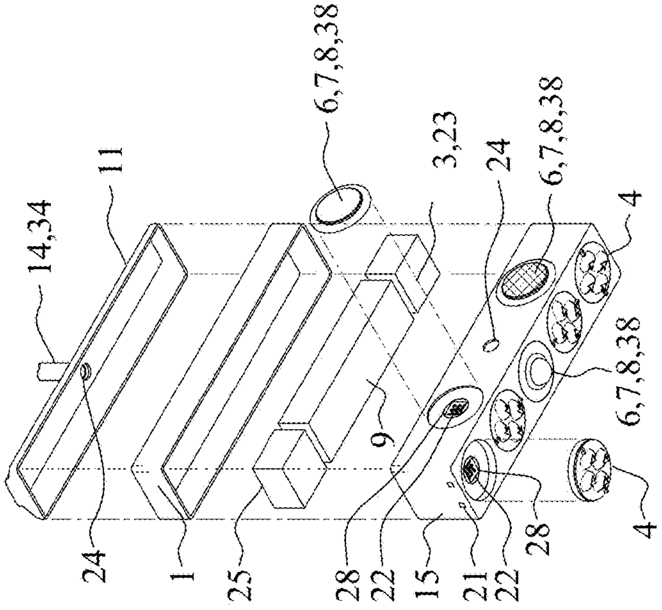

FIGS. 2A, 2B, are 2C exploded axonometric views of an egress luminaire with an adaptor 11, an egress luminaire with an adaptor 11 and an extender 1 (both shown in more detail in FIG. 8), and an egress luminaire with an adaptor 11 and an extender 1 coupled to an exit sign luminaire 5 respectively.

FIG. 2A is an exploded axonometric view of an embodiment of egress luminaire 15 with four aperture openings 28, each configured to receive at least one light module 4. The light module 4 electromechanically couples to a receptacle 22 that is coupled to the egress luminaire housing. The electromagnetic coupling allows both a physical coupling to hold the light module in place, but also allow for a direct connection to the receptacle to provide a mechanism for bidirectional power and signal conveyance to and from other electronic components of the egress luminaire 15. Once coupled, the light module 4 can rotate horizontally about its vertical axis. Also shown at the bottom surface of the egress luminaire 15 is an additional receptacle 22. This receptacle 22 can be a universal receptacle 22, such as the receptacles 22 of the light modules 4 or a dedicated receptacle. This receptacle 22 can couple to at least one of: a sensing/output device 6,33 and a bottom coupled exit sign 5 luminaire. At least one of the receptacles 22 can convey at least one of: power and data to a plurality of devices including at least one light module 4. Although in this exemplary embodiment shows for of the universal receptables 22, the egress luminaire 15 can be sized to accommodate more or less receptacles 22 (e.g., 2, or 3, or 5, 6, 7 or 8). Furthermore, to make use of available real surface area, receptacles 22 may be placed on the sides of the egress luminaire 15 as well.

The short wall surface of the egress luminaire 15 includes operational indicator lights 21 and the long wall surface includes receptacles 22 configured to couple (wired or wirelessly) to a plurality of devices including IOT devices 8. The IoT devices shown include: an audio device 38 (such as a speaker and/or microphone) and a camera device 7. If there are no non-lit modules (e.g., sensing device 6, camera/occupancy sensor 7, IoT device 8) hosted on the bottom of the egress luminaire 15, the space for accommodating the non-lit module, maybe covered with a removable cap, so the space may be used later if it is decided to later retrofit the egress luminaire 15 with a non-lit module. Moreover, the non-lit modules may be hosted by a universal receptacle 22 as well. It should be noted that the IoT devices may be physically separated from the egress luminaire 15 and may couple via wireless communications to the egress luminaire 15 so as to provide sensor data (e.g., data regarding temperature, sound, pressure, seismic, facial recognition, light, chemical (e.g., gases such as natural gas, CO, etc.), or toxic substance detection (e.g., sarin gas, radioactive materials) to the egress luminaire 15 for consideration by the egress luminaire 15 when directing evacuation routes. Egress luminaires 15 are also interconnected for exchanging the sensor data so the processors/controllers 23 in the egress luminaires 15, so the processors/controllers 23 may cooperate with one another to adaptively illuminate safest egress routes as various incidents evolve. Also shown is a knock-out opening 24 configured to allow access to the egress luminaire 15 when the luminaire is wall-mounted.

Above the egress luminaire 15, an adaptor 11 is shown coupled to a conduit 14. The adaptor 11 is a modular key mechanical structure disposed along the upper surface of the egress luminaire 15 along with an extender 1 (FIG. 2B, and FIG. 8) to establish an interchangeable unifying system device typology that is suited for all luminaire coupling and mounting configurations.

FIG. 2B shows the arrangement of FIG. 2A with an extender 1. The extender 1 is a walled enclosure that on one end couples to the egress luminaire 15 housing and on the other end couples to the adaptor 11. Inside, or inside and on the exterior surfaces of, the extender 1 at least one IOT device 8 can be directly coupled (physically and electrically), or remotely coupled via wireless communications. The extender 1 can primarily be used where egress lighting is powered by a battery 9 source.

FIG. 2C shows the arrangement of FIG. 2B with an exit sign luminaire 5 coupled to the arrangement from the above. In this configuration, the top side of the adaptor 11 (also shown in FIG. 8) couples to the bottom side of the exit sign luminaire 5 and power from the above mounted conduit 14 enters the exit sign luminaire 5 and flows through the extender 1 to the devices coupled to the egress luminaire 15.

FIGS. 3A, 3B, 3C, 3D, 3E, 3F, 3G, and 3H show front and side elevations of pendent mounted egress luminaire configurations. In these example embodiments, the pendent may be separate from a conduit, or a common structure (conduit/pendent).

Figures 3A, 3B, 3C, 3D, 3E, 3F, 3G, 3H:
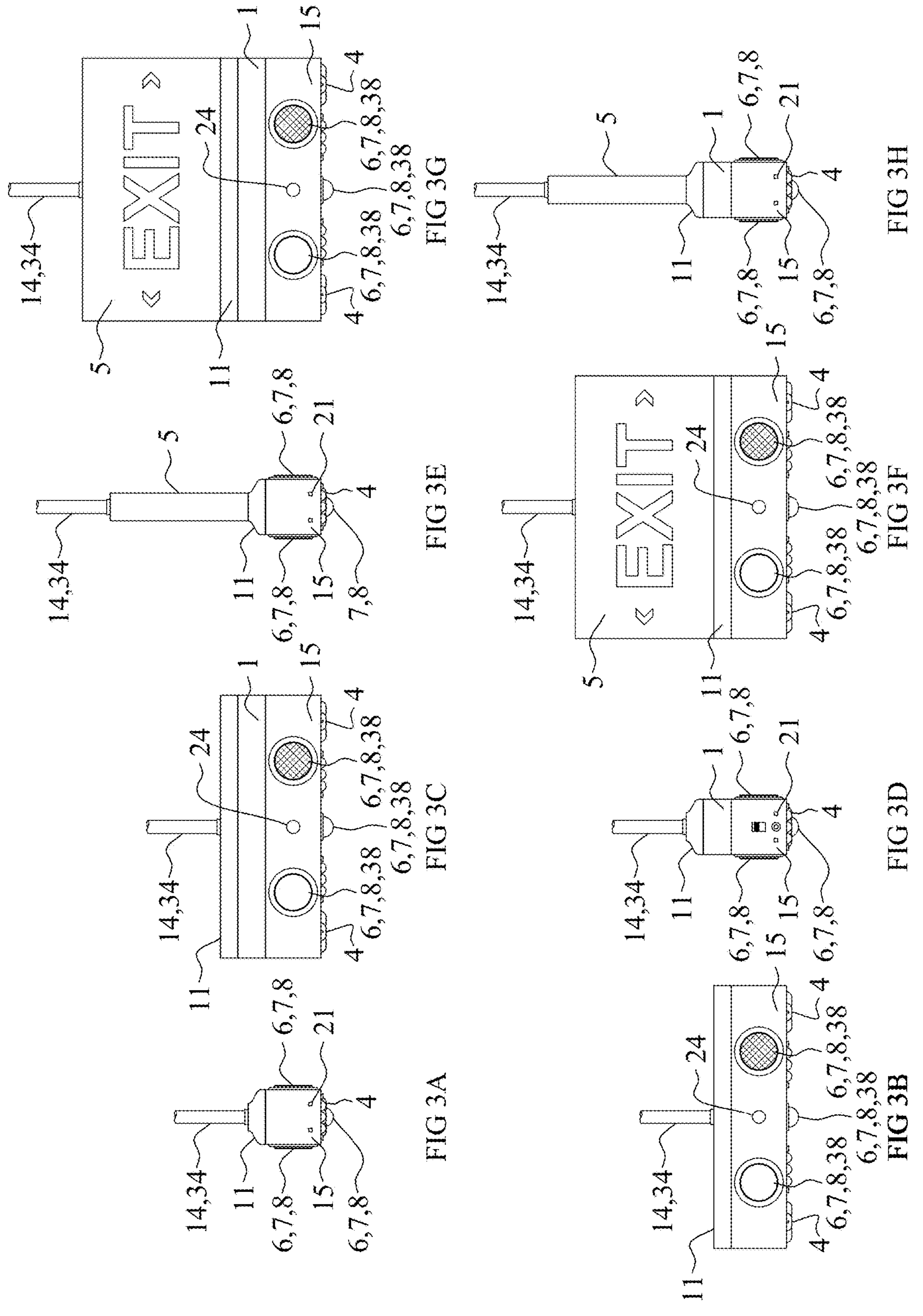
FIGS. 3A, 3B, 3C, 3D, 3E, 3F, 3G, and 3H are front and side elevations of pendent mounted egress luminaire configurations.

FIGS. 3A and 3B are side and front elevations, respectively, of a pendent mounted egress luminaire 15. In this configuration the adaptor 11 couples to the conduit 14 (above) and to the egress luminaire (below). Elements shown include: a light module 4, an egress luminaire 15 with a knock-out opening 24, an adaptor 11, a conduit 14, and a sensing/output device 6, 7, 8.

FIGS. 3C and 3D are front and side elevations, respectively, of another pendent mounted egress luminaire embodiment. In this configuration, an extender 1 is shown coupled from below to an adaptor 11 and coupled from above to the egress luminaire 15. Elements shown include: a light module 4, an egress luminaire 15 with a knock-out opening 24, an adaptor 11, an extender 1, a conduit 14, and a sensing/output device 6, 7, 8.

FIGS. 3E and 3F are side and front elevations, respectively, of another pendent mounted egress luminaire. In this configuration an adaptor 11 is shown coupled from below to an exit sign luminaire 5 and coupled from above to the egress luminaire. Elements shown include: a light module 4, an egress luminaire 15 with a knock-out opening 24, an adaptor 11, an exit sign luminaire 5, a conduit 14, and a sensing/output device 6, 7, 8.

FIGS. 3G and 3H are front and side elevations, respectively, of yet another pendent mounted egress luminaire embodiment. In this configuration an adaptor 11 is coupled from above to an extender 1, the adaptor 11 couples from below to an exit sign luminaire 5 and the extender 1 couples from above to the egress luminaire. Elements shown include: a light module 4, an egress luminaire 15 with a knock-out opening 24, an adaptor 11, an extender 1, an exit sign luminaire 5, a conduit 14, and a sensing/output device 6, 7, 8.

FIGS. 4A, 4B, 4C, 4D, 4E and 4F are elevation views of an alternate luminaire embodiment that differs from the embodiments shown in FIGS. 3E-3H wherein an exit sign luminaire 5 is coupled to an egress luminaire 15 from below.

Figure 4A:
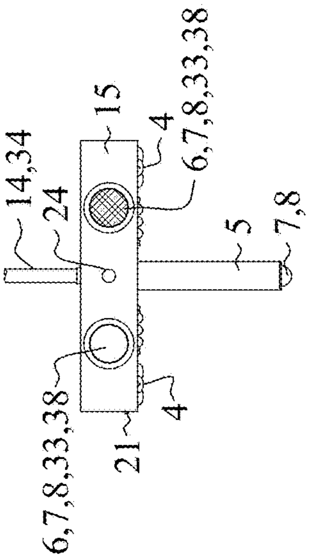
FIGS. 4A, 4B, 4C, 4D, 4E, and 4F are elevation views of an alternate luminaire arrangement to FIGS. 3E-3H wherein an exit sign luminaire is coupled to an egress luminaire from below.
Figure 4B:
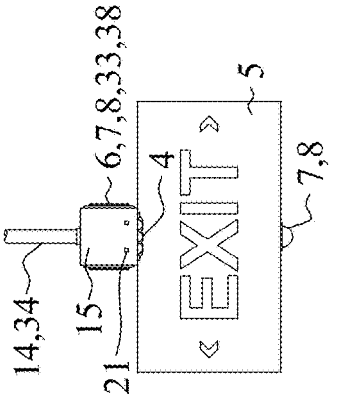
Figure 4C:
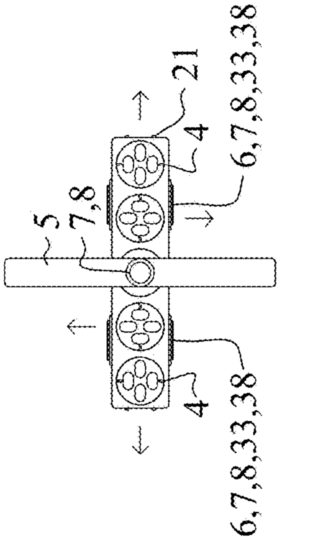

FIGS. 4A, 4B, and 4C show the short side, the long side, and the bottom side of the exit sign luminaire 5 respectively. The luminaire assembly of the embodiment of FIGS. 4A-4C is configured for pendent mounting. The present luminaire arrangement is non-traditional in that it has the exit sign luminaire 5 positioned substantially perpendicularly to the elongated body of the egress luminaire 15. This arrangement permits full utility of the light modules 4 to emit their light (using directional optics) toward as many as four paths of egress below (see directional arrows) so as to illuminate 1, 2, 3, or 4 paths of egress. Further, the exit sign luminaire 5 can be configured to rotate about its vertical axis with power entering the exit sign luminaire 5 through an electromechanical universal receptacle 22 in the egress luminaire 15 housing. The elements shown include: camera/occupancy sensor 7, IOT device 8, exit sign 5, egress luminaire 15, light module 4, a sensing device 6, an output device 33, bore/knockout 24, and conduit 14.

Figure 4D:
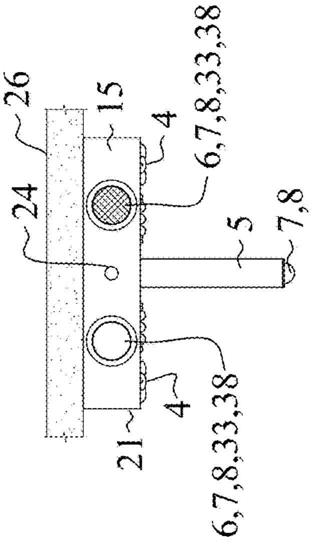
Figure 4E:
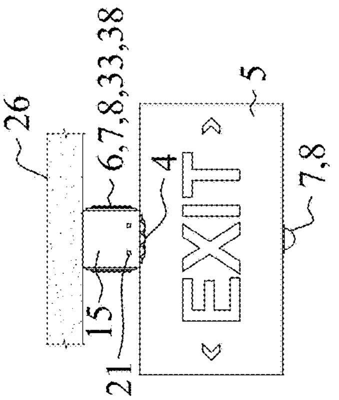
Figure 4F:
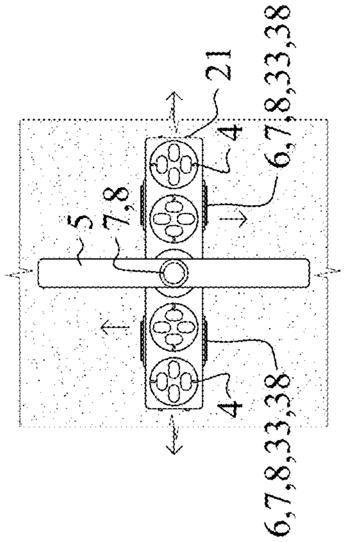

FIGS. 4D, 4E and 4F show the short side, the long side, and the bottom side of the exit sign luminaire 5 respectively. This embodiment is configured for surface mounting. The present FIGS. 4D, 4E and 4F show the egress luminaire flush mounted to the ceiling 26 above. In a different configuration the luminaire assembly can couple to a junction box that in turn is coupled to the ceiling 26. In yet another embodiment, a conduit 14 coupled to the ceiling 26 can deliver power and/or data through the knock-out opening 24 in the side wall 19 of the egress luminaire. The elements shown include: camera/occupancy sensor 7, IOT device 8, exit sign 5, egress luminaire 15, light module 4, a sensing device 6, an output device 33, bore/knockout 24, and ceiling 26.

FIGS. 5A, 5B, 5C, 5D, 5E, 5F, 5G and 5H show front and side elevations of a wall mounted egress luminaire embodiment having a combined egress and exit sign luminaire 5 assembly.

Figures 5A, 5B, 5C, 5D, 5E, 5F, 5G, 5H:
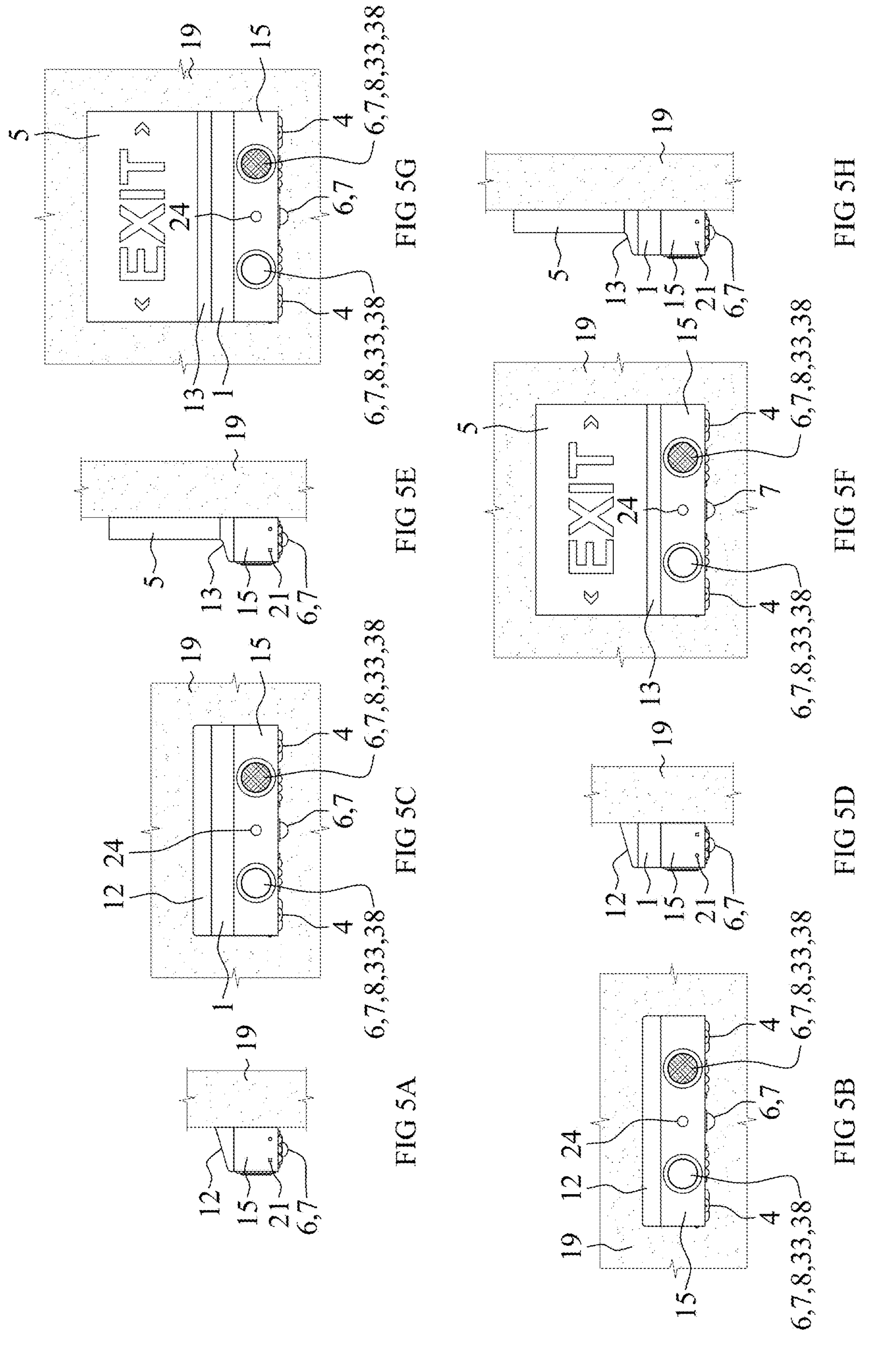
FIGS. 5A, 5B, 5C, 5D, 5E, 5F, 5G, and 5H are front and side elevations of a wall mounted egress luminaire and a combined egress and exit sign luminaire assembly.

FIGS. 5A and 5B illustrate an egress luminaire 15 coupled to the wall 19. The egress luminaire can be configured to couple to both interior and exterior walls 19. The present flush mounted luminaire can be coupled to a J-box 29 recessed inside the wall 19. In a different mounting configuration, the power or power and data access to the luminaire can be from above (interior mount) and from below. The adaptor 11 shown coupled to the egress luminaire from above can provide protection from the elements in outdoor settings.

In addition to the light modules 4 coupled to the egress luminaire 15 bottom surface, other light emitting devices and sensing devices 6 can be coupled. These devices can use a universal receptacle 22 to receive power and receive/transmit data. For example, an exterior mounted egress luminaire 15 can be coupled to exterior building security lighting and can have a camera 7 and a photocell. The security lighting turns on by the photocell every night, powered by house power. The camera 7 is activated only when human presence in the vicinity is sensed. The camera 7 also operates on house power. When house power is interrupted, the security lighting turns off, the egress lighting is turned on and the camera 7 remains on. During this time, the camera 7 may employ an additional or a different code 32 algorithm configured to respond to the power interruption conditions. The elements shown include: an egress luminaire 15, a camera/occupancy sensor 7, an indicator light 21, a wall 19, an adaptor type C 12, a sensing device 6, an IOT device 8, an output device 33 and a bore/knockout opening 24.

FIGS. 5C and 5D show an egress luminaire embodiment coupled to a wall with an extender 1 and an adaptor 11. The extender 1 expands the interior space of the egress luminaire when additional electronic devices are too large to fit inside the housing of the egress luminaire. Other than the addition of the extender 1, the present assembly can have the same attributes as the one described above. The elements shown include: an egress luminaire 15, a camera/occupancy sensor 7, an indicator light 21, a wall 19, an adaptor type C 12, a sensing device 6, an IOT device 8, and extender 1, an output device 33 and a bore/knockout opening 24.

FIGS. 5E and 5F show an egress luminaire 15 coupled to a wall with an exit sign luminaire 5 coupled from above to form a combo wall mounted luminaire 10. An adaptor 11 configured for combined luminaires' flush wall mounting applications couples to the exit sign luminaire 5 from below and the egress luminaire 15 from above. In outdoor wall mounted applications and for example over an egress door, a door number sign 20 can be placed instead of an exit sign luminaire 5. Such a sign can also be illuminated. Other than the addition of the door identifier sign 20, the present assembly can have the same attributes as the one described above. The elements shown include: an egress luminaire 15, an exit luminaire 5, a camera/occupancy sensor 7, an indicator light 21, a wall 19, an adaptor type C 13, a sensing device 6, an IOT device 8, an output device 33 and a bore/knockout opening 24.

FIGS. 5G and 5H show an egress luminaire embodiment coupled to a wall with an exit sign luminaire 5 coupled to the egress luminaire 15 from above. The present configuration shows the adaptor 11 coupled to an extender 1 from above, the adaptor 11 coupled to the exit sign luminaire 5 from below, and the extender 1 coupled to the egress luminaire 15 from above. Other than the addition of the extender 1, the present assembly can have the same attributes as the one described above. The elements shown include: an egress luminaire 15, an exit luminaire 5, a camera/occupancy sensor 7, an indicator light 21, a wall 19, an adaptor type C 13, an extender 1, a sensing device 6, an IOT device 8, an output device 33 and a bore/knockout opening 24.

The present egress luminaire 15 and exit sign luminaire 5, together forming combo luminaire 10, can be coupled to an extender 1 and an adaptor 11. The volumetric extender 1 provides internal space when additional devices need to be coupled to the luminaire.

The adaptor 13 is configured to couple the combo luminaire 10 flushed to the wall 19 wherein horizontally disposed light modules 4 with rotatable optics illuminate at least one path of egress below and I/O IOT devices 8 coupled enhances the assembly ability to protect life and provide services to other building disciplines inside and outside the building.

FIGS. 6A, 6B, 6C, and 6D show cross-sectional elevations of the egress luminaire coupled to a ceiling 26.

Figure 6A:
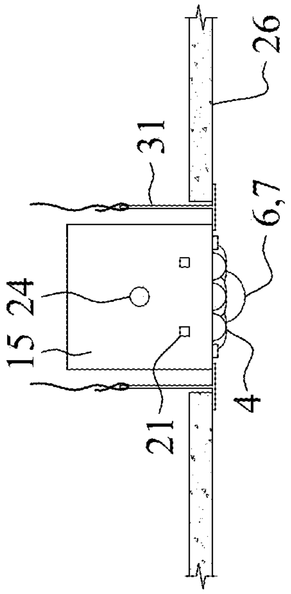
FIGS. 6A, 6B, 6C, and 6D show cross-sectional elevations of the exemplary egress luminaire coupled to a ceiling.
Figure 6B:
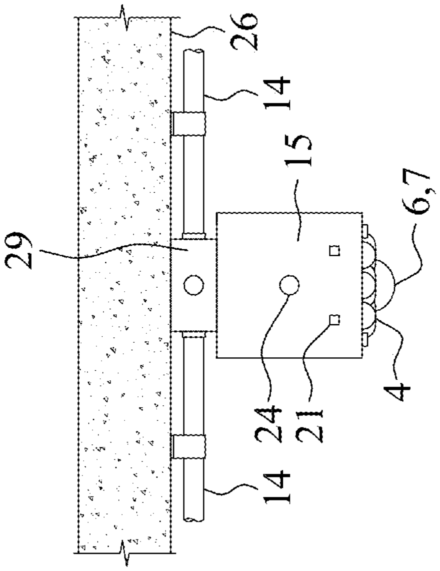

FIGS. 6A and 6B show egress luminaires 15 recessed in T-bar 31 tile ceiling 26. The bottom of the egress luminaires' 15 light modules 4 extend slightly below the ceiling 26 surface. The light modules 4 of the egress luminaire can illuminate up to four paths of egress below. Power or power and data enter the egress luminaires 15 from above, and FIG. 6B shows the egress luminaire 15 coupled to an extender 1 so as to be able to accommodate larger and/or more devices. The elements shown include: An egress luminaire 15, indicator lights 21, bore/knockout opening 24, a camera/occupancy sensor 7, a light module 7, T-bar hanger 31 a ceiling tile 26, and an extender 1.

Figure 6C:
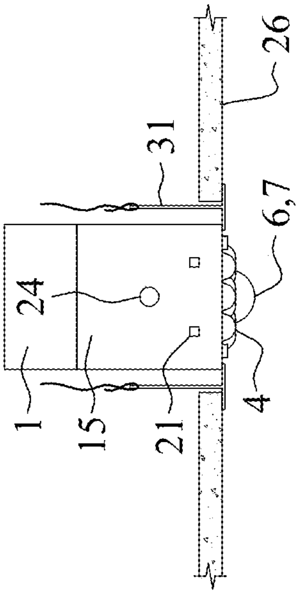
Figure 6D:
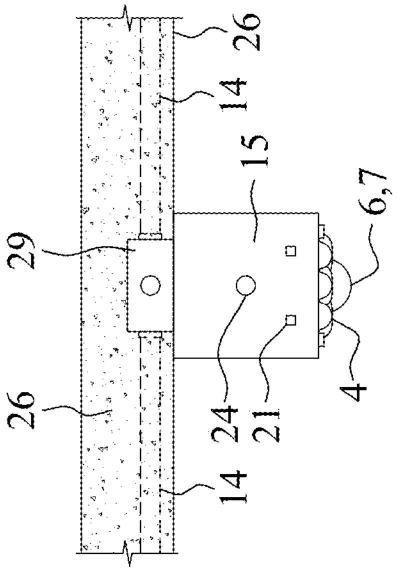

FIGS. 6C and 6D show egress luminaires 15 coupled to a ceiling 26 from below. FIG. 6C shows the egress luminaire coupled to a J-box 29 that is coupled to the ceiling 26, while FIG. 6D shows the egress luminaire flush mounted to the ceiling 26 with a J-box 29 recessed in the ceiling 26. The bottom of the egress luminaires' 15 light modules 4 extend slightly below the ceiling 26 surface. The lights 4 of the egress luminaire can illuminate up to four paths of egress below. In another configuration (not shown) the egress luminaire can be coupled to an extender 1 wherein the extender 1 can be coupled to a J-box 29. The J-box 29 can then be coupled to the ceiling 26 or recessed in the ceiling 26. Power or power and data can reach the luminaire configurations from above and/or below the ceiling 26. The elements shown include: An egress luminaire 15, indicator lights 21, bore/knockout opening 24, a camera/occupancy sensor 7, a light module 7, J-box 29, conduit 14, a ceiling 26, and an extender 1.

Figure 7A:
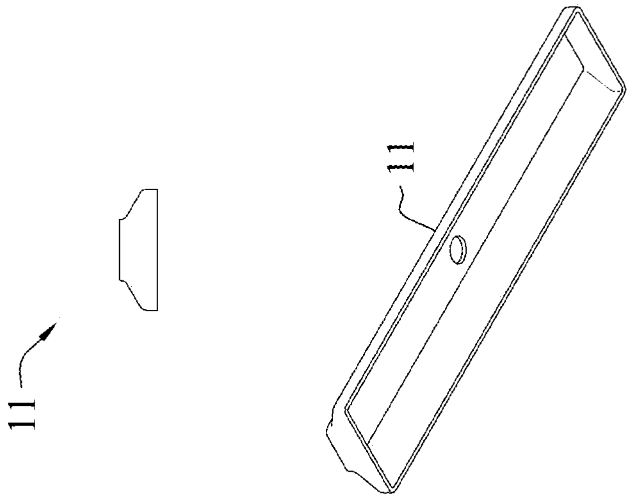
FIGS. 7A, 7B, and 7C show enlarged perspective views of the adaptor's adaptability to adapt to all possible luminaire/s mounting conditions.
Figure 7B:
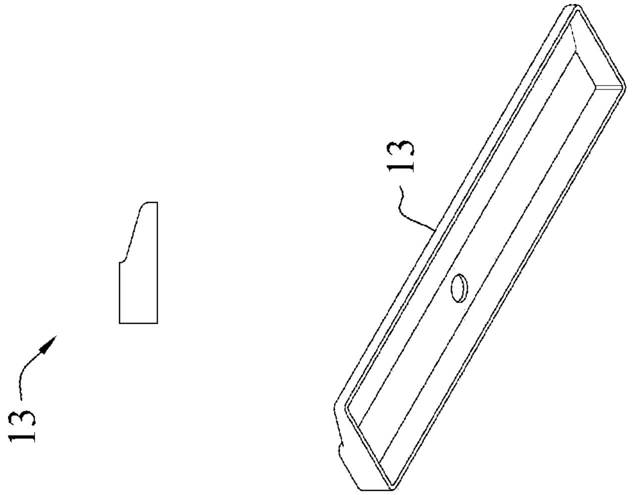
Figure 7C:
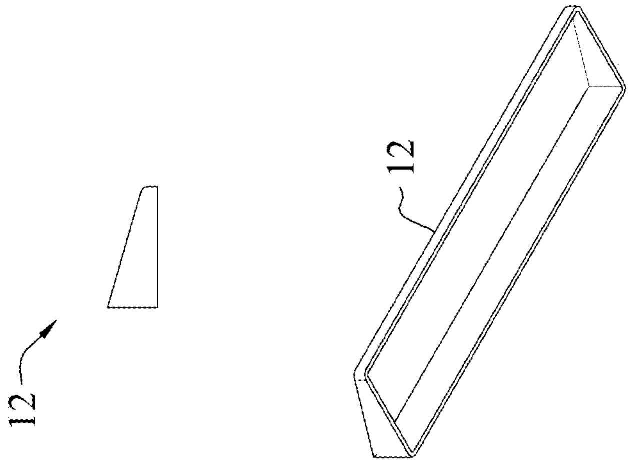

FIGS. 7A, 7B, and 7*c* show enlarged perspective views of the adaptor's ability to adapt to all possible luminaire/s mounting conditions.

FIG. 7A shows profile and perspective views of a symmetrical type A adaptor 11 configured to couple from below to a conduit 14. This configuration assembly is used when the egress luminaire 15, exit sign luminaire 5 or the combo assembly 10 are pendent mounted 34 from the ceiling 26.

FIG. 7B shows profile and perspective views of an asymmetrical type C adaptor 13 that can be used in wall-mounted applications wherein the egress luminaire 15 couples to at least one of: an extender 1 and/or an exit luminaire 5.

FIG. 7C shows profile and perspective views of an asymmetrical pyramid shaped type B adaptor configured to couple to a wall-mounted egress luminaire from above. The material choice for such adaptors type A, B and C can vary between indoor and outdoor applications, and may include plastics, metals, composite materials. The adaptor types B and C 12,13 used with outdoor applications may be configured to withstand the elements, including possession of tamper/vandal proof properties.

Figure 8:
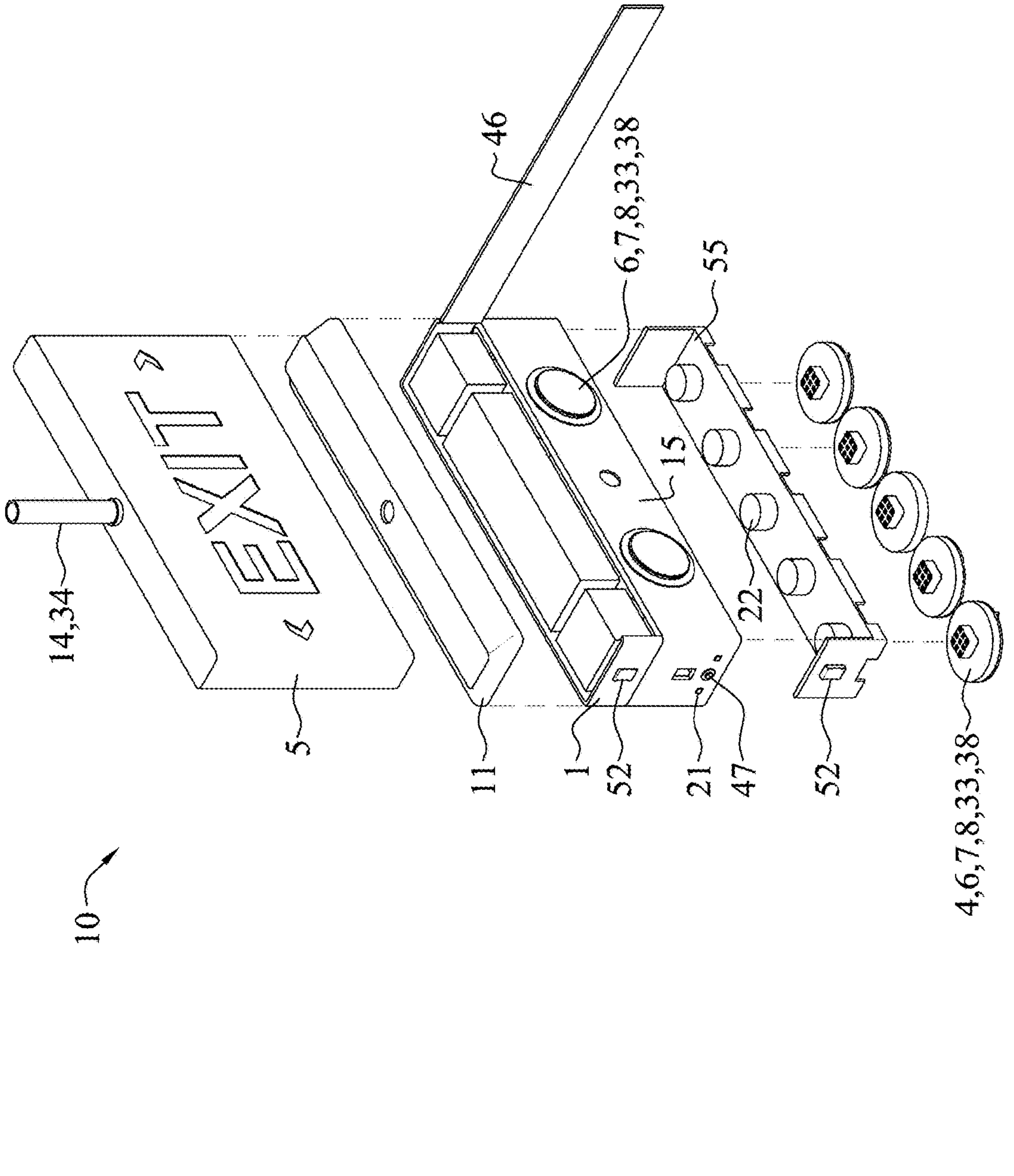
FIG. 8 is an exploded axonometric view of an exit/egress luminaire combo embodiment.

FIG. 8 shows an exploded perspective of an exit/egress luminaire combo 10. Coupled from above to a conduit 14, the elements shown from top to bottom include: an exit sign 5, an extender 1, an adaptor 11, an egress luminaire 15, a device tray 55 with light modules 4, and a camera/occupancy sensor 7 below.

Both the extender 1 and the adaptor 11 show latches 52 coupled to the short walls of each of the elements. The extender 1 shows an extender door 46 open, exposing electronic elements housed inside. These elements can include at least one of: a battery 9, a processor/controller 23, a driver 25, and a charging device 37.

The device tray 55 shows a plurality of power and/or data receptacles configured to couple to an array of IOT devices. These devices can include the light module 4 and the camera/occupancy sensor 7 shown.

The latches 52 of both the extender 1 and the egress luminaire 15 secure the extender door's 46 and the device tray 55 in place respectively. To release the extender door 46 or the device tray 55, one has to exert force by at least one of: pushing, pulling, sliding, and/or twisting at least one of the latches 52. The figure also shows an indicator light 21, a test button 47, and an IOT device 8.

Figure 9:
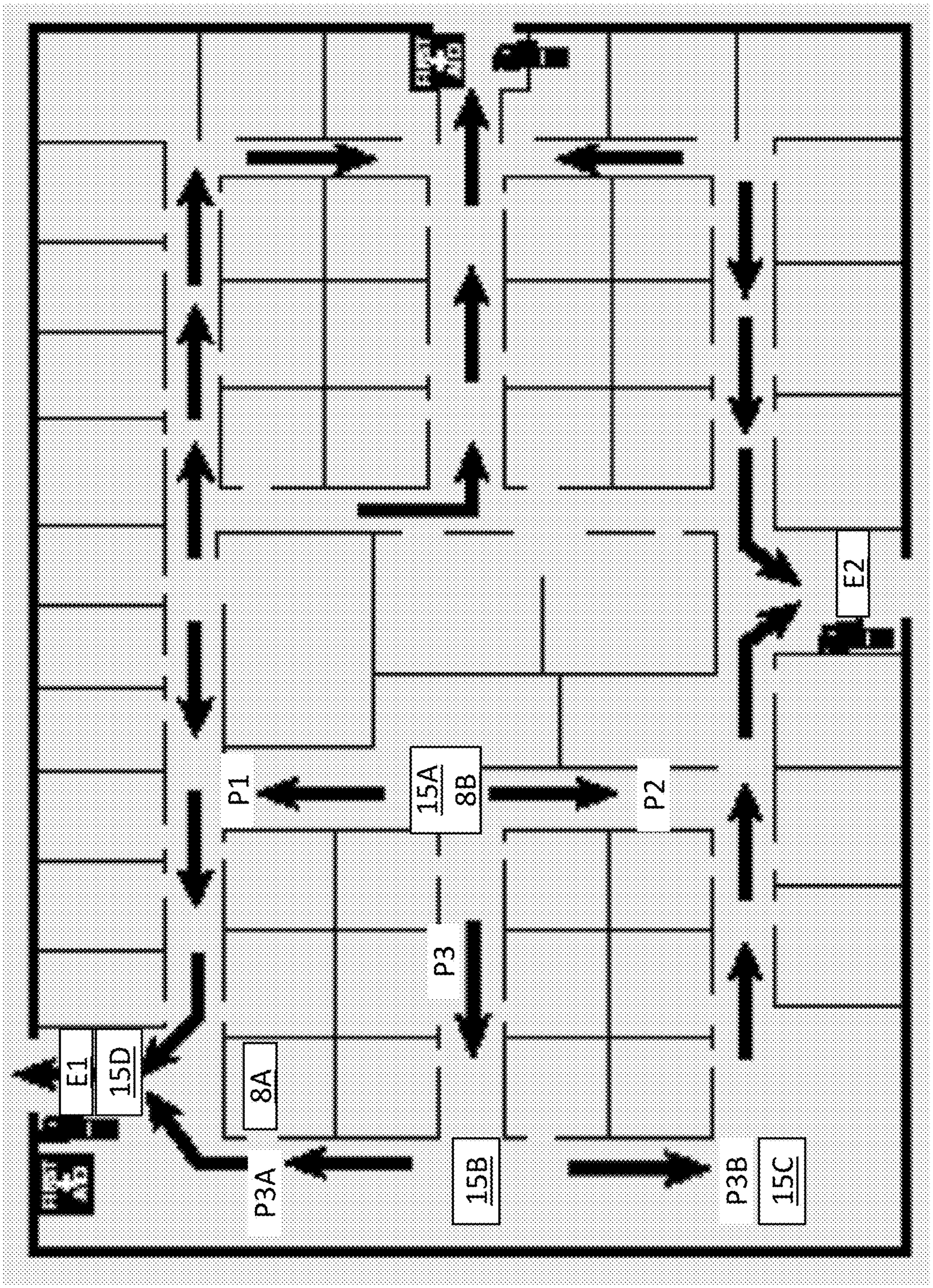
FIG. 9 is a floorplan of a commercial space in which at least one egress luminaire, according to the present disclosure, is provided.

FIG. 9 is an exemplary emergency egress plan showing means of egress for a commercial building, and is shown in a simplified form to complement the descriptions provided in the following figures regarding the application of an AI engine (trained model) to adaptively provide means of egress in the commercial building. In the plan of FIG. 9, exits E1 and E2 are located at South and North sides of the building respectively. Corridors between offices are shown in the plan with arrows pointing along various pre-determined egress routes, leading to an exit. In FIG. 9, 4 different egress luminaires are shown, 15A, 15B, 15C, and 15D. Each of these luminaires is equipped with the directional and reconfigurable light sources and optics to be able to illuminate different paths, depending on how an actual event materializes.

For example, suppose an individual is located near an office along path P1 north of egress luminaire 15A. Normally, supposing an IOT 8B detects a power outage in the building with other alarms sounding in other parts of the building, occupants in this area would normally be directed to exit E1 by following path P1 (the shortest path for this individual to exit E1). Moreover, P1 would be the predetermined path of egress for some in the corridor North of egress luminaire 15A. However, in this situation another IOT, IOT 8A, detects the audio from shots fired by an active shooter at exit E1. In this situation, an AI engine (discussed with reference to the following figures) executed in the computer processor of egress luminaire 15A determines that path P1 is no longer a suitable means of egress under this situation. Instead, the egress luminaire 15A determines that path P2 is a safer means (superior path) of egress out the south of the building at exit E2. The egress luminaire 15A responds by not illuminating path P1 but illuminating the path P2 so the occupant is guided way from exit E1 and toward Exit E2.

On the other hand, it is possible that the IOT 8B visually detects that path P2 is congested with other evacuees. In this situation, egress luminaire 15A communicates (via direct wired communications or wirelessly) with egress luminaire 15B, updating egress luminaire 15B of the congestion along path P2. In response to the recognition that there is an active shooter near exit E1, and that path P2 is congested, the AI engine operating in egress luminaire 15B cooperates with egress luminaire 15C to provide an illuminated means of egress along path P3B. Moreover, egress luminaire 15B chooses not to illuminate the pre-determined means of egress path P3A due to the detection of the active shooter, and instead cooperates with egress luminaire and egress luminaire 15B to provide an alternative path toward exit E2, and thus avoiding the congested path P2 as well as path P3A, which leads toward the active shooter.

The above description is just one example of how an AI based egress luminaire can adaptively provide a safest and most efficient route in an active shooter situation, and/or a situation where certain standard means of egress are overly congested. As was previously discussed, the AI engine is trained to accommodate input from various IOT and other sensors for reacting and adapting to received communications as well as sensor input for temperature, sound, pressure, seismic, facial recognition, light, chemical (e.g., gases such as natural gas, CO, etc.), or toxic substance detection (e.g., sarin gas, radioactive materials).

Figure 10:
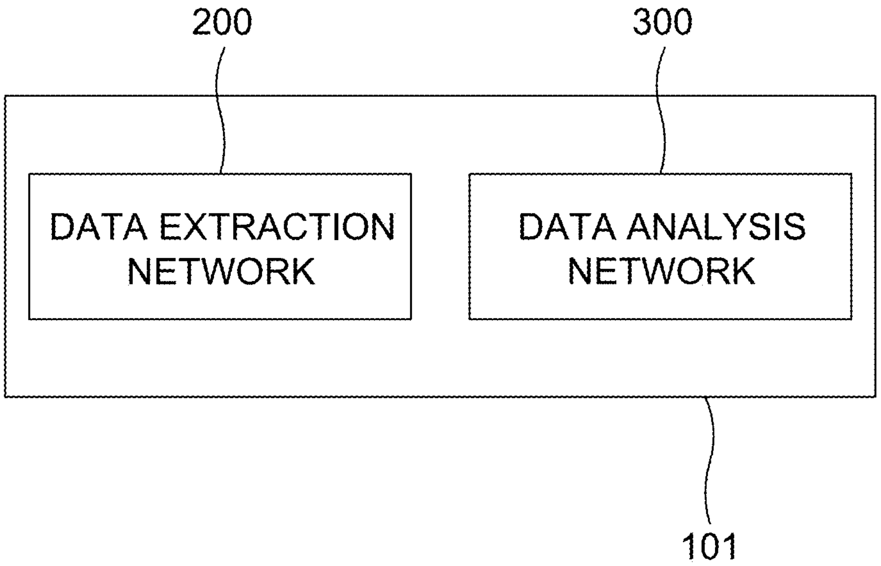
FIG. 10 is a block diagram of a computer-based system that includes two neural networks used to host artificial intelligence (AI) and machine learning processes described herein.

Turning to FIG. 10, an explanation is provided regarding how a computer-based system 101 (which can be implemented with the computer hardware and software previously described with respect to FIG. 1B) determines a best means of egress in varying conditions.

First, by referring to FIG. 10, a configuration of the computing computer-based system 101 will be explained. The computer-based system 101 may include a data extraction network 200 and a data analysis network 300.

Figure 11:
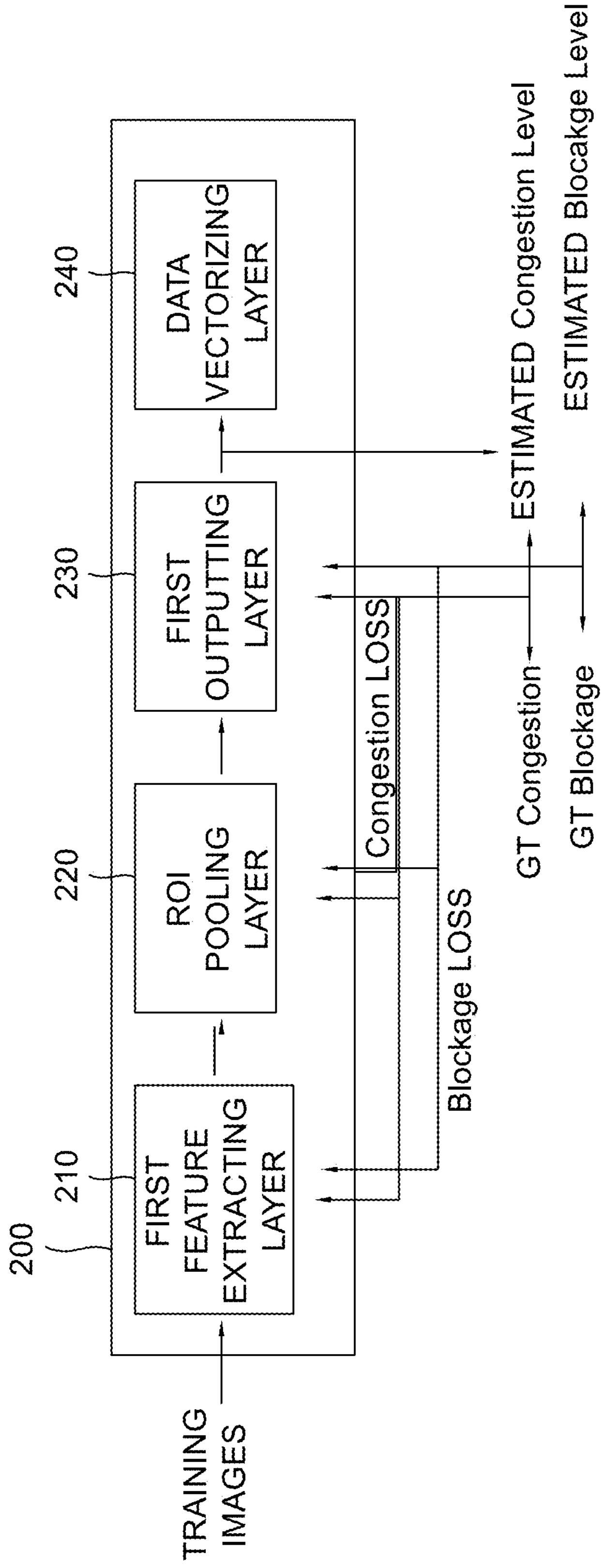
FIG. 11 is a more detailed block diagram of a computer-based data-extraction network shown in FIG. 10.

In reference to FIG. 11, the data extraction network 200 may include at least one first feature extracting layer 210, at least one Region-Of-Interest (ROI) pooling layer 220, at least one first outputting layer 230 and at least one data vectorizing layer 240. And, also to be illustrated in FIG. 12, the data analysis network 300 may include at least one second feature extracting layer 310 and at least one second outputting layer 320.

Below, specific processes of determining the means of egress will be explained.

In this non-limiting example, first, the computer-based system 101 may acquire at least one subject image, perhaps from IOT 8B (FIG. 9). Of course, other input may be used as well such as temperature, sound, pressure, seismic, facial recognition, light, chemical, or toxic substance may be used as well, but in this example, an image (video or still image) is used. The image is of a scene along P2.

After the subject image is acquired, in order to generate a source vector to be inputted to the data analysis network 300, the computing device 100 may instruct the data extraction network 200 to generate the source vector including (i) an apparent human congestion, and (ii) an apparent blockage due to non-human object(s).

In order to generate the source vector, the computer-based system 101 may instruct at least part of the data extraction network 200 to detect the apparent human congestion from the subject image.

Specifically, the computer-based system 101 may instruct the first feature extracting layer 210 to apply at least one first convolutional operation to the subject image, to thereby generate at least one subject feature map. Thereafter, the computer-based system 101 may instruct the ROI pooling layer 220 to generate one or more ROI-Pooled feature maps by pooling regions on the subject feature map, corresponding to ROIs on the subject image which have been acquired from a Region Proposal Network (RPN) interworking with the data extraction network 200. And, the computer-based system 101 may instruct the first outputting layer 230 to generate at least one estimated congestion level and at least one estimated blockage level. That is, the first outputting layer 230 may perform a classification and a regression on the subject image, by applying at least one first Fully-Connected (FC) operation to the ROI-Pooled feature maps, to generate each of the estimated congestion level and the blockage level, including information on coordinates of each of bounding boxes. Herein, the bounding boxes may include human occupants and items identified in images in the hallway.

After such detecting processes are completed, by using the estimated congestion amount and the estimated blockage amount, the computer-based system 101 may instruct the data vectorizing layer 240 to subtract a volume occupied by occupants (and items) to a volume present along path P2 to determine an apparent congestion and an apparent blockage.

After the apparent congestion and the apparent blockage are acquired, the computing device 100 may instruct the data vectorizing layer 240 to generate at least one source vector including the apparent congestion and the apparent blockage as its at least part of components.

Then, the computing device 100 may instruct the data analysis network 300 to calculate an estimated total congestion/blockage by using the source vector. Herein, the second feature extracting layer 310 of the data analysis network 300 may apply second convolutional operation to the source vector to generate at least one source feature map, and the second outputting layer 320 of the data analysis network 300 may perform a regression, by applying at least one FC operation to the source feature map, to thereby calculate the estimated total congestion/blockage. Once trained, the resulting AI engine may use the estimated total congestion/blockage as one layer of the AIs engine (as well as other layers trained to analyze the other parameters discussed herein) as input to the computer-based system 101 in assessing whether the candidate path is superior to the existing egress path. Based on that that assessment, the computer processor 23 and control the egress luminaire to illuminate the superior egress path to a safe exit.

As discussed above, the computer-based system 101 includes two neural networks, i.e., the data extraction network 200 and the data analysis network 300. The two neural networks are trained to perform the processes properly. Below, a more detailed description of how to train the two neural networks will be explained in reference to FIGS. 11 and 12.

First, by referring to FIG. 11, the data extraction network 200 may have been trained by using (i) a plurality of training images corresponding to scenes of the hallway for path P2 for training, photographed from the perspective of the egress luminaire 15A for training, as well as images of various scenes with various people, and objects sometimes in the hallway and other times not in the hallway, and (ii) a plurality of their corresponding ground truth (GT) congestion amounts of people and objects. More specifically, the data extraction network 200 may have applied aforementioned operations to the training images, and have generated their corresponding estimated congestion and blockage levels. Then, (i) each of ground pairs of each of the estimated congestion amounts and each of their corresponding GT congestions and (ii) each of blockage amounts of various items and each of their blockage GTs are referred to, in order to generate at least one congestion loss and at least one blockage loss, by using any of loss generating algorithms, e.g., a smooth-L1 loss algorithm and a cross-entropy loss algorithm. Thereafter, by referring to the congestion loss and the blockage loss, backpropagation may have been performed to learn at least part of parameters of the data extraction network 200. Parameters of the RPN can be trained also, but a usage of the RPN is a well-known prior art, thus further explanation is omitted.

Herein, the data vectorizing layer 240 may have been implemented by using a rule-based algorithm, not a neural network algorithm. In this case, the data vectorizing layer 240 may not need to be trained, and may just be able to perform properly by using its settings inputted by a manager.

As an example, the first feature extracting layer 210, the ROI pooling layer 220 and the first outputting layer 230 may be acquired by applying a transfer learning, which is a known technology, to an existing object detection network such as VGG or ResNet, etc.

Figure 12:
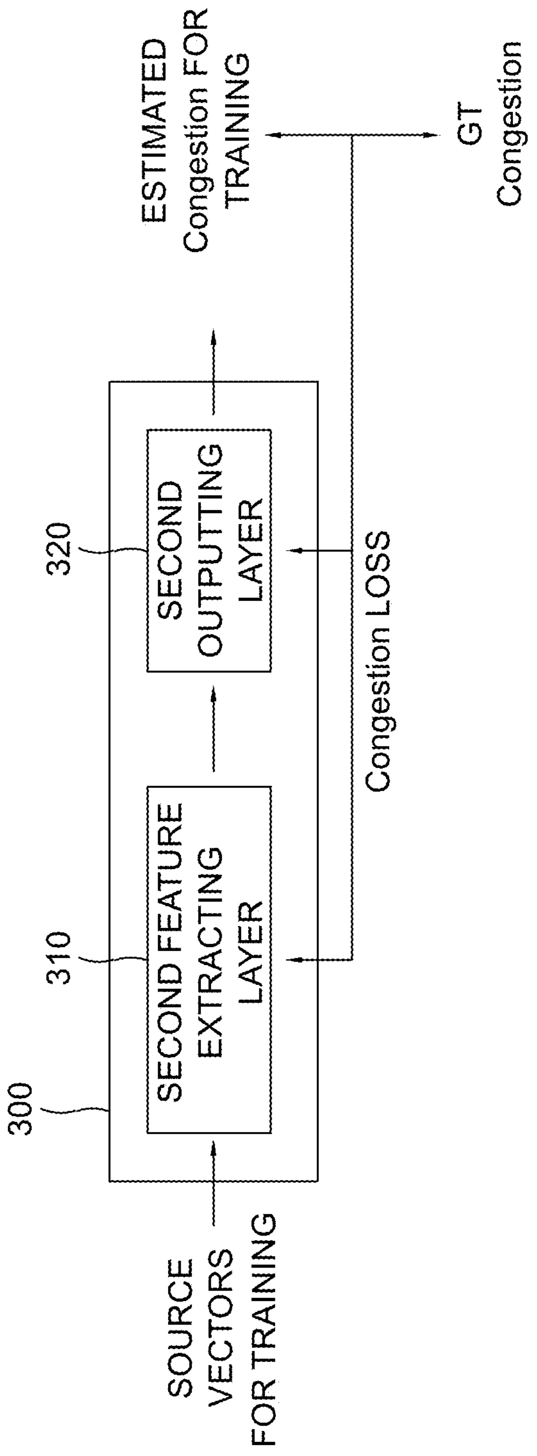
FIG. 12 is a more detailed block diagram of the computer-based data analysis network shown in FIG. 10.

Second, by referring to FIG. 12, the data analysis network 300 may have been trained by using (i) a plurality of source vectors for training, including apparent congestion for training and apparent blockages for training as their components, and (ii) a plurality of their corresponding GT total congestion/blockage. More specifically, the data analysis network 300 may have applied aforementioned operations to the source vectors for training, to thereby calculate their corresponding estimated congestion for training. Then each of congestion pairs of each of the estimated congestion amounts and each of their corresponding GT congestion amounts may have been referred to, in order to generate at least one congestion loss, by using any of the previously discussed loss algorithms. Thereafter, by referring to the congestion loss, backpropagation can be performed to learn at least part of parameters of the data analysis network 300. After the total congestion/blockage is calculated, further training for additional parameters such as temperature, sound, pressure, seismic, facial recognition, light, chemical, or toxic substance may be used as well to further refine the process for adaptively identifying a best means of egress under the circumstances.

After performing such training processes, the computer-based system 101 has trained the AI engine to properly calculate the congestion amount by using the subject image including the scene photographed from the IOT 8B. Moreover, as a consequence of training the computer-based system 101 to implement the AI engine to consider the above described parameters, the AI engine may be used to select certain paths (e.g., path P2 may or may not be selected or not based on the congestion amount as compared to alternative paths, such as P3B, previously discussed) to adaptively identify a best means of egress under the circumstances. The computer-based system 101 selects one or more means of egress by comparing candidate paths that have been evaluated with the AI engine according to the described parameters, and a path (or multiple paths) with the highest evaluation rating, or ratings above a threshold, is/are selected. In response to the selection, the egress luminaires 15 (15A, 15B, 15C) in this example illuminate the selected means of egress (e.g., P3, P3B, and P2) in this example, and optionally egress Luminaire 15D does not illuminate a means of egress, and optionally extinguishes the light source for its exit luminaire so as to prevent inducing an occupant to head toward a safe exit. As discussed above, the AI engine may also be trained to consider other parameters (e.g., fire, gas leak, toxic chemicals, power outages, etc.) beyond congestion and blocking and the processes above may be used to train the AI engine in a similar way.

Hereafter, another embodiments will be presented for determining the total congestion amount.

As a second embodiment, it is considered that the perspective of the camera in the egress luminaire is elevated, and so the image of the hallway is tilted. To account for this factor, the source vector may further include an actual distance, which is a distance in a real world between the camera and the hallway floor, as an additional component of the source vector. For the second embodiment, it is assumed that a camera height, which is a distance between the IOT 8B and a ground directly below the camera in the real world, is provided. This embodiment is same as the first embodiment until the first outputting layer 230 generates a tilt angle to better assess the amount of congestion even though the camera in the IOT 8B is not directly overhead, but takes the image from a tilt. Hereinafter, processes performed after the tilt angle is generated will be explained.

The computer-based system 101 may instruct the data analysis network 300 to calculate the actual distance by referring to information on the camera height, the tilt angle, a coordinate of the lower boundary of the main entrance door, by using a following formula:

$$d_{actual} = \sqrt{\frac{h^2 + h^2\tan^2\left\{\frac{\pi}{2} + \theta_{tilt} - a\tan\left(\frac{y-cy}{fy}\right)\right\}}{1 + \frac{(y-cy)^2}{fy^2}}\left(\frac{x-cx}{fx}\right)^2 + h^2\tan^2\left\{\frac{\pi}{2} + \theta_{tilt} - a\tan\left(\frac{y-cy}{fy}\right)\right\}}$$

In the formula, x and y may denote coordinates of the lower boundary of the floor, fx and fy may denote the focal lengths for each axis, cx and cy may denote coordinates of the principal point, and h may denote the camera height. A usage of such formula for calculating the actual distance is a well-known prior art, thus further explanation is omitted.

After the total congestion/blockage is calculated, further training for additional parameters such as temperature, sound, pressure, seismic, facial recognition, light, chemical, or toxic substance may be used as well to further refine the process for adaptively identifying a best means of egress under the circumstances.

Figure 13:
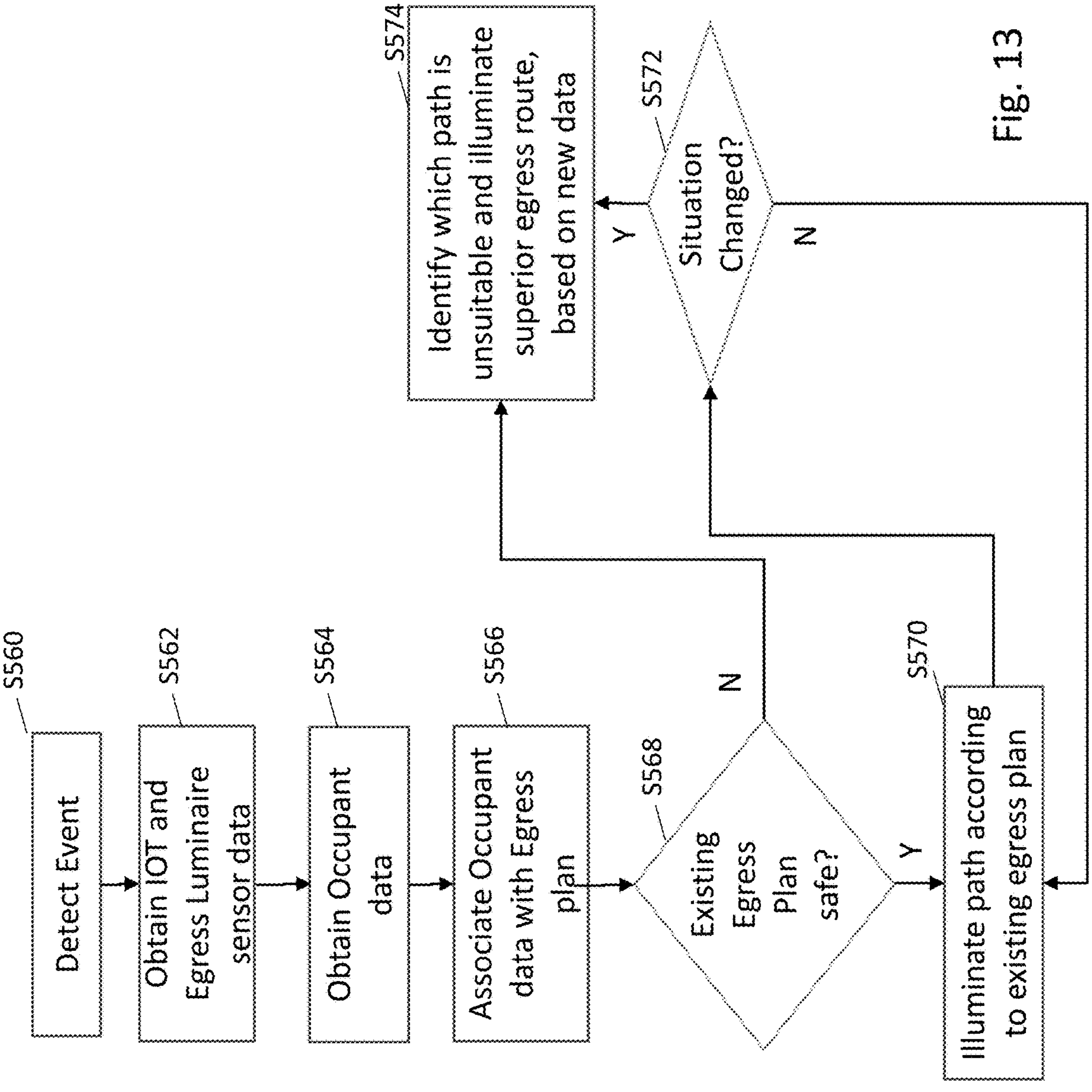
FIG. 13. is a flowchart of a process performed according to an embodiment of the present disclosure to adaptively illuminate a superior means of egress using an egress luminaire according to the present disclosure.

FIG. 13 is a flowchart of a computer-based algorithm performed according to the present disclosure to adaptively control and provide an illuminated means of egress. The process beings in step S560 in which an event is detected by the egress luminaire 15, the IOT 8, another device, or via a command signal from an external device in which occupants are to leave a space, and the egress luminaire 15 is triggered to illuminate a means of egress. The process then proceeds to step S562 in which the egress luminaire 15 receives other data (e.g., image data, sensor data and the like) used as input to the AI engine to identify an appropriate means of egress under the circumstances. The process then proceeds to S564 where additional input is received (optionally) that detects the presence of occupants (e.g., via cameras and/or IR detectors) in areas within the interior space so the egress luminaire 15 can keep track of the occupants and continue to provide superior means of egress for remaining occupants as the situation in the building develops further. Under the condition that occupants are detected, then that occupancy data is associated with a preexisting egress plan in step S566 so the egress luminaire 15 continues to illuminate superior means of egress for those occupants as the situation in the building develops (e.g., movement of fire, movement of active shooter, etc.).

The process then proceeds to a query in step S568 in which a determination is made regarding whether the predetermined (existing) egress plan, along with egress paths that are part of the plan, are sufficient under the circumstances. If the response to the query is affirmative, then the process proceeds to step S570 where the egress luminaire 15 illuminates egress paths according to the existing egress plan. Then the process performs a query in step S572 to determine if the situation has changed (e.g., perhaps an active shooter has moved locations). If not, the process returns to step S570. However, if the response to the query in step S568 is negative, the process applies the AI engine to identify which path(s) is unsuitable (or inferior) to a superior egress route, and then directs the egress luminaire 15 to illuminate that superior egress route. The process optionally continues to check whether the situation has changed that would cause the egress luminaire 15 to identify a new route as a superior egress route under the circumstances and then illuminate that new route.

Figure 14:
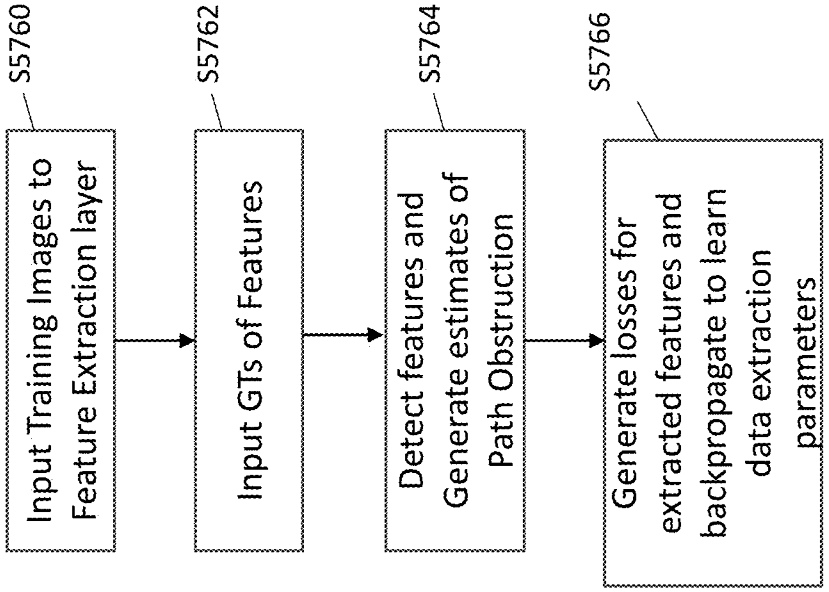
FIG. 14. is a flowchart of a process performed for training an AI engine to detect hallway congestion (or another observed parameter) based on images of hallways, occupants, and objects.

FIG. 14. is a flowchart of a process performed for training an AI engine to detect hallway congestion (or another observed parameter) based on images of hallways, occupants, and objects. The process begins in step S5760 where training images (e.g., images such as images of a hallway that are fully or partially blocked by objects or congested with occupants, or include evidence of other dangerous issues that bear on the decision for which routes should be included/excluded for a superior egress route under the circumstances) are applied as a feature extraction layer where features are detected in the images, such as the bounding boxes showing selected features from images. The process then proceeds to step S5762 where ground truth (GT) images are input to the data extraction network in step S5762. Then in step S5764 estimates are generated for the detected features, and in step S5766 losses are generated for the extracted features, with respect to the GTs, and back-propagated so as to learn the data extraction parameters of the data extraction network.

Figure 15:
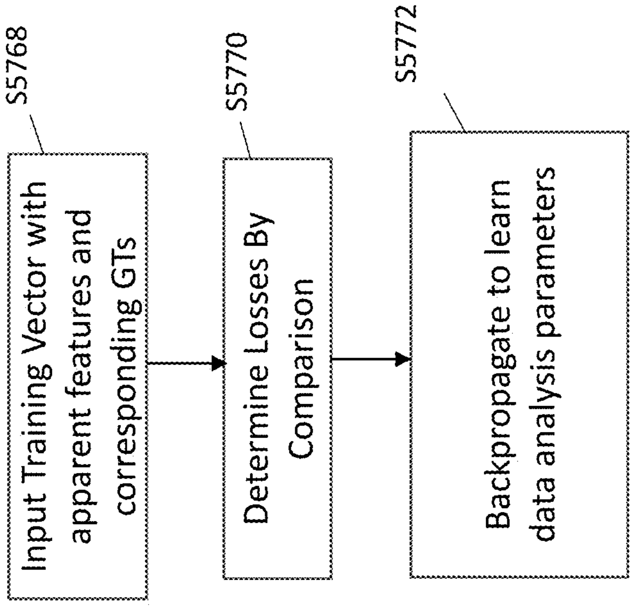
FIG. 15 is a flowchart of a process that uses the trained AI engine for detecting hallway congestion based on input images of at least the hallway possibly other parameters as well.

FIG. 15 is a flowchart that corresponds with the training of the data analysis network of the AI engine as previously discussed. The process begins in step S5768 where a training vector is input with respect to apparent features as well as corresponding vectors that are GTs. In step S5770 the losses for the parameters are determined by comparison, and then in step S5772 the losses are back-propagated so as to learn the data analysis parameters of the data analysis network.

FIGS. **16*a*1, 16*a*2, 16*a*3, 16*a*4, 16*b*1, 16*b*2, 16*b*3, 16*c*1, and 16*c*2 as orientations of light modules included in receptacles and non-lit devices in receptables. Moreover, FIGS. 16*a*1, 16*a*2, 16*a*3, 16*a*4, 16*b*1, 16*b*2, 16*b*3, 16*c*1, and 16*c*2 show light zone coverage configurations for egress luminaires 15 with three and five receptacles 22. Each receptacle 22 may be a power or power and data floor facing receptacle 22. While the present embodiment shows 3 and five receptacles 22, it should be understood that two, three, four, five, six, seven or eight receptacles 22 maybe hosted by the luminaire housing, either on a bottom surface thereof and/or one or more side surfaces. For economic reasons, the luminaire embodiment with three-receptacles is expected to be used more extensively in industry. The luminaire with 15 the five floor facing receptacles 22 offers greater flexibility in conditions where three- and four-way paths of egress are needed. Although the egress luminaire 15 may have 3 or 5 (or another number) of receptacles 22, not all of the receptacles 22 need to be populated with a light module 4 or a non-lit powered device 6, 8, 33**.

FIGS. **16*a*1, 16*a*2, 16*a*3 and 16*a*4 show light zone coverage by five floor facing egress luminaire receptacles 22. FIG. 16*a*1 shows the luminaire 15 with a center receptacle 22 that can be coupled to a non-lit device 6, 8, 33. This device 6, 8, 33 can include a sensing and/or another output device. All devices coupled to the receptacles 22 can detachably attachable and are configured to receive power and/or power and data (including bidirectional data, such as via wireless transceiver. FIG. 16*a*2 shows the luminaire 15 with a sensing device and two light modules 4 coupled to different receptacles 22. The light modules 4 in this illustration can rotate about their vertical axis up to 180 degrees each. Together the light modules 4 provide 360 degrees rotational zone coverage capability below the luminaire 15. FIG. 16*a*3 shows the luminaire 15 with a sensing device 6 and three light modules 4 coupled to corresponding receptacles 22. This light module configuration is most suited to a configuration where the path of egress branches-off at 90 degrees to another path (similar to the letter T). Nonetheless, given the rotational mobility of 360 degrees, the light modules 4 in at least one configuration can be at 120 degrees to one another, or any other angle between 1 degree and 360 degrees. In one embodiment, each receptable 22 includes a stepper motor that drives a rotation of the light module 4, or rotation of the receptacle 22 that hosts the light module. The stepper motor (one for each receptacle) receives a rotation command from the processor previously discussed with respect to FIG. 1B. Thus, the position, and repositing, of the rotated position of any of the light modules (or non-lit devices) is remotely controllable via communications to/from the processor, which in turn drives the stepper motor (or other type of active device that is able to rotate the receptable and/or light module and/or lens of the light module). FIG. 16*a*4 shows the luminaire with a sensing device and four light modules 4 coupled to the luminaire via a corresponding receptacles 22. This light module configuration is most suited to a configuration where the path of egress includes two orthogonal portions, which cross each other at 90 degrees so as to provide a portion of an illuminated path of egress in four directions (similar to the symbol +). Nonetheless, given the rotational mobility of 360 degrees, the light modules 4** in at least one configuration can be, manually or via motor positioning, set at 90 degrees to one another.

FIGS. **16*b*1, 16*b*2 and 16*b*3 show light zone coverage by three floor facing egress luminaire receptacles 22. FIG. 16*b*1 shows the luminaire 15 with a center receptacle 22 that can be coupled to a non-lit device 6, 8, 33. This device can include a sensing and/or another output device. All devices coupled to the receptacles 22 can be detachable and are configured to receive power and/or power and data (including bidirectional data, such as via wireless transceiver. FIG. 16*b*2 shows the luminaire 15 with a sensing device 6 and one light module 4 coupled to respective receptacles. The light modules in this illustration can be placed in the best suited receptacle (as deemed by an installer) to cover the path of egress below. The receptacles 22 are compatible with all of the light modules and non-lit devices, and so their positions may be exchanged as needed or desired. In this example, the light module 4 can rotate 180 degrees about its vertical axis. As was previously discussed, any of the light modules or receptacles as discussed in this document need not be manually rotated, but may also be rotated by an active device such as a motor controlled by a processor. FIG. 16*b*3 shows the luminaire 15 without a sensing device and three light modules coupled thereto via receptacles 22**. This light module configuration is most suited to configuration where the path of egress branches-off at 90 degrees to another path (similar to the letter T). Nonetheless, given the rotational mobility of 360 degrees, the light modules in at least one configuration can be at 120 degrees to one another.

FIG. **16*b*3 shows the luminaire 15** with a sensing device and two light modules coupled. Since the light modules in this illustration can rotate about their vertical axis up to 180 degrees each, together the modules have 360 degrees of rotational zone coverage capability. This light module configuration is most suited to configuration where the path of egress is linear using back-to-back asymmetrical light modules or diverges (branches-off) at 90 degrees to another path (similar to the letter L). Nonetheless, given the rotational mobility of 360 degrees, the light modules in at least one configuration can be at 120 degrees to one another or any other rotational angle needed to cover a non-continuous linear path of egress below the luminaire.

The above illustration shows a few of numerous configurations for the light module's orientation, quantities, light power input, lens optical pattern, and quality of the light emitted by the light modules. In addition, these configurations can be in conjunction with other sensing and output devices. The devices can be coupled to at least one receptacle facing the floor, at least one receptacle coupled to a side wall of the luminaire housing, or a combination thereof.

FIGS. 16c1 and 16c2 show the 3 and 5 receptacles luminaires with an exit luminaire coupled to the middle floor facing receptacle. It should be noted that the horizontally disposed lenses of the light module coupled to the egress luminaire do not mask the full view of the exit sign 5. The rotational capability coupled with the light module horizontal lens placement above the exit sign 5 is a novel solution for the egress/exit "combo luminaire". Further, it should be noted that for example a three receptacle "combo" luminaire by a door can be coupled to one light module, one exit luminaire, and one sensing device. Positioned by a legal egress door, the luminaire can then provide an illuminated egress pathway with an egress exit signage and sensing device alerting/recording events in the door's vicinity.

Figure 17B:
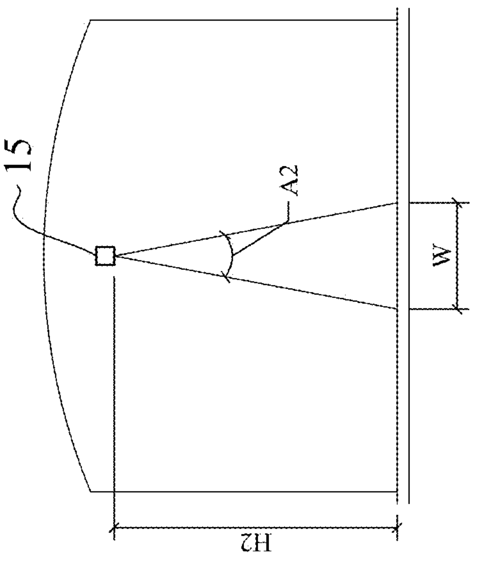
FIG. 17A and FIG. 17B, which illustrate a relationship between luminaire installation height, traverse beam angle, and width of path of egress.
Figure 17A:
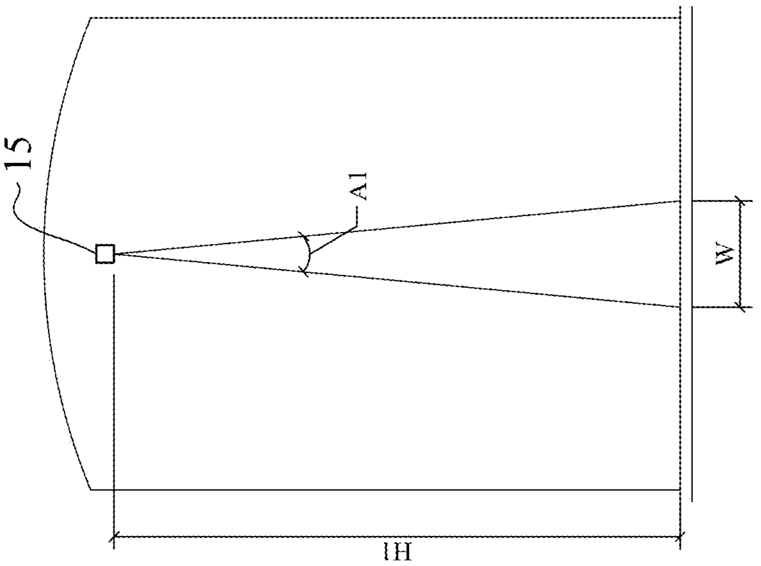

FIG. 17A and FIG. 17B show an egress luminaire light module transverse beam angle light dispersion at a different mounting height of like luminaire 15. FIG. 17*a* shows a cross-section of a tall open structure with an egress luminaire 15 in proximity to the ceiling, the distance from the floor to the bottom egress luminaire 15 represented by dimension H1. At least one light module coupled to the luminaire 15 illuminates a path of egress on the floor. The path of egress is required to maintain no less than 0.2 FC for a duration of 90 minutes when house power is interrupted. The minimum light level for the path of egress is adjustable (via changing adjustment of lamp driving power, directivity of lens optics, and/or orientation of lens optics, for example) to be from 0.1 FC to 1 FC and or any light level therebetween. In one embodiment, a wireless light meter (or a grid of wireless light meters) is placed on the floor and provides real time feedback to an installer who can then adjust the power/lens optics/module orientation to provide the minimum light levels. The path must be sufficiently wide for at least one person to find his/her way to a legal egress door. In some jurisdictions the path's width is determined by the building occupant load and/or the use.

Furthermore, the egress luminaire 15 is one of a network of luminaires that collectively illuminate a path of egress. As discussed with respect to FIG. 17*a* and FIG. 17*b*, the traverse beam angle of light emitted from a particular light module, or combination of light modules, is a function of installation height, output level of light from the module(s), and directivity of the optics. A ratio of luminaire spacing to mounting height ratio of at least 2:1 is provided for the network of luminaires at the time of installation so as to provide (collectively) a minimum light level of 0.2 FC along the path of egress. The light output, transverse beam width, orientation of the light module, and optics are adjustable variables available for maintaining or exceeding the minimum light levels along the path of egress.

The luminaire housing of the present disclosure is independent from the luminaire mounting height. The transverse light beam pattern is determined by the luminaire's mounting height and the required path of egress width. FIG. 17*b* shows a similar open structure with a lower ceiling with the same occupant load and/or use, the distance from the floor to the bottom egress luminaire 15 represented by dimension H2. Both drawings are drawn to the same scale. As shown the luminaire of FIG. 17*a* mounting height is significantly higher than the luminaire shown in FIG. 17*b*. It is evident from the side-by-side figures that the width of the path of egress is the same. It is also evident that the higher mounted luminaire shown in FIG. 17*a* displays a sharper transverse beam angle that upon reaching the floor, illuminates the same or similar egress pathway width to the light emitted by the lower mounted luminaire of FIG. 17*b*. Maintaining the same or similar light levels is accomplished by altering at least one of the light module's: lens transverse beam angle, power input to the lamp, number of lamps, and the lamp's efficacy. In using detachable light modules, the same luminaire can be mounted between 1'-0" to 80'-0" above finish floor.

Figure 18:
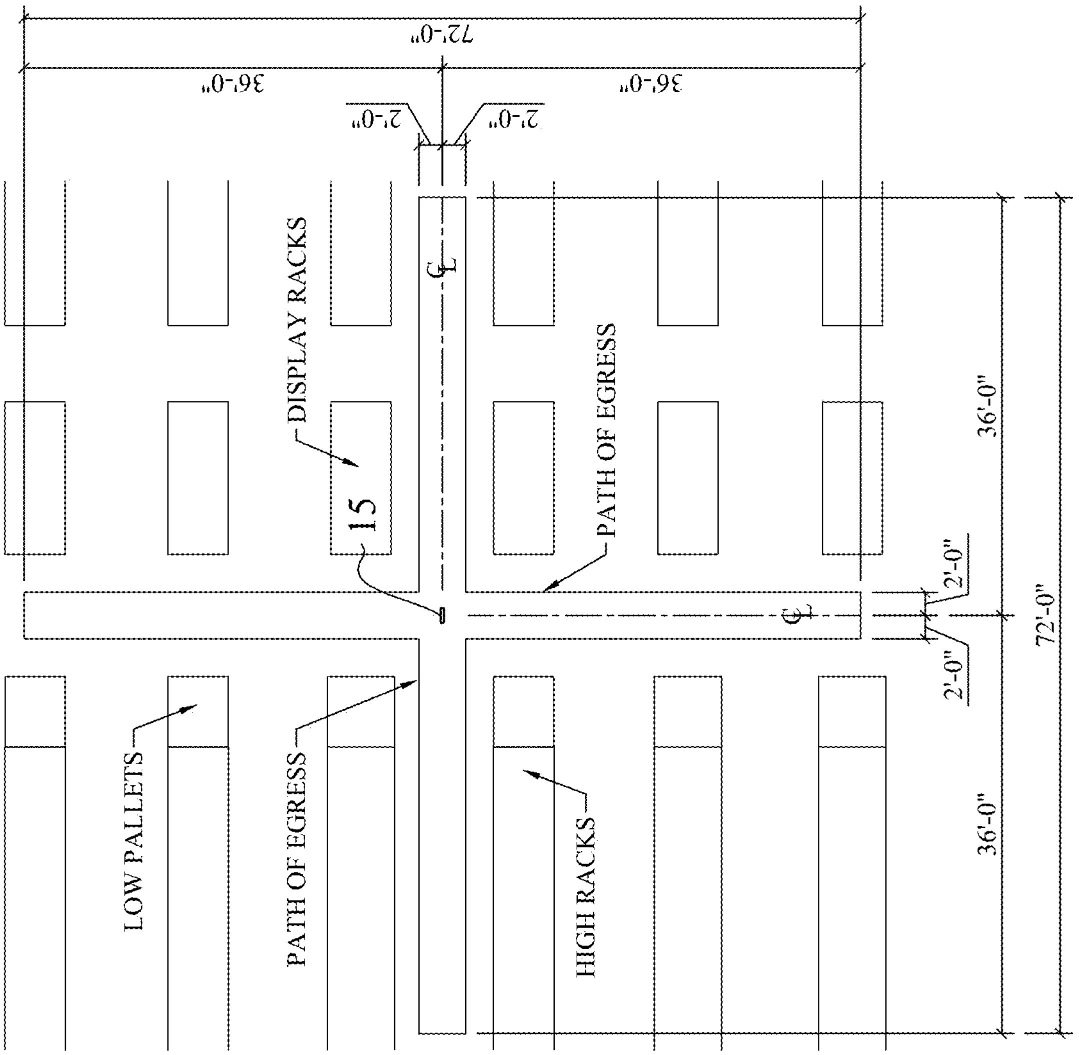
FIG. 18 is an overhead view from the perspective of an egress luminaire installed on the ceiling of a warehouse, and illustrating how the directivity of the traverse light beam may be set to illuminate a path of egress in more than one direction (e.g., North/South, and East/West).

FIG. 18 shows a single egress luminaire coupled to four light modules illuminating four distinct paths of egress in a typical "big box" retail store. The store floor furniture includes high racks with products on low pallets abutting at the short ends of the racks and display tables at the opposite side of the main aisle. The paths shown in this figure are configured at 90 degrees to one another. In addition, by utilizing a five-receptacle luminaire the path can be formed with an exit sign coupled to the center receptacle as described in FIG. 16c2. The present figure egress luminaire mounting height shown is 23'-0" above floor. The four asymmetrical light modules configured back-to-back illuminate two path of egress crossings at 90 degrees paths of egress, each path approximately 72 ft long and four feet wide. The illumination level is configured to maintain code required minimum light levels for a duration of 90 minutes. This egress path configuration power consumption can be as little as 28 W. Coupled to an exit luminaire the "Combo" luminaire power consumption can be as low as 32 W. The five receptacle luminaire's versatility reduces the number of ceiling mounted luminaires that in turn reduces the installation and maintenance costs of a building illuminated means of egress.

Figure 19:
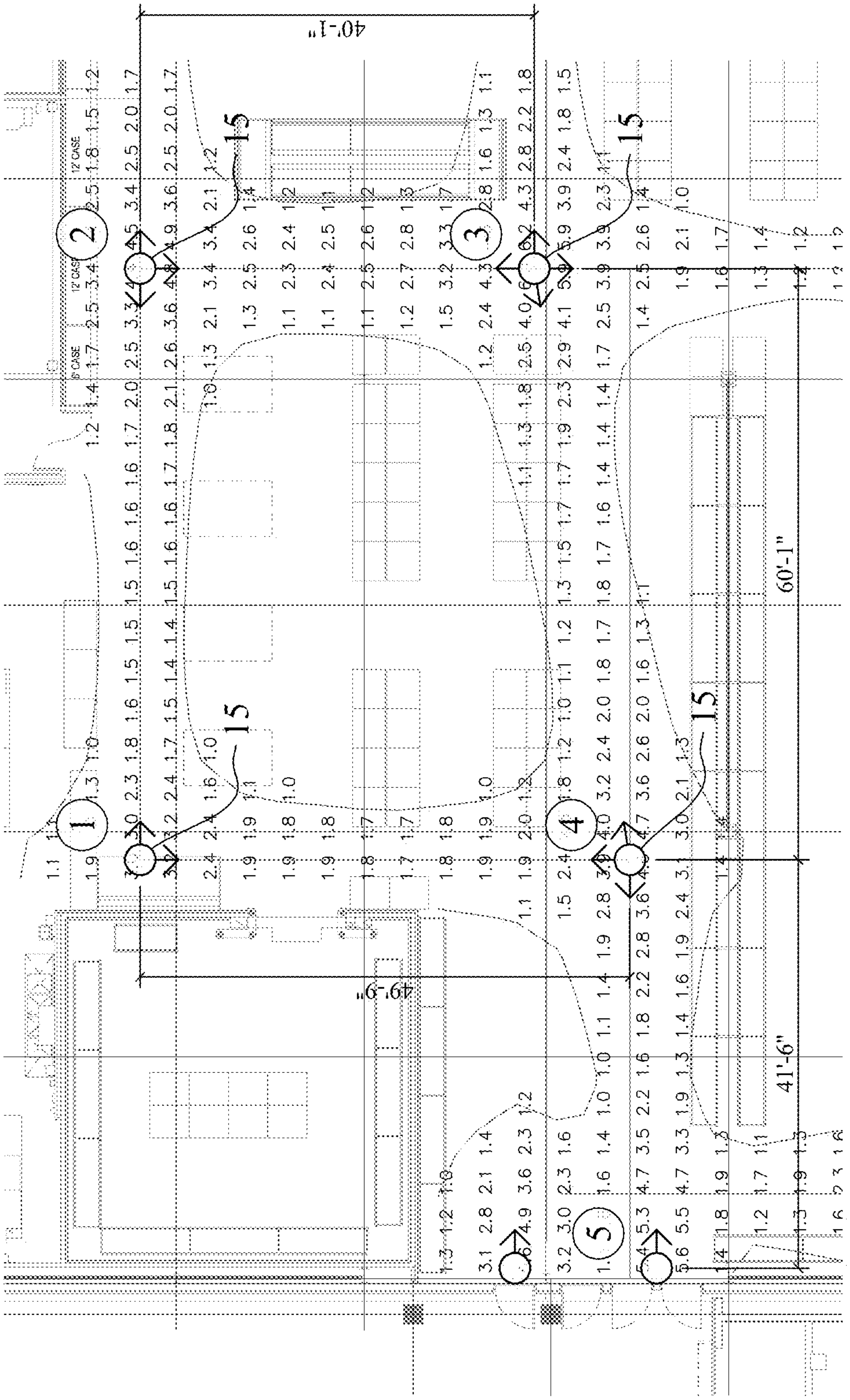
FIG. 19 is a more detailed illustration of an overhead view from the perspective of an egress luminaire that includes partial building egress light photometry at a floor level based on light emitted from a set of egress luminaires distributed at predetermined locations on a ceiling of a warehouse.

FIG. 19 shows a partial building egress light photometry at floor level with egress luminaires using different light modules and different light modules orientation. The luminaires' mounting height in this figure is also 23'-0" as in FIG. 18, and the spacing between the luminaires is as shown. Luminaire 1 is coupled to two light modules oriented at 90 degrees to one another to form a path of egress below with a light pattern arrangement similar to the letter L. Luminaire 2 is coupled to two light modules disposed back-to-back to form a straight 180 degree egress path of egress below. Luminaire 3 is coupled to four light modules. Three of the light modules are at 90 degrees to one another to form a path of egress below with a light pattern similar to the letter T. The fourth light module illuminates a skewed path of egress and is oriented toward luminaire number 4. Luminaire 4 is coupled to three light modules that are at 90 degrees to one another to form a light pattern arrangement similar to the letter T. The present figure demonstrates just a few among a number of possible light module configurations alone, coupled to an exit luminaire, and/or at least one sensing and/or output device.

Figure 20B:
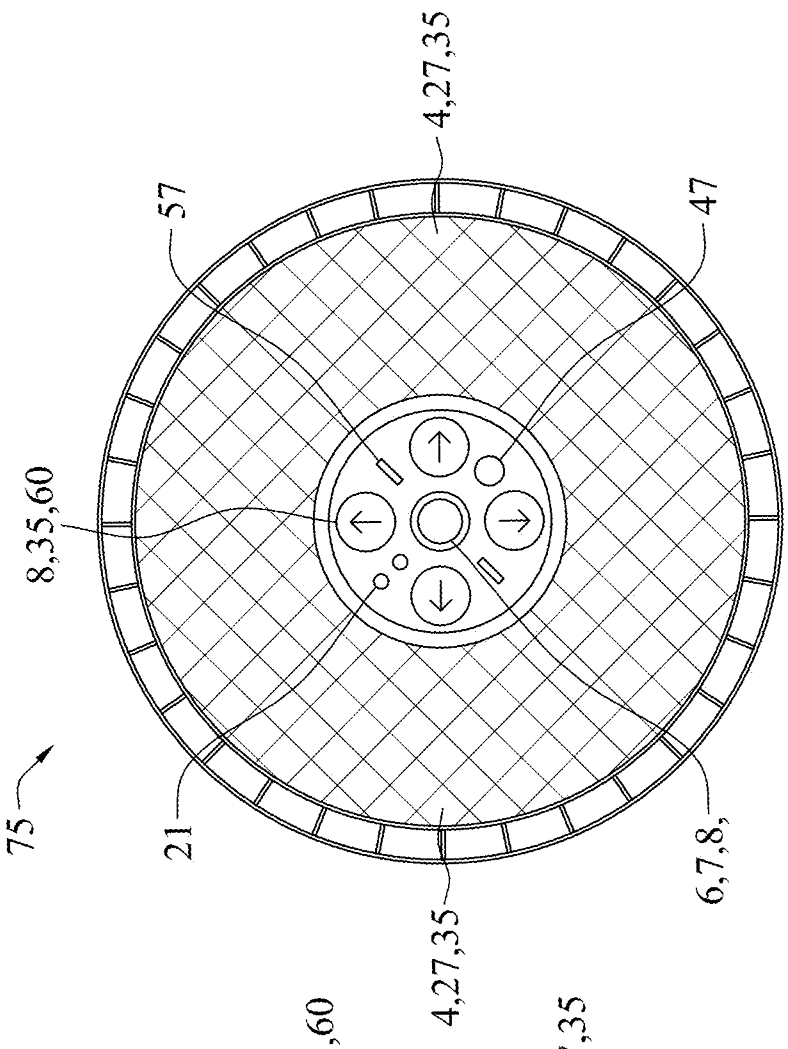
FIGS. 20A and 20B show bottom views of 2'-0"×4'-0" and round high bay ambient lighting luminaires with egress light modules coupled.
Figure 20A:
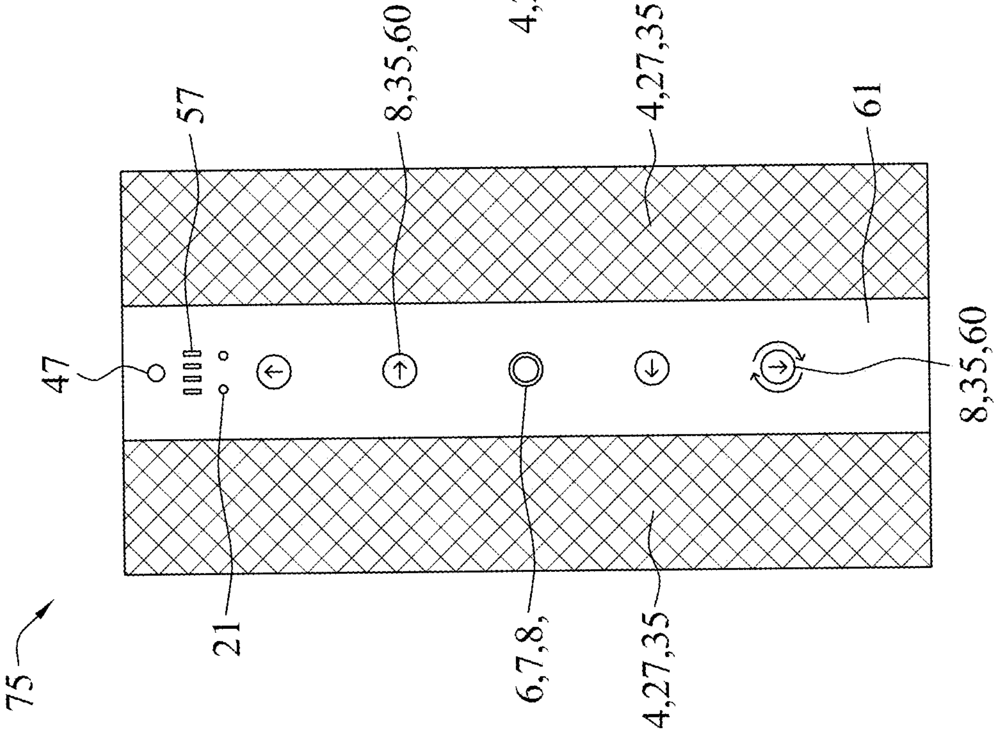

FIG. 20A shows in a partial reflective ceiling plan a bottom view of a 2'-0"×4'-0" ambient lighting luminaire with an egress light module 60 coupled forming an ambient/egress lighting luminaire 75. The bottom surface of the luminaire 75 is facing the room side. The luminaire 75 can lie in a T-bar ceiling grid or can be suspended from a structure above. FIG. 20A shows a rectangular surface extending along the center of the luminaire from end to end with an optical lens 35 on both sides of the rectangular surface. Behind the lenses 35 are the ambient lighting luminaire light sources 27. The light sources 27 of the ambient lighting luminaire and the ambient/egress lighting luminaire 75 are configured to receive power from a primary power source.

The rectangular surface extending the length of the egress/ambient lighting luminaire 75 can be a luminaire housing cover 61 that can retain and/or conceal at least one electronic device. The electronic device can be coupled to the housing interior and/or the cover 61. FIG. 20A shows five round devices coupled to the rectangular surface 61, according to some embodiments. Four of the round devices shown can be configured as emergency egress light modules 60, for example, and one of the round devices can be a camera 7 located at the center of the rectangular surface, according to some aspects of the disclosed subject matter.

In some embodiments, the emergency egress lighting light sources 60 and/or the camera 7 can be coupled to universal receptacles. The universal receptacles can convey power or power and data. The present arrangement shows an arrow on the lens 35 of the egress light modules 60 indicating the direction of the light emitted by the lens 35 directional optics, according to some embodiments. The other elements shown in FIG. 20A include at least one of: a switching device 57, a testing button 47, and an indicator light 21, according to one or more aspects of the disclosed subject matter.

The ambient/egress lighting luminaire 75 can be coupled to and supported by a plurality of IOT devices 8. At least one other than the devices aforementioned can provide utility under primary and/or secondary power. The secondary power can include the auxiliary power 9 (e.g., battery), the inverter 2, or the generator 36. In addition, at least one device can operate under primary and secondary power. Further, the type of utility and performance characteristics of the device operating under primary and secondary power sources can be different.

The ambient/emergency lighting luminaire 75 emergency egress light module 60 can receive power from a coupled power supply or from a remote location. The coupled power supply can be coupled to the ambient/emergency lighting luminaire 75 from inside the housing, coupled to an exterior surface, or placed in the vicinity of the luminaire. Other devices coupled to the ambient/emergency lighting luminaire 75 can include a processor/controller (e.g., computer processor 23), with resident memory (e.g., memory 40), and code (e.g., program 32), a communication device (e.g., transceiver 3), a sensory device (e.g., camera 7), and an output device 33 (e.g., the emergency egress light modules 60).

The form of the ambient/emergency lighting luminaire 75 and the housing's cover 61 surfaces retaining the electronic devices of the luminaire can vary. The electronic devices and more particularly devices coupled to the ambient/emergency lighting luminaire 75 that are associated with a building means of egress lighting can include an automatic and/or manual power supply testing device subjecting the emergency egress lighting devices to periodic testing. In some embodiments, the power supply testing device comprises the testing button 47 and an indicator light(s) 21 showing the emergency lighting readiness mode. In a different embodiment the automatic power supply self-testing device can be remotely located.

FIG. 20B shows in a partial reflective ceiling plan the bottom view of a round ambient/emergency lighting luminaire 75 (e.g., a round high bay ambient lighting luminaire 18) with egress light modules 60 coupled. The bottom surface of the now ambient/egress lighting luminaire 75 is facing the room side (i.e., interior space of the room). The round formed luminaire can be used in medium and high luminaire mounting applications. As with the rectangular shaped ambient/egress lighting luminaire 75, the round formed luminaire can couple to at least the same IOT devices 8 and can provide equal utility for both the ambient and the emergency egress lighting illumination.

According to some embodiments, the round ambient/emergency lighting luminaire 75 includes four emergency lighting light sources 60 showing directional arrows, an occupancy sensor 7, an indicator light 21, a manual test button 47, and a switching device 57. According to some aspects of the disclosed subject matter, a wireless or wired communication device can be coupled to the ambient/egress lighting luminaire 75. In some embodiments, an antenna is coupled to the communication device (e.g., transceiver 3) and/or coupled to the ambient/egress lighting luminaire 75 housing exterior.

At least one processing/controlling device (e.g., processor/controller 23) can be coupled to the ambient/egress lighting luminaire 75 housing's interior. As with the rectangular shaped ambient/egress lighting luminaire 75, the round shaped ambient lighting luminaire coupled to the emergency egress light module 60 can have at least one integral secondary power source coupled or can receive power from a secondary remote power source. Furthermore, as with the rectangular shaped ambient/egress lighting luminaire 75, the round ambient/emergency lighting luminaire 75 (e.g., a round high bay ambient lighting luminaire 18) and the ambient/egress low and high bay luminaire 75 can have shapes other than a round form.

Figure 21B:
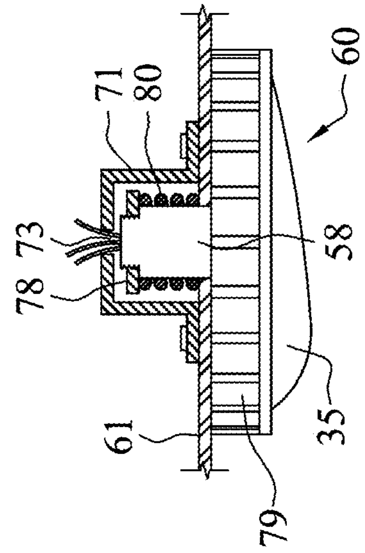
FIGS. 21A, 21B, 21C and 21D show partial sections and bottom face elevations of ambient lighting luminaires with coupled emergency egress light module receptacles for a detachable and fixed light source.
Figure 21D:
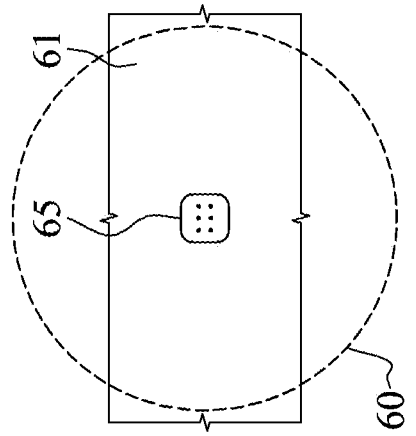
Figure 21A:
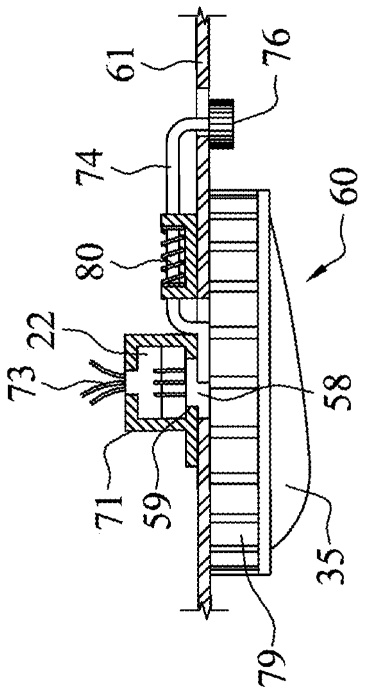
Figure 21C:
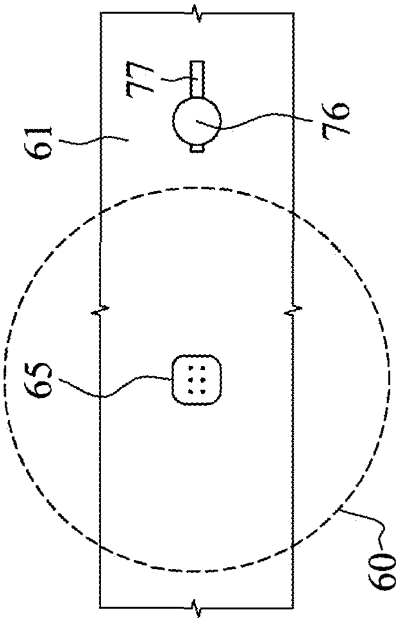

FIGS. 21A, 21B, 21C and 21D show partial cross-sections and bottom face elevations of an ambient lighting luminaire with coupled emergency egress light module 60 receptacles for detachable and fixed light sources. FIG. 21A is a cross-sectional view through an ambient lighting luminaire with a coupled emergency egress light module 60 according to some embodiments. FIG. 21B is a cross-sectional view through an ambient lighting luminaire with a coupled emergency egress light module 60 according to some other embodiments. FIGS. 21C and 21C show bottom face elevations of the ambient lighting luminaire with coupled emergency egress light module 60 receptacle of FIGS. 21A and 21B, respectively.

FIG. 21A shows a partial section and FIG. 21C shows a partial plan view of the emergency egress light module 60 universal receptacle 65 coupled to an ambient/egress lighting luminaire. The same type of universal receptacle 65 can also couple to other IOT devices. The present figure shows an arrangement for a detachable egress light module 60.

A receptacle can couple to an ambient lighting luminaire 18 and can be configured to provide egress lighting illumination by being powered from a primary and/or a secondary power source. FIGS. 21A-21D show a universal receptacle 65 that can provide power or power and data to at least one egress light module 60 and at least one IOT device. The universal receptacle 65 can be scalable and configured to couple to at least one of: input, output, communication, and processing/controlling device/s.

The figures show in elevation and partial section (from the bottom of the luminaire housing) a mechanical means to secure a detachable emergency lighting light source 60 to a universal receptacle 65 that is coupled to an ambient/emergency lighting luminaire. The universal receptacle 65 can be incorporated into a luminaire at a factory or fitted onsite.

It is imperative that the coupled emergency light source 60 turns on immediately in the event of primary power interruption. Therefore, the means of mechanically and electrically coupling the emergency light source to the receptacle must be dependable.

FIG. 21A shows the emergency egress light module 60 with heat dissipating fins 79 disposed at the back side. The fins 79 of the emergency egress light module 60 are shown in contact with the surface of the light emitting side of the luminaire. A central stem 58 aligned with the central vertical axis and coupled to the egress light module 60 extends from the top of the heat dissipating fins 79 into a receptacle housing 71 that is coupled to the luminaire's housing 61 interior. The stem 58 shows a recessed surface 59 below the top end. Above the recess surface 59, the stem 58 is shown coupled to an electrical connector 22. The electrical connector 22 is coupled to a reciprocating connector 22 above, with power or power and data conductors 73 extending to the above.

Once the electrical connectors 22 are coupled, the emergency egress light module 60 obtains rotational capability. The present figure shows a spring-loaded yoke 80 with bi-prong ends 74 securing the emergency egress light module 60 from mechanically and/or electrically disengaging. The bi-prong spring-loaded yoke 80 can be configured to engage keyed notches in the stem 58 and/or can have a surface that fixates the stem 58 in place by friction. Both configurations as well as other configurations aim to prevent the emergency egress light module from rotating about its vertical axis and electromechanically disengaging.

To install an emergency egress light module 60 in a universal receptacle 65 of an ambient/egress lighting luminaire, a knob 76 coupled to the bi-prong ends 74 of the spring-loaded yoke 80 is pulled outwardly. Then the egress light module 60 is inserted and coupled to the reciprocating connector 22. After the egress light module 60 is inserted and coupled, the light source can be energized, and the installer rotates the light source 60 to align the emitted light center beam with the approximate central longitudinal axis of a designated path of egress below. Once aligned, the knob 76 is released and the emergency egress light module 60 is permanently secured from lateral rotation and electromechanical detachment, with the light source 60 emitting light precisely over the designated path of egress.

In some mounting applications, the ambient/egress lighting luminaires according to some aspects of the disclosed subject matter are fixed in place against tilting and rotation prior to coupling the emergency egress light module/s 60 in position. FIG. 21*c* shows a partial bottom face elevation of the ambient lighting luminaire or ambient/emergency lighting luminaire with a coupled detachable emergency egress light module 60 and universal receptacle 65. The elements shown include the partial section of the luminaire housing 61, the universal receptacle 65 aperture, the bi-prong ends 74 of the spring-loaded yoke 80, the knob 76, and a guide track 77 in the ambient luminaire housing 61 for pulling the spring-loaded yoke 80 away from the stem's recess 59 of the emergency egress light module 60. The emergency light source (e.g., emergency egress light module 60) is shown in dashed line around the universal receptacle 65.

FIGS. 21A and 21C show one of several means to couple a detachable emergency egress light module 60 to a universal receptacle 65 coupled to an ambient lighting luminaire and/or an ambient/egress lighting luminaire. The egress light module 60 shown with heat dissipating fins 79 can dissipate the light source generated heat by other means than fins 79 or in conjunction with fins 79.

FIG. 21D shows a partial section of an ambient/emergency lighting luminaire with a non-detachable emergency egress light module 60. The emergency egress light module 60 can be coupled to a universal receptacle 65 and the receptacle is coupled to the housing 61 of the luminaire.

In particular, FIGS. 21B and 21D show the non-detachable emergency egress light module 60 with heat dissipating fins 79 disposed at the back side. The fins 79 of the emergency egress light module 60 are shown in contact with the surface of the light emitting side of the luminaire. A central stem 58 aligned with the central vertical axis and coupled to the egress light module 60 extends from the top of the heat dissipating fins 79 into a receptacle housing 71 that is coupled to the luminaire's interior. Threads shown on top of the stem 58 are configured to couple to a restraining nut 78. A spring 80 disposed around the stem 58 extends from below the restraining nut 78 down to the interior surface of the housing 61. The spring 80 is coupled to the top surface of the housing 61, exerting pulling pressure on the top surfaces of the heat dissipating fins 79 of the emergency egress lighting light source 60. The pulling pressure helps maintain contact between the heat dissipating fins 79 and the luminaire housing 61, helping to dissipate the heat generated by extending by conduction the overall heat dissipating surfaces.

In this configuration, aligning the emergency egress light module 60 with the designated path of egress below only requires pulling down and rotating the emergency egress light module 60, and then releasing the emergency egress light module 60 when the light source's center beam is optimally aligned with the longitudinal axis of the designated path of egress below.

FIG. 21D shows a partial bottom face elevation of an ambient or an emergency lighting luminaire with a coupled emergency egress lighting light source receptacle 65. In particular, FIG. 21D shows only the receptacle's aperture, which receives the non-detachable emergency egress light module. The emergency light source (e.g., emergency egress light module 60) is shown in dashed line around the universal receptacle 65.

FIGS. 21B and 21D show one of several means to couple a non-detachable emergency egress light module 60 to a universal receptacle 65 coupled to an ambient lighting luminaire and/or an ambient/egress lighting luminaire. The egress light module 60 shown with heat dissipating fins 79 can dissipate the light source generated heat by other means than fins 79 or in conjunction with fins 79.

Figure 22:
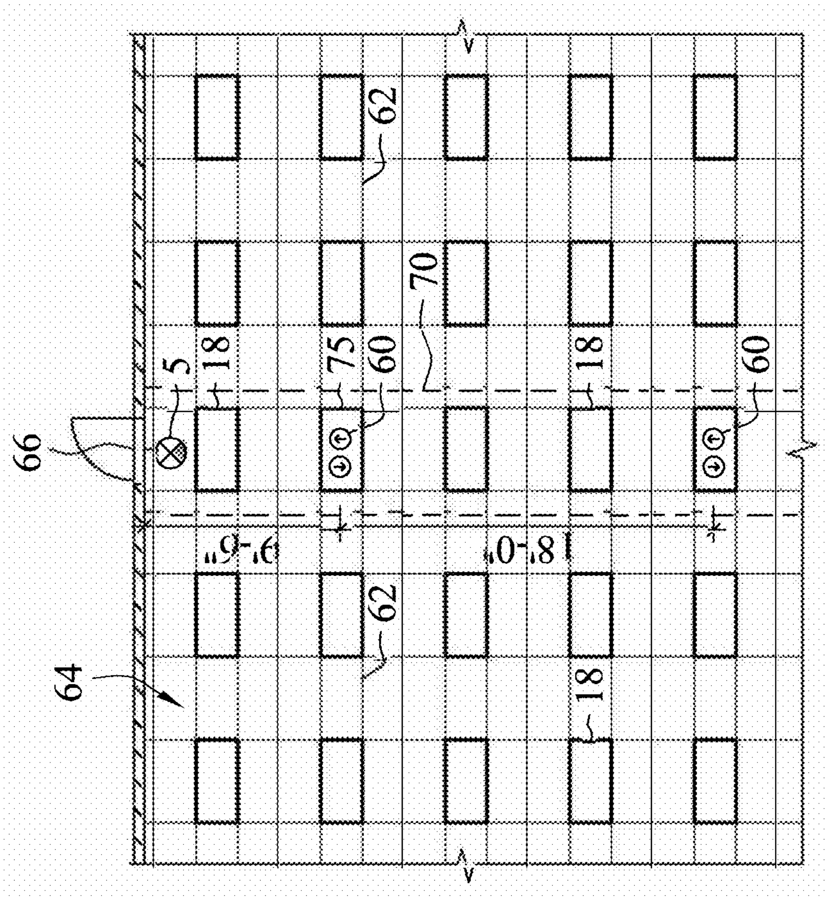
FIG. 22 shows a partial reflected ceiling plan of an interior space using 2'-0"×4'-0" luminaires above a linear path of egress.

FIG. 22 shows a partial reflected ceiling plan of an interior space using 2'-0"×4'-0" ambient 18 and ambient/egress lighting luminaires 75 above a linear path of egress 70.

The plan shows a modular T-bar ceiling 62 comprising acoustical tiles 64 and the 2'-0"×4'-0" ambient 18 and ambient/egress lighting luminaires 75. In some embodiments, the luminaires are spaced on an 8'-0"×8'-0" grid with a mounting height of 10'-0" AFF.

A column of five luminaires 18, 75 is shown aligned with a pair of legal exit doors 66 leading to the exterior. An illuminated exit sign 5 is shown above the door's 66 interior. A designated path of egress 70 is shown extending from the legal exit doors 66 into the rooms' interior. Two of the ambient/egress lighting luminaires 75 are shown with each luminaire coupled to two directional emergency egress light modules 60. The coupled emergency light sources 60 can provide ample illumination to illuminate the path of egress 70 below. According to some embodiments, the ambient/egress lighting luminaires 75 coupled to the emergency egress light modules 60 can be spaced at 24'-0" OC.

When primary power fails, the emergency egress light modules 60 of the ambient/egress luminaires 75 receive secondary power and turn on immediately. In the embodiment illustrated in FIG. 22, the two emergency egress light modules 60 coupled to each egress/emergency luminaire 75 are oriented at 180° to one another, together forming a linear path of egress 70 below. According to some embodiments, the egress/emergency luminaire 75 may be similar to the luminaire 75 shown in FIG. 20A.

Figure 23:
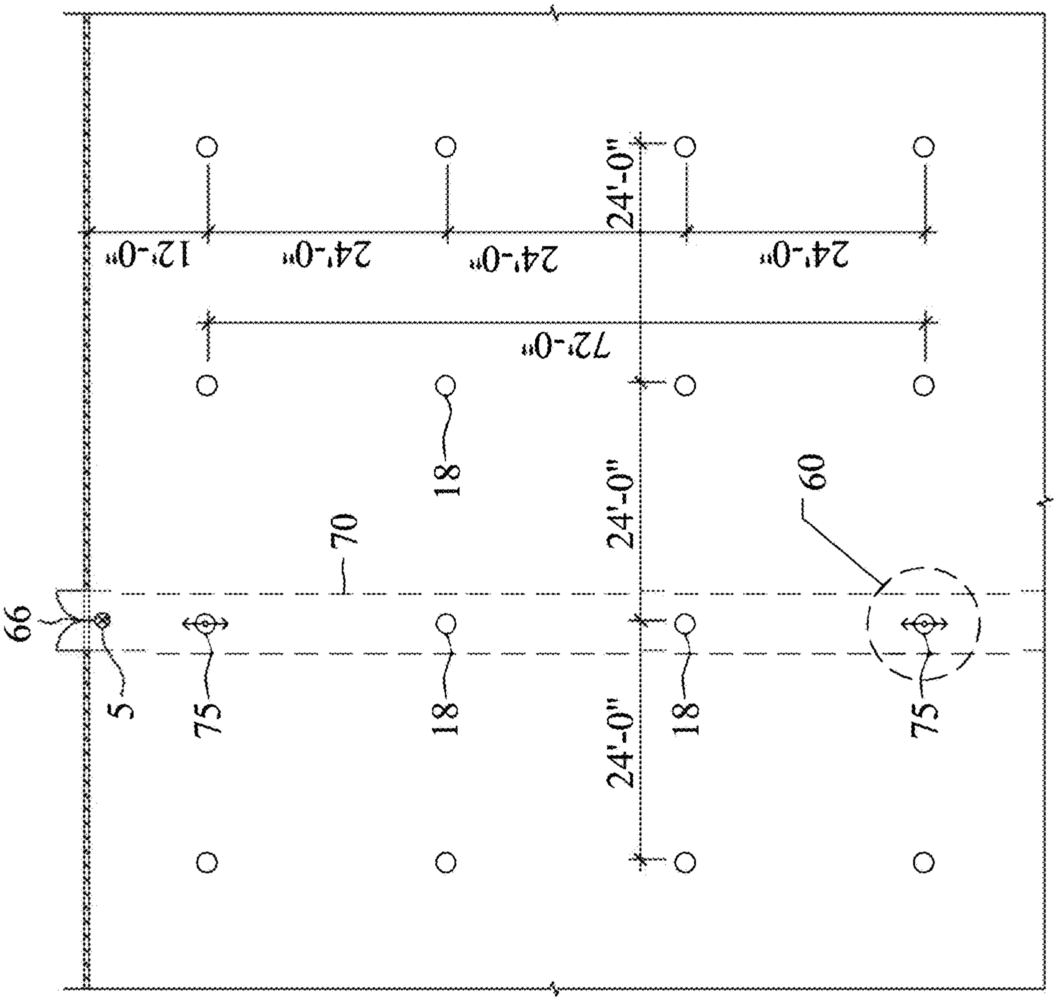
FIG. 23 shows a partial reflected ceiling plan of an interior space using high bay luminaires above a linear path of egress.

FIG. 23 shows a partial reflected ceiling plan of an interior space using round form high bay luminaires 75. The present plan shows an open ceiling arrangement of high bay luminaires According to some embodiments, the luminaires 75 are spaced on a 24'-0"×24'-0" grid at 24'-0" AFF.

A column of four luminaires is shown aligned with a pair of legal exit doors 66 leading to the exterior. A designated path of egress 70 is shown below the luminaires 75 extending from the legal exit doors 66 to the rooms' interior. Two of the four luminaires 75 shown are ambient/egress high bay luminaires 75. Two directional emergency egress light modules 60 coupled to the two egress/emergency lighting luminaires 75 can provide ample illumination to illuminate the path of egress 70 below. The ambient/egress lighting luminaire 75 with coupled emergency egress light modules 60 can be spaced at 72'-0" OC.

When the primary power fails, the emergency egress light modules 60 receiving secondary power turn on immediately. The two emergency egress light modules 60 coupled to the two ambient/egress high bay luminaire 75 are oriented at 180° to one another, forming a linear path of egress 70 below. According to some embodiments, the ambient/egress high bay luminaire 75 may be similar to the luminaire shown in FIG. 20B.

Figure 24:
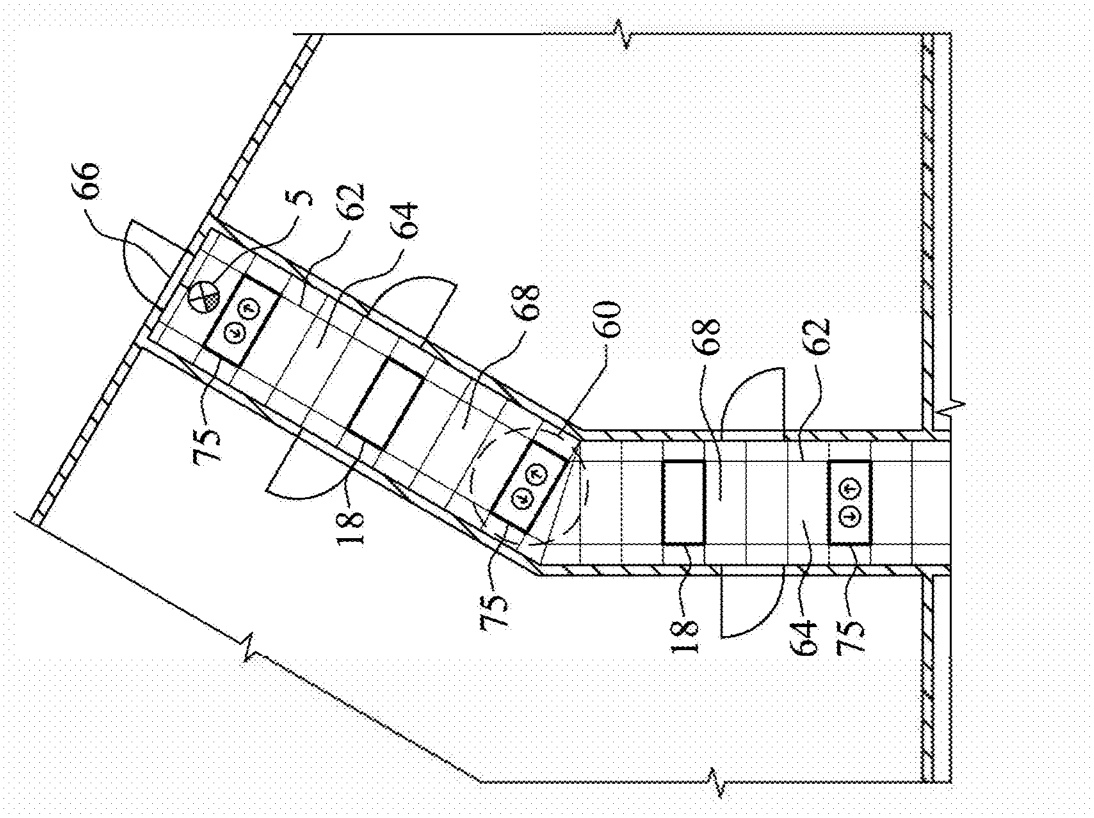
FIG. 24 shows a partial reflected ceiling plan of an interior space using 2'-0"×4'-0" luminaires above a nonlinear path of egress.

FIG. 24 shows a partial reflected ceiling plan of an interior corridor 68 using 2'-0"×4'-luminaires in a T-bar ceiling 62 located above a nonlinear path of egress 70. The present plan exemplifies the versatility of the ambient/egress lighting luminaire 75 coupled to egress light module 60 to effectively resolve design conditions where the path of egress 70 is nonlinear from end to end. The path of egress 70 in the present figure is comprised of two intersecting sections of nonaligned corridors 68. Ambient/egress lighting luminaires 75 and ambient lighting luminaires 18 mounted in a T-bar ceiling 62 above are configured to illuminate the corridor 68. The corridor terminates at a legal exit door 66 to the exterior. Over the interior side and above the exit door 66 an illuminated exit sign 5 shows the direction of the path toward the egress door 66.

In the example illustrated in FIG. 24, of the five luminaires shown, three ambient/egress lighting luminaires 75 with each luminaire 75 coupled to two emergency egress light modules 60 can illuminate the egress path of egress 70 below. Two of these three ambient/egress luminaires are located at opposing ends of the egress path 70. The luminaires' egress light modules 60 are oriented at 180° to one another. The center ambient/egress luminaire 75 emergency light sources 60 are oriented to align with the emergency light sources 60 coupled to the ambient/egress luminaires 75 at the opposing ends of the egress path 70. In the illustrated example, the present luminaire spacing shown between the ambient/egress lighting luminaires 75 is 16'-0" OC.

Figure 25:
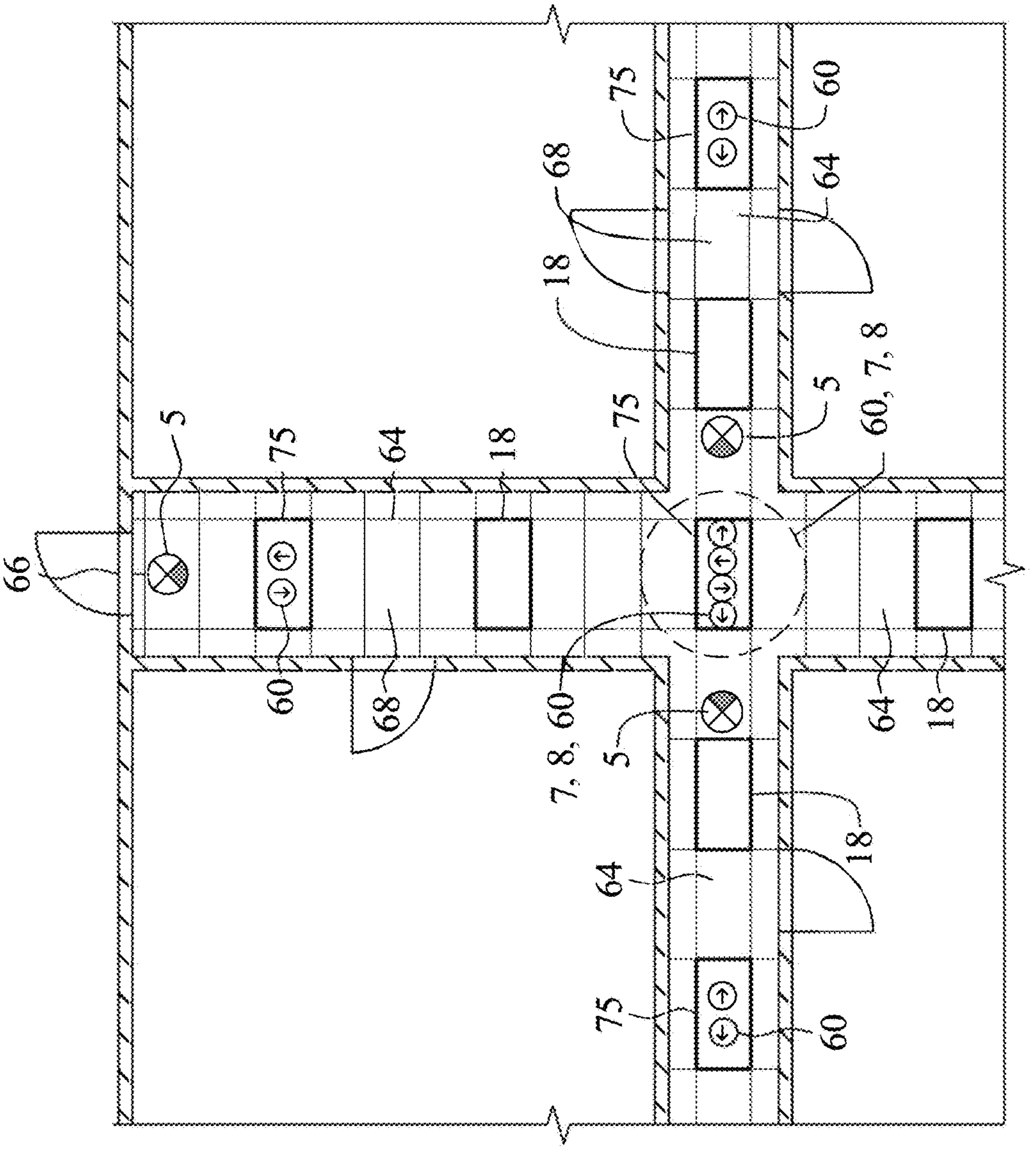
FIG. 25 shows a partial reflected ceiling plan of an interior space using 2'-0"×4'-0" luminaires with a monitoring camera over multiple paths of egress.

FIG. 25 shows a partial reflected ceiling plan of an interior space using 2'-0"×4'-0" luminaires 75 installed in a T-bar ceiling 62 and a coupled camera 7 monitoring multiple corridors 68. The partial plan shows ambient/egress lighting luminaires 75 coupled to egress lighting light sources 60 and an IOT device 8. In this example, an interior corridor 68 in a building merges into three possible paths of egress 70 to the exterior. Over the corridor 68 floor, rectangular ambient lighting luminaires 18 and ambient/egress lighting luminaires 75 are coupled to a T-bar ceiling 62. At the end of the corridor 68, a legal egress door 66 is shown with an exit sign luminaire 5 above. A corridor 68 leading to the exit door 66 intersects with two other corridors 68 leading to remote egress doors (not shown). Above and in proximity to this intersection, directional exit signs 5 showing the direction to the exit doors 66 are shown coupled to the T-bar ceiling 62.

The ambient lighting luminaires 18 and the ambient/egress lighting luminaires 75 shown above the corridors 68 illuminate the corridors 68 using primary power. Egress light modules 60 coupled to the ambient/egress lighting luminaires 75 turn on by secondary power when primary power fails. In the illustrated example of FIG. 25, the plan shows an ambient/egress luminaire 75 positioned over the corridor's 68 intersection, with other ambient/egress luminaires 75 spaced apart at approximately 22'-0" OC.

The three ambient/egress lighting luminaires 75 located away from the corridor's 68 intersection show two emergency lighting light sources 60 each, disposed at 180° to one another. The ambient/egress lighting luminaire 75 over the corridor's 68 intersection shows four emergency lighting light sources 60 oriented at 90° to one another. In addition, at the luminaire's center, a coupled camera 7 monitors activity in the corridors 68. The camera 7 can operate under primary and secondary power. Feed from the camera 7 can be wirelessly or by wire transmitted to local and/or remote location/s.

Figure 26:
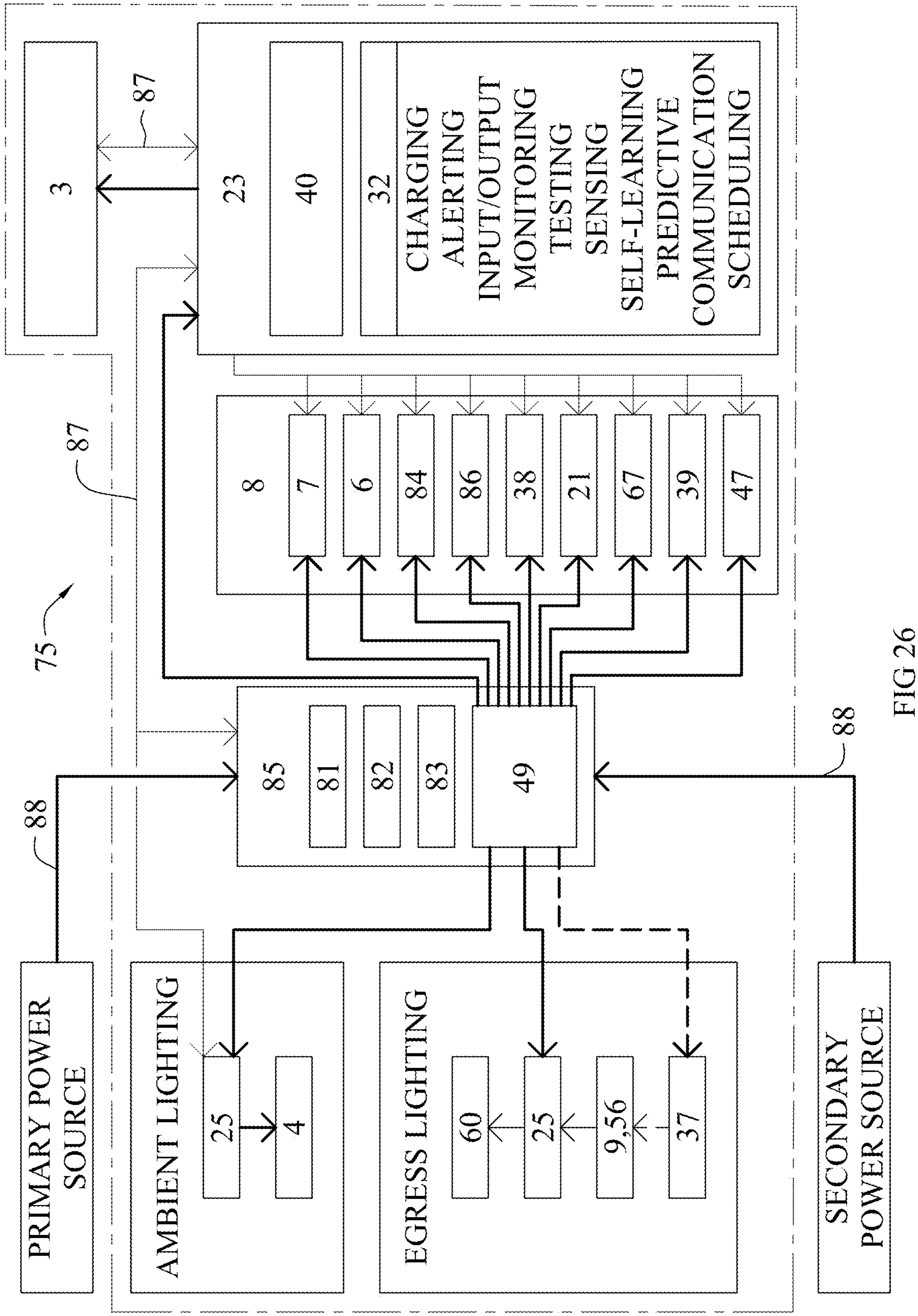
FIG. 26 shows an exemplary diagram of the ambient lighting luminaire coupled to an egress light module, processing/controlling, communication and IOT devices.

The above configuration represents only a fraction of permutations and functionalities that can be derived by employing ambient lighting luminaires 18 in conjunction with ambient/egress lighting luminaires 75 light source/s 60 and other IOT devices 8. FIG. 26 is a diagram expanding on such permutations and functionalities.

FIG. 26 shows an exemplary diagram of the ambient/egress lighting luminaire 75 coupled to an egress light module 60, a processor/controller 23, a communication device 3, power storage device 9, and IOT devices 8. The ambient/egress lighting luminaire 75 capable of operating in conjunction with emergency egress light module/s 60 and IOT devices 8 receives power from a primary or primary and a secondary power source.

Powering an egress lighting light source 60 can be provided by a primary source or primary and secondary power sources. The present diagram articulates means to expand the utility of the ambient/egress lighting luminaire 75 with coupled egress light module/s 60 and IOT devices 8. Further, the ambient/egress luminaire 75 can be coupled to a processor/controller 23 and execute in real time operation using resident code 32. The processor/controller 23 in real time receives and acts on at least one of: an environmental input, programmatic parameter input, and remote instructions/data resulting in enhanced capability to protect life and property.

Among the features that the enhanced ambient/egress lighting luminaire 75 coupled to a processor/controller 23 and IOT device/s 8 can provide include, but are not limited to: sensory inputs of which some cannot be detected by humans, and communication capabilities that include alerting occupants and remote clients. The processor/controller operating by AI code can have self-learning algorithms, learning the environmental conditions surrounding the ambient/egress lighting luminaire's 75 location. The processor/controller 23 compiles a plurality of inputs from the onboard code programming 32, compiles inputs communicated from remote device/s, and compiles resident sensory device 6 input to make intelligent decisions concerning at least one of:

1. Device power draw;
2. Device power activation and deactivation;
3. Time and duration of device use;
4. Local and/or remote communication;
5. Who and when to contact based on a detected event;
6. Monitor and test operational readiness; and
7. Anticipate events and take preventive measure/s.

The code modules of the processor/controller 23 can be modularly compiled in relation to the anticipated IOT devices 8 to be coupled to ambient lighting luminaire/s 18 and ambient/egress lighting luminaire/s 75 at any one space. The processor/controller 23 can operate the IOT devices 8 individually or in concert with one another. In addition, the processor/controller 23 can communicate with and/or operate remote IOT devices 8 that are not coupled to ambient lighting luminaire/s 18 and ambient/egress lighting luminaire/s 75.

The present diagram shows primary power and secondary power conveyed into an ambient/egress lighting luminaire 75 from the exterior. Where a secondary power supply device 9, 56 is coupled to the ambient/egress lighting luminaire 75, or located in the immediate vicinity of the ambient/egress lighting luminaire 75, the power source to at least the egress light module can be by the primary power source. In such scenario/s, primary power flows to a charger 37 and continues to the local power supply storage device 9, 56. When the primary power fails, the local power supply storage device 9, 56 then flows secondary power directly or indirectly to at least one egress light module 60 and any coupled IOT device/s 8. The present diagram shows in dashed line the charger 37 and the integral power source storage device 9, 56.

The power entering the ambient/egress lighting luminaire 75 can be selectively controlled. A power management module 85 is configured to sense the entering power source and to selectively decide on one of the sources to power at least one device coupled to the ambient/egress lighting luminaire 75. Under normal primary house power, the power management module 85, with or without controlling processor/controller 23 input, can direct power to at least one ambient lighting 18 device through a driver 81.

When house power is interrupted, a transfer switch 82 switches the power source to a secondary power, and at least one emergency light source 60 receives power through an emergency light source driver. In some embodiments, the secondary power source can supply power to at least one egress light module directly.

In addition to the light emitting devices, the ambient/egress lighting luminaire 75 can couple to at least one processor/controller 23, a communication device 3, and a myriad of IOT devices 8. At least one of the IOT devices 8 can be configured to couple to a universal receptacle that is also configured to couple to at least one emergency light source 60. The processor/controller 23 receives its power from the power management module 85. Once power is received by the processor/controller 23, the processor/controller 23 can fully govern the operation of the power management module 85, as the power management module 85 under secondary power may have limited power capacity.

The processor/controller 23 may comprise resident memory 40 and programmed code 32. The programmed code modules can include charging, alerting, input/output, monitoring, testing, sensing, self-learning, predicting, communicating, and scheduling modules. According to some embodiments, the processor/controller 23 coupled to the communication device 3 can receive and send data to devices coupled to the ambient/egress lighting luminaire 75, devices in the vicinity of the ambient/egress lighting luminaire 75, and remote clients.

The IOT devices 8 coupled to the ambient/egress lighting luminaire 75 and/or located in the vicinity of the luminaire can include at least one of: a camera 7, an occupancy sensor 6, an air quality sensor 84, a temperature probe 86, a speaker/microphone 38, an indicator light 21, a signage device 67, and a photocell 39, and a test button 47. The processor/controller 23 can also control the luminaire's 18, 75 ambient lighting light source power input and/or color temperature. The processor/controller 23 can partially or fully operate under primary and/or secondary power configured to control the ambient lighting luminaire devices under primary power, and under secondary power selectively control devices that are configured to protect life and property. Such capability is in addition to operating the egress light module/s 60.

The processor/controller 23 can further prioritize the devices powered, based on available power disconnecting, or limiting the flow of power to coupled devices less important for life safety. According to one or more aspects of the disclosed subject matter, the processor/controller 23 can be configured to periodically test at least one of the devices coupled to the ambient/egress lighting luminaire 75. The testing can include the secondary power source storage device 56, the charger 37, and the egress light module/s 60.

Figure 27A:
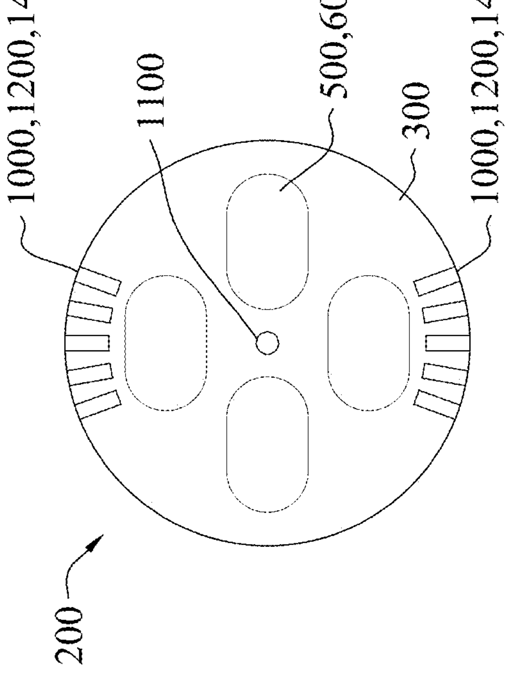
FIG. 27A and FIG. 27B show embodiments of light emitting apparatus' room facing surfaces with protrusions extending downwardly.
Figure 27B:
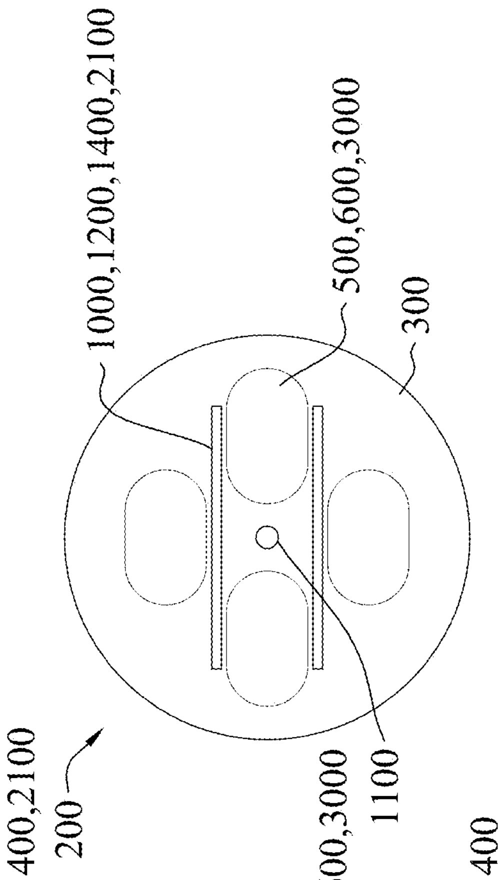

FIG. 27*a* and FIG. 27*b* show in a plan view the heat dissipating structure 300 of the light emitting apparatus 200 retaining the light source 500. The heat dissipating structure 300 is configured to face down and parallel or substantially parallel with a floor surface and/or a path of egress 100 below. The light source is covered by a light redirecting optical lens 600. The present figures shows four light sources 500 covered by respective lenses 600. In a different embodiment at least one single lens 600 can cover the light sources 500 (not shown). Ten protrusions 1000 coupled to and extending away from the face of the heat dissipating structure 300 can be configured to dissipate conducted light source heat by acting as fins 1400 and/or provide grip surface dialing/tabs 2100 to rotate the light emitting apparatus 200 about its vertical axis.

FIG. 27*a* configuration shows the protrusions 1000 positioned at the perimeter of the heat dissipating structure in perpendicular orientation to the direction of the light emitted. FIG. 27*b* shows an alternate configuration wherein the protrusions 1000 are arranged parallel to the elongated redirecting optical lenses 600 covering the light sources 500. The protrusions 1000 are disposed at the opposing sides of the two center lamps 5000 of the light emitting apparatus 200 oriented parallel with the direction of the path of egress 100 below. At the center of the heat dissipating structure 300 an indicator light 1100 and/or an antenna can be positioned. The indicator light 1100 can be configured to show the state of readiness of the light emitting apparatus 200 and the antenna can couple to a communication device 2600.

Figure 27C:
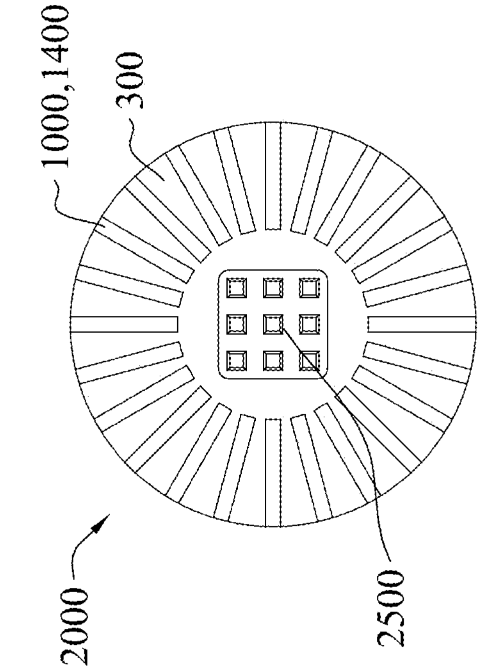
FIG. 27C and FIG. 27D show embodiments of light emitting apparatus' surfaces with protrusions extending upwardly and sideward.
Figure 27D:
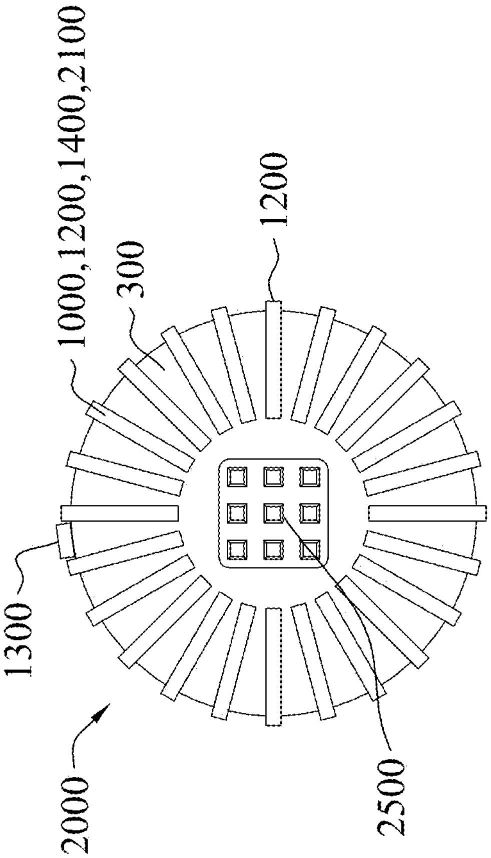

FIG. 27*c* and FIG. 27*d* show in plan view the opposite side to the side of the heat dissipating structure 300 of the light emitting apparatus 200 facing the floor below. FIG. 27*c* shows an electromechanical connector 2500 extending outward from the vertical axial center of the light emitting apparatus 200. A plurality of protrusions 1000, also extending upward, are shown radially arranged about the electromechanical connector 2500. The connector 2500 can convey both power and data In another embodiment (not shown) the protrusions can be arranged differently.

The protrusions 1000 in the present embodiment are only configured to dissipate heat produced by the light sources 500 coupled to the opposite side of the heat dissipating structure 300. FIG. 27*d* shows an alternate configuration wherein the protrusions 1000 extend beyond the perimeter of the light emitting apparatus 200. In this arrangement the protrusions 1000 can be configured to dissipate conducted light source 500 heat by acting as fins 1400 and/or provide grip surface 1200 dialing/tabs 2100 to rotate the light emitting apparatus 200 about its vertical axis.

In yet another embodiment (not shown), the protrusions 1000 can extend only from the perimeter of the heat dissipating structure. The center elongated light beam of the light emitting apparatus 200 is configured to align with the longitudinal axis of a path of egress 100 below. A locking device 1300 prevents the light emitting apparatus 200 from rotating following alignment with the path of egress 100 below. Locking device 1300, in at least one configuration, can lock the light emitting apparatus 200 by abutting against at least one protrusion 1000.

Figure 28B:
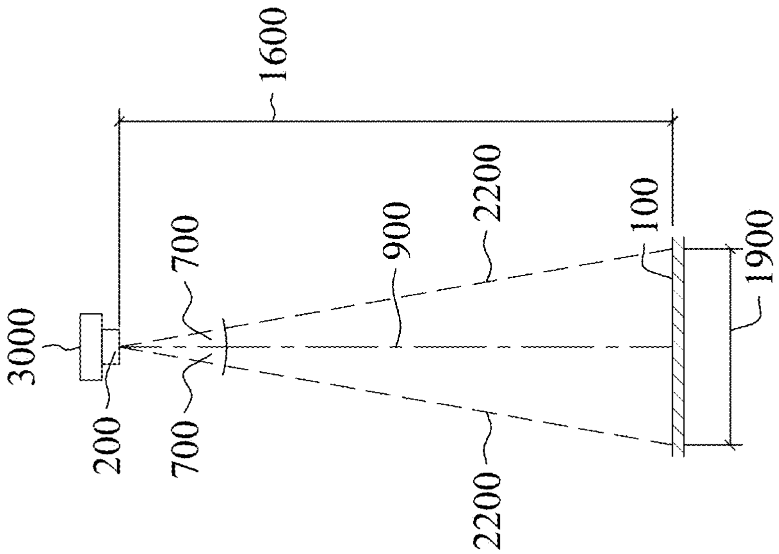
FIG. 28A and FIG. 28B show in section formats the longitudinal and transverse central beams emanating from the same light emitting apparatus light source in relation to their common nadir respectively.
Figure 28A:
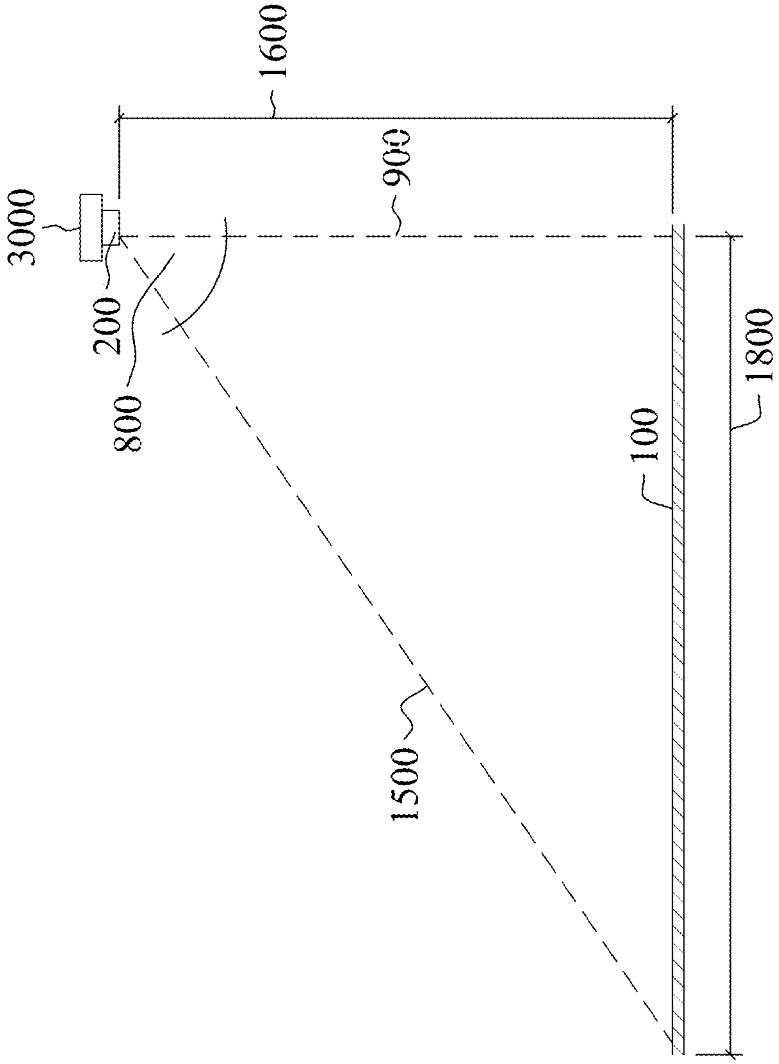

FIGS. 28*a* and 28*b* show the light emitting apparatus 200 center beams 1500 and 2200 in relation to nadir 900 of the same light source 500 respectively. The angle between the elongated longitudinal center beam 1500 and nadir 900 is defined as the longitudinal beam angle 800. The center of the beam perpendicular to the longitudinal center beam 1500 is the transverse center beam 2200. The angle between the transverse center beam 2200 and nadir 900 is defined as the transverse beam angle 700. To form the elongated longitudinal beam pattern, the longitudinal beam angle 800 of the light redirecting optical lens 600 is greater than the traverse beam angle 700 with respect to their common nadir 900. The redirecting optical lens 600 covering the light source 500 can be symmetrical or asymmetrical. Regardless, the light emitted through the redirecting optical lens 600 on to the floor surface below forms a linear illuminated pattern.

The longitudinal beam angle 800 elongated center beam 1500 of the light source 500 rotated to align with the central longitudinal axis of the path of egress 100 defines the illuminated path of egress 100 length below. Wherein, the longitudinal transverse beam angle 700 of center beam 2200 defines the width of the path of egress 100. Both beam angles 700 and 800 originate at a common nadir 900. FIG. 28*a* shows a section drawn along the path of egress 100 of width 1900. The elongated center beam 1500 is shown originating from a light emitting apparatus 200 coupled to an enclosure 3000. The center beam shown extends outwardly and downwardly intersecting the path of egress 100 below.

Figure 29A:
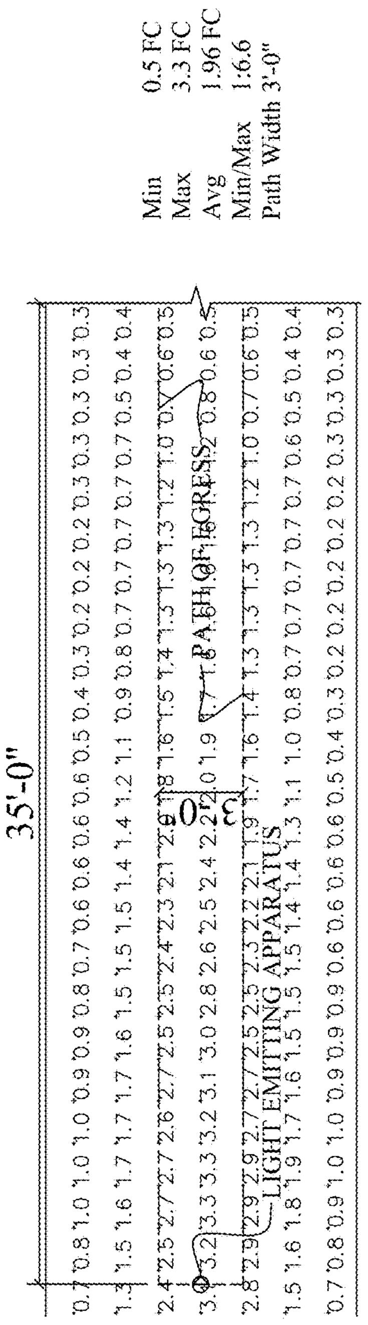
FIG. 29A, FIG. 29B and FIG. 29C show point-by-point photometry for a 70'-0" long paths of egress with the same light emitting apparatus mounted at 20'-0", 30'-0" and 40'-0" above finish floor respectively.

In most applications it is desirable to have the length 1800 of an illuminated egress path produced by a light emitting apparatus 200 longer than the apparatus' mounting height 1600. Longer length path 1800 translates to a reduction in the number of the light emitting apparatus 200 thus reducing labor, material and maintenance costs. For example, the present innovation path of egress 100 as shown in FIG. 29*a* complies with the NFPA fire code. The length 1800 of the illuminated path of egress can extend at least three and one-half times the light emitting apparatus 200 mounting height 1600 when mounted at 20'-0" above the path of egress 100.

The same form factor of a light emitting apparatus 200 can illuminate at least one United States code compliant path of egress 100 from 15'-0" to at least 45'-0" AFF. Further, the light emitting apparatus form factor can remain the same at various mounting heights. To maintain the same or substantially the same light levels on the surface and within the delineated illuminated path of egress 100 at different mounting heights 16 of the light emitting apparatus 200, at least one parameter of: the optical properties of a lens/s 600, lamp/s 5000 input power, lamp/s 5000 type and/or number of lamps 5000 retained on the same lamp 5000 retaining heat dissipating structure 300 can be altered.

FIG. 28*b* shows a transverse section through the path of egress 100. The light emitting apparatus 200 is shown coupled to an enclosure 3000 with the two transverse center beams 2200 emitted at opposite sides to the nadir 900 of the light emitting apparatus 200 that is symmetrically positioned in between. The light source 500 of the present section is the same light source 500 shown in FIG. 28*a* depicting the elongated longitudinal center beam 1500. The transverse beam angle shown is perpendicular to longitudinal beam angle 800 of the elongated longitudinal center beam 1500.

Figure 29B:
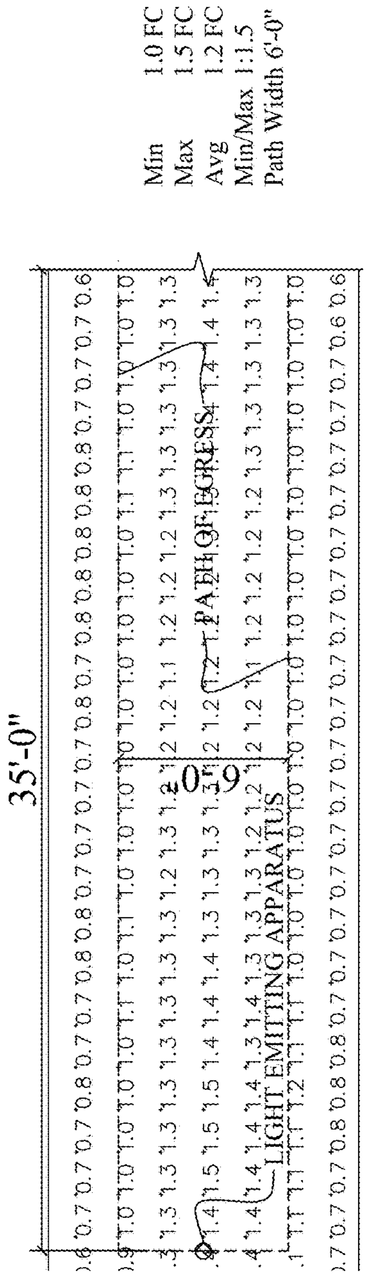

To maintain the same width and/or light levels on and within the delineated path of egress 100 at higher than base mounting height 1600, the transverse beam angle 700 of the light redirecting optical lens 600 can be reduced. Also, the higher the mounting height 1600 is, the longitudinal beam angle 800 can increase elongating the illuminated path of egress 100. For example, FIG. 29*b* shows a depiction of a transverse beam angle 700 optimization for a light emitting apparatus mounted at 30'-0" above a path of egress 100. In this depiction the light emitting apparatus 200 consumes under 14 watts and illuminates a 6'-0" wide path 100 along at least 70'-0" feet while producing a minimum of 1.0 FC on the surface of the delineated path of egress 100.

Figure 29C:
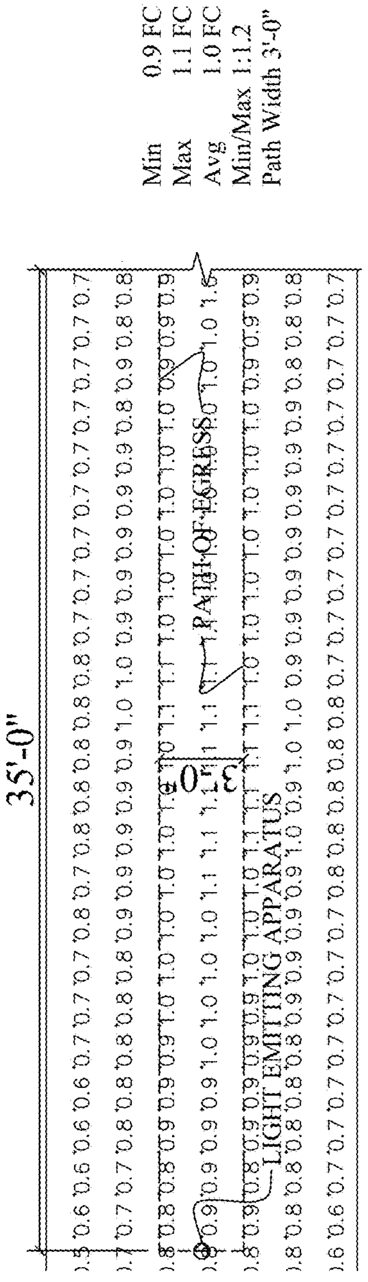

FIGS. 29*a*, 29*b* and 29*c* show three point-by-point photometric evaluations that articulate the light emittance performance of the same redirecting optical lens 600 placed on two aligned with one another longitudinal center beam 1500 light sources 500 spaced apart at 70'-0" consuming the same input power with a mounting height 1600 variance. FIG. 29*a* is mounted at finish floor (AFF), FIG. 29*b* at 30'-0" AFF, and FIG. 29*c* at 40'-0" AFF. For clarity the figure shows only a 35'-0" long path as the other portion of the path is symmetrical in performance.

FIG. 29*a* shows a point-by-point photometric evaluation of a half of 70'-0" long path of egress 100 formed by two light emitting apparatus 200 mounted at 20'-0" AFF positioned at the opposite ends of the path with their elongated longitudinal beam 1500 aligned with the longitudinal central Axis 1700 of the path of egress 100 below. Together, the light emitting apparatus 200 consumes less than 14 watts and produces a 3'-0" wide delineated path of egress 100 with a maximum light level value of 3.3 FC and the minimum light level of 0.5 FC. The maximum to minimum uniformity ratio of the path is 6.6:1 with an average light level of 1.96 FC. The performance of the light emitting apparatus 200 is compliant with the NFPA fire code. However, it is evident that a wider light emitting optical lens 600 transverse beam 700 will widen the path of egress 100, improve the maximum to minimum ratio while still complying with the U.S. building codes requirements.

FIG. 29*b* shows a point-by-point photometric evaluation of a half of a 70'-0" long path of egress 100 formed by two light emitting apparatus 200 mounted 30'-0" AFF positioned at the opposite ends of the path 100 with their elongated longitudinal beam 1500 aligned with the longitudinal central Axis 1700 of the path of egress 100 below. Together, the light emitting apparatus 200 consume less than 14 watts, produces a 6'-0" wide path with maximum light level value of 1.5 FC and a minimum light level of 1.0 FC. The maximum to minimum uniformity ratio of the path is 1.5:1 with an average light level of 1.2 FC. The performance of the light emitting apparatus 200 is significantly superior to the mandated U.S. building codes code. The National Fire Protection Agency (NFPA) code mandates a 0.1 FC minimum light level, an average of 1.0 FC and a maximum to minimum uniformity ratio of equal or less than 40:1. This evaluation performance results, confirmed by built prototype engineering models, demonstrate that a superior path of egress 100 illuminance properties are achievable with reduced power input than presently available. The present figure demonstrates an optimized light redirecting optical lens 600 performance for a light emitting apparatus 200 application mounted at 30'-0" AFF.

FIG. 29*c* shows a point-by-point photometric evaluation of a half of a 70'-0" long path of egress 100 formed by two light emitting apparatus 200 mounted 40'-0" AFF positioned at the opposite ends of the path 100 with their elongated longitudinal beam 1500 aligned with the longitudinal central Axis 1700 of the path of egress below 100. Together, the light emitting apparatus 200 consume less than 14 watts, produces a 3'-0" wide code compliant path with maximum light level value of 1.1 FC and the minimum light level of 0.9 FC. The maximum to minimum uniformity ratio of the path is 1.2:1 with an average light level of 1.0 FC. The performance of the light emitting apparatus 200 is compliant with the NFPA fire code and the maximum to minimum uniformity ratio of 2.2:1 is well above the NFPA mandated code—the NFPA code mandates the maximum to minimum light level uniformity ratio of equal or less than the 40:1.

However, it is evident that narrower transverse beam angle 700 will improve the overall illuminance performance along the path of egress 100. At 11'-0" wide path, the light levels do not fall below 0.5 FC, which is well above the 0.1 FC mandated minimum by the NFPA. Rarely does the code require a path of egress 100 width that exceeds 6'-0". A narrower path of egress 100 produced by a narrow light redirecting optical lens 5 will increase the minimum light levels and improve the uniformity ratio.

The point-by-point photometric evaluations and prior specifications show that a light emitting apparatus 200 mounted above a 70'-0" long path of egress 100 can produce same or substantially similar U.S. building codes compliant illumination properties by altering at least one of:

a. The number of lamps 5000 coupled to the heat dissipating structure 300
b. The input power to the lamp 5000
c. The types of lamps 5000 coupled to the heat dissipating structure 300
d. The combination of lamp 5000 types coupled to the heat dissipating structure 300
e. The redirecting optical lens/es 600 over at least one light emitting apparatus 200, and
f. The longitudinal and/or transverse beam angle spread of at least two redirecting lens optics 6 disposed over two corresponding lamps 5000.

It is also noted that the photometric evaluation shows that the light levels along the 70'-illuminated path of egress 100 with the light emitting apparatus 200 mounting height 1600 between 20'-0" to at least 40'-0" AFF can be attained by using the same form factor light source 500 and light redirecting optical lens 600.

Figure 30B:
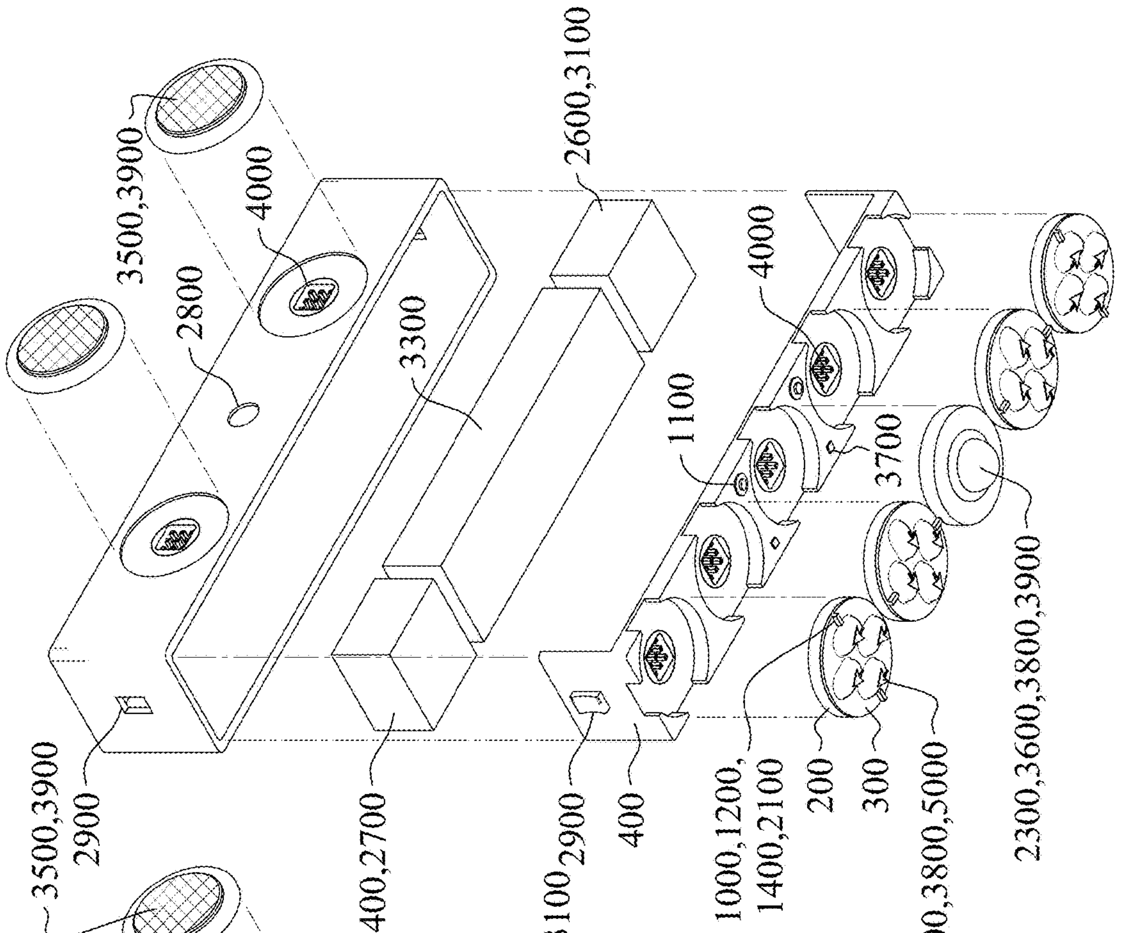
FIGS. 30A and 30B show exploded perspectives of three and five light emitting apparatus receptacles' enclosures respectively.
Figure 30A:
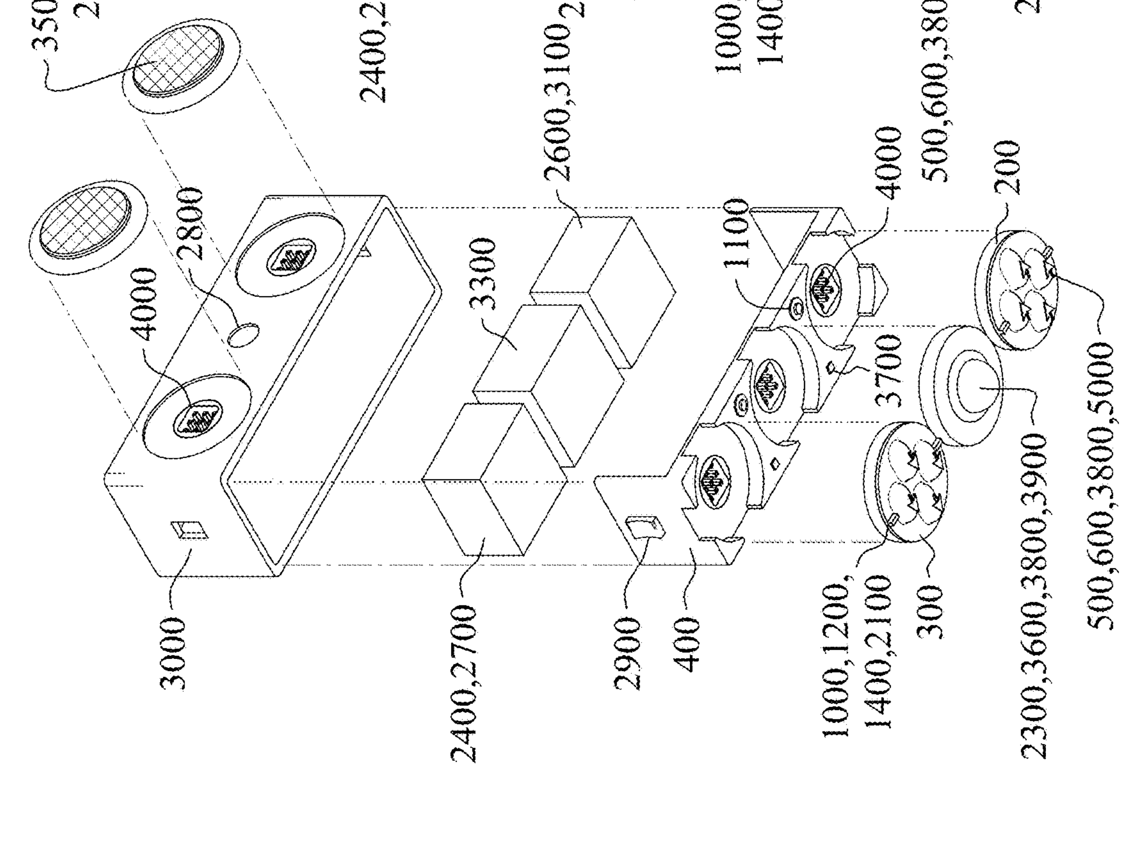

FIG. 30*a* shows a bottom view of an exemplary embodiment in exploded perspective of an enclosure 3000 coupled to two light emitting apparatus 200 and a camera 3600. The exemplary devices shown are coupled to the room facing retaining structure 400 of the enclosure 3000 with three receptacles 4000. The devices shown coupled include indicator lights 1100 and switching knobs 3700. An audio device 3500 is shown coupled to the long wall of the enclosure 3000 with a knockout 2800 in the middle and a latch 2900 that partially or fully detaches the retaining structure 400 from the enclosure 3000 is shown on the short wall of the enclosure 3000.

The enclosure can retain at least one of: an occupancy sensor 3900, a processor with memory and code 31, a power supply 2400, a charging device 2700, a backup power supply 3300, and a communication device 3600. In a different embodiment (not shown), the retaining structure 400 can show a different power consuming device and/or a blank cap 3800 over at least one of the power or power and data receiving receptacles 4000.

FIG. 30*b* shows a bottom view of an exemplary embodiment in exploded perspective of an enclosure 3000 coupled to four light emitting apparatus 200 and a camera 3600. The devices shown are coupled to the room facing retaining structure 400 of the enclosure 3000 with five receptacles 4000. The retaining structure 400 also shows indicator lights 11 and switching knobs 3700. An audio device 3500 is shown coupled to the long wall of the enclosure 3000 with a knockout 2800 in the middle and a latch 2900 that partially or fully detaches the retaining structure 400 from the enclosure 3000 is shown on the short wall of the enclosure 3000.

The retaining structure 400 shown in both figures above is detachable. In a different embodiment the retaining structure 400 can be an integral part of an enclosure 3000 housing. Yet, in a different embodiment such a an ambient lighting luminaire, the driver (power supply) tray can provide the mounting surface for the light emitting apparatus 200 serving as the retaining structure 400. The enclosure 3000 with its coupled devices can be configured for maximum operational versatility addressing emergency and non-emergency building life safety needs. In so doing, the code mandated illuminated means of egress devices can become real time in situ sensing, processing, and outputting devices that can operate alone and/or in unison with other devices purposed to save life and protect property.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Element List

| | | | |
|---|---|---|---|
| 1 | Extender | 44 | Peripheral Interface |
| 2 | inverter | 45 | Other Bldg. Discipline Device |
| 3 | Transceiver | 46 | Extender Door |
| 4 | Light Module | 47 | Test Button |
| 5 | Exit Sign | 48 | Exterior Mounted Device |
| 6 | Sensing Device | 49 | Bus |
| 7 | Camera/occupancy sensor | 50 | Non-Volatile storage |
| 8 | IOT Device | 52 | Latch |
| 9 | Battery | 55 | Device Tray |
| 10 | Exit/Egress Luminaire Combo | 100 | Network |
| 11 | Type A Adaptor | 100A | Egress Path |
| 12 | Type B Adaptor | 110 | Cloud Network |
| 13 | Type C Adaptor | 115 | Remote Computer |
| 14 | Conduit | 120 | Web Server |

-continued

| Element List | | | |
|---|---|---|---|
| 15 | Egress Luminaire | 125 | Cloud Storage Server |
| 16 | AC Power Conductor | 130 | Computer Server |
| 17 | Data Conductor | 200 | Light Emitting Apparatus |
| 18 | Ambient Lighting Luminaire | 300 | Heat Dissipating Structure |
| 19 | Wall | 400 | Retaining Structure |
| 20 | Sign | 500 | Light Source |
| 21 | Indicator Light | | Light Redirecting Optical |
| 22 | Power/Data Receptacle | 600 | Lens |
| 23 | Processor/Controller | 700 | Transverse Beam Angle |
| 24 | Bore/Knockout | 800 | Longitudinal Beam Angle |
| 25 | Driver | 900 | Nadir |
| 26 | Ceiling | 1000 | Protrusion |
| 27 | Lamp/Light Source | 1100 | Lit indicator |
| 28 | Aperture | 1200 | Grip Surface |
| 29 | J-box | 1300 | Locking Device |
| 30 | Remote Device | 1400 | Heat dissipating fin |
| 31 | T-Bar Hanger | 1500 | Center Beam |
| 32 | Programmed Code | 1600 | Mounting Height |
| 33 | Output Device | 1700 | PoE Long. Central Axis |
| 34 | Pendent | 1800 | PoE Length |
| 35 | Lens Optics | 1900 | PoE Width |
| 36 | Generator | 2000 | Top of HDS. |
| 37 | Charging Device | 2100 | Rotating/Dialing Tab |
| 38 | Audio Device | 2200 | Transverse Center Beam |
| 39 | Photocell | 2300 | Sensing Device |
| 40 | Resident Memory | 2400 | Power Supply |
| 41 | Display Interface | 2500 | Electromechanical Connector |
| 42 | Building Interior | 2600 | Communication Device |
| 43 | Network Interface - BMS | 2700 | Charging Device |
| 2800 | Knockout | 3600 | Camera |
| 2900 | Latch | 3700 | Switching Knob/Button |
| 3000 | Enclosure/Housing | 3800 | Cap |
| 3100 | Processor | 3900 | Occupancy Sensor |
| 3200 | Sign | 4000 | Power/Data Receptacle |
| 3300 | Back-up Power Supply | 5000 | Lamp |
| 3500 | Audio Device | | |

Numerous modifications and variations of the aspects of the disclosed subject matter are possible in light of the above disclosure. It is therefore to be understood that within the scope of the appended claims, the disclosure may be practiced otherwise than as specifically described herein.

The invention claimed is:

1. A reduced form light emitting apparatus comprising:

a heat dissipating structure that has a surface substantially aligned in parallel with an elongated path of egress below;

a light source that is retained in the heat dissipating structure, the light source emits light;

an optical lens that covers the light source and redirects the light that is emitted from the light source to form an elongated linear light beam downwardly and away from the reduced form light emitting apparatus and onto the elongated path of egress below;

a retaining structure that is electromechanically coupled to the light emitting apparatus, wherein the reduced form light emitting apparatus is configured to rotate about a vertical axis thereof so as to align a center beam of elongated linear light beam with a longitudinal axial center of the elongated path of egress below, a longitudinal beam angle of the elongated linear light beam is greater than a traverse beam angle of the elongated linear light beam with respect to a common nadir, and within and on at least a 3'0" wide surface of the elongated path of egress that extends up to 70'-0" long, average light levels provide by the elongated linear light beam are equal to or greater than 1.0 foot candles (FCs) with a maximum to minimum uniformity ratio equal or smaller than 5:1 while the light source consumes no greater than 0.05 watts/Square feet to produce the elongated linear light beam.

2. The reduced form light emitting apparatus of claim 1, wherein the elongated linear light beam being one of a symmetrical distribution light pattern or an asymmetrical light distribution pattern.

3. The reduced form light emitting apparatus of claim 1, wherein the optical lens has a longitudinal light emittance angle that is greater than a transverse light emittance angle with respect to another common nadir.

4. The reduced form light emitting apparatus of claim 3, wherein the transverse light emittance angle of the optical lens is reduced to offset a higher installation height of the light emitting apparatus over the elongated path of egress.

5. The reduced form light emitting apparatus of claim 1, wherein the heat dissipating structure comprising at least one protrusion that extends in at least one of a downward direction, sideward direction, or upward direction from the heat dissipating structure.

6. The reduced form light emitting apparatus of claim 5, wherein the at least one protrusion is configured to enable at least one of light source heat dissipation, a grip surface to rotate the light emitting apparatus, and provide a surface to engage a locking apparatus that prevents rotation of the light emitting apparatus rotation following light emittance alignment with the elongated path of egress.

7. The reduced form light emitting apparatus of claim 1, wherein the light emitting apparatus is detachably attached to the retaining structure.

8. The reduced form light emitting apparatus of claim 1, wherein the light emitting apparatus is adapted to couple to at least one of an egress lighting luminaire or an ambient lighting luminaire.

9. The reduced form light emitting apparatus of claim 1, further comprising a light emitting indicator coupled to at least one of the light emitting apparatus and the retaining structure.

10. The reduced form light emitting apparatus of claim 1, wherein the light emitting apparatus is configured to operate in at least one of a damp/wet location, a food processing facility, or a hazardous environment.

11. The reduced form light emitting apparatus of claim 1, wherein the light source of is powered by at least one of house power or back-up power wherein, under a condition the light source is provided with house power, the light emitting apparatus provides night light illumination.

12. A lighting system comprising:

an enclosure;

a power supply;

a light emitting apparatus that is electromechanically coupled to the power supply, the light emitting apparatus being retained by the enclosure and including a heat dissipating structure, a light source is disposed on the heat dissipating structure and configured to emit light, and a light redirecting optical lens that covers the light source, wherein a surface of the heat dissipating structure is disposed above and aligned substantially in parallel with a delineated path of egress, wherein, the light redirecting optical lens redirects the light from the light source into a linear elongated pattern that is directed below toward the delineated path of egress, the heat dissipating structure is configured to horizontally rotate about a vertical axis thereof so as to change an orientation of the linear elongated pattern and align an elongated center beam of light of the linear elongated pattern with a longitudinal center axis of the delineated path of egress, an optical property of the light redirecting optical lens is set by at least one of a length of the delineated path of egress length, a width of the delineated path of egress, a mounting height of the light emitting apparatus, or a predetermined illuminance level on a surface of the delineated path of egress and, under a condition the light emitting apparatus is mounted between 20'-0" to 40'-0" above a finish floor, the light emitting apparatus illuminates at least 3'0" wide delineated path on the path of egress that extends up to 70'-0" long while the light source consumes less than 14 watts and provides on the delineated path of egress surface not less than 1.0 foot candles (FCs) of illumination.

13. The lighting system of claim 12, wherein the linear elongated pattern being one of a symmetrical distribution light pattern or an asymmetrical light distribution pattern.

14. The lighting system of claim 12, wherein the light emitted from the light source has an elongated pattern.

15. The lighting system of claim 12, wherein a level of directivity of the light redirecting optical lens is set based at least in part on a mounting height of the light emitting apparatus.

16. The lighting system of claim 12, wherein the enclosure houses the power supply.

17. The lighting system of claim 12, wherein the enclosure houses at least one of a processor with memory and code, a sensing device, or a communication device.

18. The lighting system of claim 12, wherein the light emitting apparatus is configured to simultaneously illuminate another delineated path of egress.

19. The lighting system of claim 12, wherein the light emitting apparatus is configured to operate in at least one of a damp/wet location, a food processing facility, or a hazardous environment.

20. The lighting system of claim 12, wherein the light source of is powered by at least one of house power or back-up power wherein, under a condition the light source is provided with house power, the light emitting apparatus provides night light illumination.

* * * * *